(12) United States Patent
Kolvick et al.

(10) Patent No.: US 10,273,880 B2
(45) Date of Patent: Apr. 30, 2019

(54) SYSTEM AND METHOD OF RECIRCULATING EXHAUST GAS FOR USE IN A PLURALITY OF FLOW PATHS IN A GAS TURBINE ENGINE

(71) Applicants: General Electric Company, Schenectady, NY (US); ExxonMobil Upstream Research Company, Houston, TX (US)

(72) Inventors: Sandra Beverly Kolvick, Greenville, SC (US); Richard A. Huntington, Houston, TX (US); Franklin F. Mittricker, Jamul, CA (US)

(73) Assignees: General Electric Company, Schenectady, NY (US); ExxonMobil Upstream Research Company, Spring, TX (US)

( * ) Notice: Subject to any disclaimer, the term of this patent is extended or adjusted under 35 U.S.C. 154(b) by 1142 days.

(21) Appl. No.: 14/396,891

(22) PCT Filed: Apr. 19, 2013

(86) PCT No.: PCT/US2013/037466
§ 371 (c)(1),
(2) Date: Oct. 24, 2014

(87) PCT Pub. No.: WO2013/163045
PCT Pub. Date: Oct. 31, 2013

(65) Prior Publication Data
US 2015/0059350 A1 Mar. 5, 2015

Related U.S. Application Data

(63) Continuation-in-part of application No. 13/456,575, filed on Apr. 26, 2012, now Pat. No. 9,784,185.
(Continued)

(51) Int. Cl.
*F02C 3/34* (2006.01)
*F02C 7/141* (2006.01)
(Continued)

(52) U.S. Cl.
CPC ............... *F02C 3/34* (2013.01); *F02C 7/141* (2013.01); *F02C 7/18* (2013.01); *G05B 15/02* (2013.01); *Y02E 20/16* (2013.01); *Y02T 50/675* (2013.01)

(58) Field of Classification Search
CPC .... F02C 3/34; F02C 7/12; F02C 7/125; F02C 7/14; F02C 7/141; F02C 7/18; F02C 7/185; Y02E 20/16; Y02E 20/18; Y02E 20/185
(Continued)

(56) References Cited

U.S. PATENT DOCUMENTS 2,488,911 A 11/1949 Hepburn et al.
2,884,758 A 5/1959 Oberle
(Continued)

FOREIGN PATENT DOCUMENTS

CA 2231749 9/1998
CA 2645450 9/2007
(Continued)

OTHER PUBLICATIONS

DE DE 3413241 A1 English Translation.*
(Continued)

*Primary Examiner* — Jason Shanske
*Assistant Examiner* — Jessica Kebea
(74) *Attorney, Agent, or Firm* — Fletcher Yoder, P.C.

(57) ABSTRACT

A method includes generating an exhaust gas from combustion gases with a turbine; recirculating the exhaust gas along an exhaust recirculation flow path; reducing moisture within the exhaust gas along the exhaust recirculation path with an
(Continued)

exhaust gas processing system; providing the exhaust gas to a first exhaust gas inlet of an exhaust gas compressor for compression; and providing the exhaust gas from the exhaust recirculation path to a second exhaust gas inlet separate from the first exhaust gas inlet for cooling, preheating, sealing, or any combination thereof.

20 Claims, 9 Drawing Sheets

Related U.S. Application Data

(60) Provisional application No. 61/722,118, filed on Nov. 2, 2012, provisional application No. 61/722,115, filed on Nov. 2, 2012, provisional application No. 61/722,114, filed on Nov. 2, 2012, provisional application No. 61/722,111, filed on Nov. 2, 2012.

(51) Int. Cl.
F02C 7/18 (2006.01)
G05B 15/02 (2006.01)

(58) Field of Classification Search
USPC .................................................. 60/39.52
See application file for complete search history.

(56) References Cited

U.S. PATENT DOCUMENTS

| | | | |
|---|---|---|---|
| 3,631,672 | A | 1/1972 | Gentile et al. |
| 3,643,430 | A | 2/1972 | Emory et al. |
| 3,705,492 | A | 12/1972 | Vickers |
| 3,816,751 | A * | 6/1974 | Jampen ............ F01D 15/10 290/1 R |
| 3,841,382 | A | 10/1974 | Gravis et al. |
| 3,949,548 | A | 4/1976 | Lockwood |
| 4,018,046 | A | 4/1977 | Hurley |
| 4,043,395 | A | 8/1977 | Every et al. |
| 4,050,239 | A | 9/1977 | Kappler et al. |
| 4,066,214 | A | 1/1978 | Johnson |
| 4,077,206 | A | 3/1978 | Ayyagari |
| 4,085,578 | A | 4/1978 | Kydd |
| 4,092,095 | A | 5/1978 | Straitz |
| 4,101,294 | A | 7/1978 | Kimura |
| 4,112,676 | A | 9/1978 | DeCorso |
| 4,117,671 | A | 10/1978 | Neal et al. |
| 4,160,640 | A | 7/1979 | Maev et al. |
| 4,165,609 | A | 8/1979 | Rudolph |
| 4,171,349 | A | 10/1979 | Cucuiat et al. |
| 4,204,401 | A | 5/1980 | Earnest |
| 4,222,240 | A | 9/1980 | Castellano |
| 4,224,991 | A | 9/1980 | Sowa et al. |
| 4,236,378 | A | 12/1980 | Vogt |
| 4,253,301 | A | 3/1981 | Vogt |
| 4,271,664 | A | 6/1981 | Earnest |
| 4,344,486 | A | 8/1982 | Parrish |
| 4,345,426 | A | 8/1982 | Egnell et al. |
| 4,352,269 | A | 10/1982 | Dineen |
| 4,380,895 | A | 4/1983 | Adkins |
| 4,399,652 | A | 8/1983 | Cole et al. |
| 4,414,334 | A | 11/1983 | Hitzman |
| 4,434,613 | A | 3/1984 | Stahl |
| 4,435,153 | A | 3/1984 | Hashimoto et al. |
| 4,442,665 | A | 4/1984 | Fick et al. |
| 4,445,842 | A | 5/1984 | Syska |
| 4,479,484 | A | 10/1984 | Davis |
| 4,480,985 | A | 11/1984 | Davis |
| 4,488,865 | A | 12/1984 | Davis |
| 4,498,288 | A | 2/1985 | Vogt |
| 4,498,289 | A | 2/1985 | Osgerby |
| 4,528,811 | A | 7/1985 | Stahl |
| 4,543,784 | A | 10/1985 | Kirker |
| 4,548,034 | A | 10/1985 | Maguire |
| 4,561,245 | A | 12/1985 | Ball |
| 4,569,310 | A | 2/1986 | Davis |
| 4,577,462 | A | 3/1986 | Robertson |
| 4,602,614 | A | 7/1986 | Percival et al. |
| 4,606,721 | A | 8/1986 | Livingston |
| 4,613,299 | A | 9/1986 | Backheim |
| 4,637,792 | A | 1/1987 | Davis |
| 4,651,712 | A | 3/1987 | Davis |
| 4,653,278 | A | 3/1987 | Vinson et al. |
| 4,681,678 | A | 7/1987 | Leaseburge et al. |
| 4,684,465 | A | 8/1987 | Leaseburge et al. |
| 4,753,666 | A | 6/1988 | Pastor et al. |
| 4,762,543 | A | 8/1988 | Pantermuehl et al. |
| 4,817,387 | A | 4/1989 | Lashbrook |
| 4,858,428 | A | 8/1989 | Paul |
| 4,895,710 | A | 1/1990 | Hartmann et al. |
| 4,898,001 | A | 2/1990 | Kuroda et al. |
| 4,946,597 | A | 8/1990 | Sury |
| 4,976,100 | A | 12/1990 | Lee |
| 5,014,785 | A | 5/1991 | Puri et al. |
| 5,044,932 | A | 9/1991 | Martin et al. |
| 5,073,105 | A | 12/1991 | Martin et al. |
| 5,084,438 | A | 1/1992 | Matsubara et al. |
| 5,085,274 | A | 2/1992 | Puri et al. |
| 5,098,282 | A | 3/1992 | Schwartz et al. |
| 5,123,248 | A | 6/1992 | Monty et al. |
| 5,135,387 | A | 8/1992 | Martin et al. |
| 5,141,049 | A | 8/1992 | Larsen et al. |
| 5,142,866 | A | 9/1992 | Yanagihara et al. |
| 5,147,111 | A | 9/1992 | Montgomery |
| 5,154,596 | A | 10/1992 | Schwartz et al. |
| 5,183,232 | A | 2/1993 | Gale |
| 5,195,884 | A | 3/1993 | Schwartz et al. |
| 5,197,289 | A | 3/1993 | Glevicky et al. |
| 5,238,395 | A | 8/1993 | Schwartz et al. |
| 5,255,506 | A | 10/1993 | Wilkes et al. |
| 5,265,410 | A | 11/1993 | Hisatome |
| 5,271,905 | A | 12/1993 | Owen et al. |
| 5,275,552 | A | 1/1994 | Schwartz et al. |
| 5,295,350 | A | 3/1994 | Child et al. |
| 5,304,362 | A | 4/1994 | Madsen |
| 5,325,660 | A | 7/1994 | Taniguchi et al. |
| 5,332,036 | A | 7/1994 | Shirley et al. |
| 5,344,307 | A | 9/1994 | Schwartz et al. |
| 5,345,756 | A | 9/1994 | Jahnke et al. |
| 5,355,668 | A | 10/1994 | Weil et al. |
| 5,359,847 | A | 11/1994 | Pillsbury et al. |
| 5,361,586 | A | 11/1994 | McWhirter et al. |
| 5,388,395 | A | 2/1995 | Scharpf et al. |
| 5,394,688 | A | 3/1995 | Amos |
| 5,402,847 | A | 4/1995 | Wilson et al. |
| 5,444,971 | A | 8/1995 | Holenberger |
| 5,457,951 | A | 10/1995 | Johnson et al. |
| 5,458,481 | A | 10/1995 | Surbey et al. |
| 5,468,270 | A | 11/1995 | Borszynski |
| 5,490,378 | A | 2/1996 | Berger et al. |
| 5,542,840 | A | 8/1996 | Surbey et al. |
| 5,566,756 | A | 10/1996 | Chaback et al. |
| 5,572,862 | A | 11/1996 | Mowill |
| 5,581,998 | A | 12/1996 | Craig |
| 5,584,182 | A | 12/1996 | Althaus et al. |
| 5,590,518 | A | 1/1997 | Janes |
| 5,628,182 | A | 5/1997 | Mowill |
| 5,634,329 | A | 6/1997 | Andersson et al. |
| 5,638,675 | A | 6/1997 | Zysman et al. |
| 5,640,840 | A | 6/1997 | Briesch |
| 5,657,631 | A | 8/1997 | Androsov |
| 5,680,764 | A | 10/1997 | Viteri |
| 5,685,158 | A | 11/1997 | Lenahan et al. |
| 5,709,077 | A | 1/1998 | Beichel |
| 5,713,206 | A | 2/1998 | McWhirter et al. |
| 5,715,673 | A | 2/1998 | Beichel |
| 5,724,805 | A | 3/1998 | Golomb et al. |
| 5,725,054 | A | 3/1998 | Shayegi et al. |
| 5,740,786 | A | 4/1998 | Gartner |
| 5,743,079 | A | 4/1998 | Walsh et al. |
| 5,765,363 | A | 6/1998 | Mowill |
| 5,771,867 | A | 6/1998 | Amstutz et al. |
| 5,771,868 | A | 6/1998 | Khair |

(56) References Cited

U.S. PATENT DOCUMENTS

| | | |
|---|---|---|
| 5,775,091 A * | 7/1998 | Bannister ............... F01D 5/084 60/39.17 |
| 5,819,540 A | 10/1998 | Massarani |
| 5,832,712 A | 11/1998 | Ronning et al. |
| 5,836,164 A | 11/1998 | Tsukahara et al. |
| 5,839,283 A | 11/1998 | Dobbeling |
| 5,850,732 A | 12/1998 | Willis et al. |
| 5,894,720 A | 4/1999 | Willis et al. |
| 5,901,547 A | 5/1999 | Smith et al. |
| 5,924,275 A | 7/1999 | Cohen et al. |
| 5,930,990 A | 8/1999 | Zachary et al. |
| 5,937,634 A | 8/1999 | Etheridge et al. |
| 5,950,417 A | 9/1999 | Robertson et al. |
| 5,956,937 A | 9/1999 | Beichel |
| 5,968,349 A | 10/1999 | Duyvesteyn et al. |
| 5,974,780 A | 11/1999 | Santos |
| 5,992,388 A | 11/1999 | Seger |
| 6,016,658 A | 1/2000 | Willis et al. |
| 6,032,465 A | 3/2000 | Regnier |
| 6,035,641 A | 3/2000 | Lokhandwala |
| 6,062,026 A | 5/2000 | Woollenweber et al. |
| 6,079,974 A | 6/2000 | Thompson |
| 6,082,093 A | 7/2000 | Greenwood et al. |
| 6,089,855 A | 7/2000 | Becker et al. |
| 6,094,916 A | 8/2000 | Puri et al. |
| 6,101,983 A | 8/2000 | Anand et al. |
| 6,148,602 A | 11/2000 | Demetri |
| 6,170,264 B1 | 1/2001 | Viteri et al. |
| 6,183,241 B1 | 2/2001 | Bohn et al. |
| 6,201,029 B1 | 3/2001 | Waycuilis |
| 6,202,400 B1 | 3/2001 | Utamura et al. |
| 6,202,442 B1 | 3/2001 | Brugerolle |
| 6,202,574 B1 | 3/2001 | Liljedahl et al. |
| 6,209,325 B1 | 4/2001 | Alkabie |
| 6,216,459 B1 | 4/2001 | Daudel et al. |
| 6,216,549 B1 | 4/2001 | Davis et al. |
| 6,230,103 B1 | 5/2001 | Decorso et al. |
| 6,237,339 B1 | 5/2001 | Åsen et al. |
| 6,247,315 B1 | 6/2001 | Marin et al. |
| 6,247,316 B1 | 6/2001 | Viteri |
| 6,248,794 B1 | 6/2001 | Gieskes |
| 6,253,555 B1 | 7/2001 | Willis |
| 6,256,976 B1 | 7/2001 | Kataoka et al. |
| 6,256,994 B1 | 7/2001 | Dillon, IV |
| 6,263,659 B1 | 7/2001 | Dillon, IV et al. |
| 6,266,954 B1 | 7/2001 | McCallum et al. |
| 6,269,882 B1 | 8/2001 | Wellington et al. |
| 6,276,171 B1 | 8/2001 | Brugerolle |
| 6,282,901 B1 | 9/2001 | Marin et al. |
| 6,283,087 B1 | 9/2001 | Isaksen |
| 6,289,677 B1 | 9/2001 | Prociw et al. |
| 6,298,652 B1 | 10/2001 | Mittricker et al. |
| 6,298,654 B1 | 10/2001 | Vermes et al. |
| 6,298,664 B1 | 10/2001 | Åsen et al. |
| 6,301,888 B1 | 10/2001 | Gray |
| 6,301,889 B1 | 10/2001 | Gladden et al. |
| 6,305,929 B1 | 10/2001 | Chung et al. |
| 6,314,721 B1 | 11/2001 | Mathews et al. |
| 6,324,867 B1 | 12/2001 | Fanning et al. |
| 6,332,313 B1 | 12/2001 | Willis et al. |
| 6,345,493 B1 | 2/2002 | Smith et al. |
| 6,360,528 B1 | 3/2002 | Brausch et al. |
| 6,363,709 B2 | 4/2002 | Kataoka et al. |
| 6,367,258 B1 | 4/2002 | Wen et al. |
| 6,370,870 B1 | 4/2002 | Kamijo et al. |
| 6,374,591 B1 | 4/2002 | Johnson et al. |
| 6,374,594 B1 | 4/2002 | Kraft et al. |
| 6,383,461 B1 | 5/2002 | Lang |
| 6,389,814 B2 | 5/2002 | Viteri et al. |
| 6,405,536 B1 | 6/2002 | Ho et al. |
| 6,412,278 B1 | 7/2002 | Matthews |
| 6,412,302 B1 | 7/2002 | Foglietta |
| 6,412,559 B1 | 7/2002 | Gunter et al. |
| 6,418,725 B1 | 7/2002 | Maeda et al. |
| 6,429,020 B1 | 8/2002 | Thornton et al. |
| 6,449,954 B2 | 9/2002 | Bachmann |
| 6,450,256 B2 | 9/2002 | Mones |
| 6,461,147 B1 | 10/2002 | Sonju et al. |
| 6,467,270 B2 | 10/2002 | Mulloy et al. |
| 6,470,682 B2 | 10/2002 | Gray |
| 6,477,859 B2 | 11/2002 | Wong et al. |
| 6,484,503 B1 | 11/2002 | Raz |
| 6,484,507 B1 | 11/2002 | Pradt |
| 6,487,863 B1 | 12/2002 | Chen et al. |
| 6,499,990 B1 | 12/2002 | Zink et al. |
| 6,502,383 B1 | 1/2003 | Janardan et al. |
| 6,505,567 B1 | 1/2003 | Anderson et al. |
| 6,505,683 B2 | 1/2003 | Minkkinen et al. |
| 6,508,209 B1 | 1/2003 | Collier |
| 6,523,349 B2 | 2/2003 | Viteri |
| 6,532,745 B1 | 3/2003 | Neary |
| 6,539,716 B2 | 4/2003 | Finger et al. |
| 6,584,775 B1 | 7/2003 | Schneider et al. |
| 6,598,398 B2 | 7/2003 | Viteri et al. |
| 6,598,399 B2 | 7/2003 | Liebig |
| 6,598,402 B2 | 7/2003 | Kataoka et al. |
| 6,606,861 B2 | 8/2003 | Snyder |
| 6,612,291 B2 | 9/2003 | Sakamoto |
| 6,615,576 B2 | 9/2003 | Sheoran et al. |
| 6,615,589 B2 | 9/2003 | Allam et al. |
| 6,622,470 B2 | 9/2003 | Viteri et al. |
| 6,622,645 B2 | 9/2003 | Havlena |
| 6,637,183 B2 | 10/2003 | Viteri et al. |
| 6,644,041 B1 | 11/2003 | Eyermann |
| 6,655,150 B1 | 12/2003 | Åsen et al. |
| 6,668,541 B2 | 12/2003 | Rice et al. |
| 6,672,863 B2 | 1/2004 | Doebbeling et al. |
| 6,675,579 B1 | 1/2004 | Yang |
| 6,684,643 B2 | 2/2004 | Frutschi |
| 6,694,735 B2 | 2/2004 | Sumser et al. |
| 6,698,412 B2 | 3/2004 | Betta |
| 6,702,570 B2 | 3/2004 | Shah et al. |
| 6,722,436 B2 | 4/2004 | Krill |
| 6,725,665 B2 | 4/2004 | Tuschy et al. |
| 6,731,501 B1 | 5/2004 | Cheng |
| 6,732,531 B2 | 5/2004 | Dickey |
| 6,742,506 B1 | 6/2004 | Grandin |
| 6,743,829 B2 | 6/2004 | Fischer-Calderon et al. |
| 6,745,573 B2 | 6/2004 | Marin et al. |
| 6,745,624 B2 | 6/2004 | Porter et al. |
| 6,748,004 B2 | 6/2004 | Jepson |
| 6,752,620 B2 | 6/2004 | Heier et al. |
| 6,767,527 B1 | 7/2004 | Åsen et al. |
| 6,772,583 B2 | 8/2004 | Bland |
| 6,790,030 B2 | 9/2004 | Fischer et al. |
| 6,805,483 B2 | 10/2004 | Tomlinson et al. |
| 6,810,673 B2 | 11/2004 | Snyder |
| 6,813,889 B2 | 11/2004 | Inoue et al. |
| 6,817,187 B2 | 11/2004 | Yu |
| 6,820,428 B2 | 11/2004 | Wylie |
| 6,821,501 B2 | 11/2004 | Matzakos et al. |
| 6,823,852 B2 | 11/2004 | Collier |
| 6,824,710 B2 | 11/2004 | Viteri et al. |
| 6,826,912 B2 | 12/2004 | Levy et al. |
| 6,826,913 B2 | 12/2004 | Wright |
| 6,838,071 B1 | 1/2005 | Olsvik et al. |
| 6,851,413 B1 | 2/2005 | Tamol |
| 6,868,677 B2 | 3/2005 | Viteri et al. |
| 6,886,334 B2 | 5/2005 | Shirakawa |
| 6,887,069 B1 | 5/2005 | Thornton et al. |
| 6,899,859 B1 | 5/2005 | Olsvik |
| 6,901,760 B2 | 6/2005 | Dittmann et al. |
| 6,904,815 B2 | 6/2005 | Widmer |
| 6,907,737 B2 | 6/2005 | Mittricker et al. |
| 6,910,335 B2 | 6/2005 | Viteri et al. |
| 6,923,915 B2 | 8/2005 | Alford et al. |
| 6,939,130 B2 | 9/2005 | Abbasi et al. |
| 6,945,029 B2 | 9/2005 | Viteri |
| 6,945,052 B2 | 9/2005 | Frutschi et al. |
| 6,945,087 B2 | 9/2005 | Porter et al. |
| 6,945,089 B2 | 9/2005 | Barie et al. |
| 6,946,419 B2 | 9/2005 | Kaefer |
| 6,969,123 B2 | 11/2005 | Vinegar et al. |
| 6,971,242 B2 | 12/2005 | Boardman |

(56) References Cited

U.S. PATENT DOCUMENTS

| | | |
|---|---|---|
| 6,981,358 B2 | 1/2006 | Bellucci et al. |
| 6,988,549 B1 | 1/2006 | Babcock |
| 6,993,901 B2 | 2/2006 | Shirakawa |
| 6,993,916 B2 | 2/2006 | Johnson et al. |
| 6,994,491 B2 | 2/2006 | Kittle |
| 7,007,487 B2 | 3/2006 | Belokon et al. |
| 7,010,921 B2 | 3/2006 | Intile et al. |
| 7,011,154 B2 | 3/2006 | Maher et al. |
| 7,015,271 B2 | 3/2006 | Bice et al. |
| 7,032,388 B2 | 4/2006 | Healy |
| 7,040,400 B2 | 5/2006 | de Rouffignac et al. |
| 7,043,898 B2 | 5/2006 | Rago |
| 7,043,920 B2 | 5/2006 | Viteri et al. |
| 7,045,553 B2 | 5/2006 | Hershkowitz |
| 7,053,128 B2 | 5/2006 | Hershkowitz |
| 7,056,482 B2 | 6/2006 | Hakka et al. |
| 7,059,152 B2 | 6/2006 | Oakey et al. |
| 7,065,953 B1 | 6/2006 | Kopko |
| 7,065,972 B2 | 6/2006 | Zupanc et al. |
| 7,074,033 B2 | 7/2006 | Neary |
| 7,077,199 B2 | 7/2006 | Vinegar et al. |
| 7,089,743 B2 | 8/2006 | Frutschi et al. |
| 7,096,942 B1 | 8/2006 | de Rouffignac et al. |
| 7,097,925 B2 | 8/2006 | Keefer |
| 7,104,319 B2 | 9/2006 | Vinegar et al. |
| 7,104,784 B1 | 9/2006 | Hasegawa et al. |
| 7,124,589 B2 | 10/2006 | Neary |
| 7,137,256 B1 | 11/2006 | Stuttaford et al. |
| 7,137,623 B2 | 11/2006 | Mockry et al. |
| 7,143,572 B2 | 12/2006 | Ooka et al. |
| 7,143,606 B2 | 12/2006 | Tranier |
| 7,146,969 B2 | 12/2006 | Weirich |
| 7,147,461 B2 | 12/2006 | Neary |
| 7,148,261 B2 | 12/2006 | Hershkowitz et al. |
| 7,152,409 B2 | 12/2006 | Yee et al. |
| 7,162,875 B2 | 1/2007 | Fletcher et al. |
| 7,168,265 B2 | 1/2007 | Briscoe et al. |
| 7,168,488 B2 | 1/2007 | Olsvik et al. |
| 7,183,328 B2 | 2/2007 | Hershkowitz et al. |
| 7,185,497 B2 | 3/2007 | Dudebout et al. |
| 7,194,869 B2 | 3/2007 | McQuiggan et al. |
| 7,197,880 B2 | 4/2007 | Thornton et al. |
| 7,217,303 B2 | 5/2007 | Hershkowitz et al. |
| 7,225,623 B2 | 6/2007 | Koshoffer |
| 7,237,385 B2 | 7/2007 | Carrea |
| 7,284,362 B2 | 10/2007 | Marin et al. |
| 7,299,619 B2 | 11/2007 | Briesch et al. |
| 7,299,868 B2 | 11/2007 | Zapadinski |
| 7,302,801 B2 | 12/2007 | Chen |
| 7,305,817 B2 | 12/2007 | Blodgett et al. |
| 7,305,831 B2 | 12/2007 | Carrea et al. |
| 7,313,916 B2 | 1/2008 | Pellizzari |
| 7,318,317 B2 | 1/2008 | Carrea |
| 7,343,742 B2 | 3/2008 | Wimmer et al. |
| 7,353,655 B2 | 4/2008 | Bolis et al. |
| 7,357,857 B2 | 4/2008 | Hart et al. |
| 7,363,756 B2 | 4/2008 | Carrea et al. |
| 7,363,764 B2 | 4/2008 | Griffin et al. |
| 7,381,393 B2 | 6/2008 | Lynn |
| 7,401,577 B2 | 7/2008 | Saucedo et al. |
| 7,410,525 B1 | 8/2008 | Liu et al. |
| 7,416,137 B2 | 8/2008 | Hagen et al. |
| 7,434,384 B2 | 10/2008 | Lord et al. |
| 7,438,744 B2 | 10/2008 | Beaumont |
| 7,467,942 B2 | 12/2008 | Carroni et al. |
| 7,468,173 B2 | 12/2008 | Hughes et al. |
| 7,472,550 B2 | 1/2009 | Lear et al. |
| 7,481,048 B2 | 1/2009 | Harmon et al. |
| 7,481,275 B2 | 1/2009 | Olsvik et al. |
| 7,482,500 B2 | 1/2009 | Johann et al. |
| 7,485,761 B2 | 2/2009 | Schindler et al. |
| 7,488,857 B2 | 2/2009 | Johann et al. |
| 7,490,472 B2 | 2/2009 | Lynghjem et al. |
| 7,491,250 B2 | 2/2009 | Hershkowitz et al. |
| 7,492,054 B2 | 2/2009 | Catlin |
| 7,493,769 B2 | 2/2009 | Jangili |
| 7,498,009 B2 | 3/2009 | Leach et al. |
| 7,503,178 B2 | 3/2009 | Bucker et al. |
| 7,503,948 B2 | 3/2009 | Hershkowitz et al. |
| 7,506,501 B2 | 3/2009 | Anderson et al. |
| 7,513,099 B2 | 4/2009 | Nuding et al. |
| 7,513,100 B2 | 4/2009 | Motter et al. |
| 7,516,626 B2 | 4/2009 | Brox et al. |
| 7,520,134 B2 | 4/2009 | Durbin et al. |
| 7,523,603 B2 | 4/2009 | Hagen et al. |
| 7,536,252 B1 | 5/2009 | Hibshman et al. |
| 7,536,873 B2 | 5/2009 | Nohlen |
| 7,540,150 B2 | 6/2009 | Schmid et al. |
| 7,559,977 B2 | 7/2009 | Fleischer et al. |
| 7,562,519 B1 | 7/2009 | Harris et al. |
| 7,562,529 B2 | 7/2009 | Kuspert et al. |
| 7,566,394 B2 | 7/2009 | Koseoglu |
| 7,574,856 B2 | 8/2009 | Mak |
| 7,591,866 B2 | 9/2009 | Bose |
| 7,594,386 B2 | 9/2009 | Narayanan et al. |
| 7,610,752 B2 | 11/2009 | Betta et al. |
| 7,610,759 B2 | 11/2009 | Yoshida et al. |
| 7,611,681 B2 | 11/2009 | Kaefer |
| 7,614,352 B2 | 11/2009 | Anthony et al. |
| 7,618,606 B2 | 11/2009 | Fan et al. |
| 7,631,493 B2 | 12/2009 | Shirakawa et al. |
| 7,634,915 B2 | 12/2009 | Hoffmann et al. |
| 7,635,408 B2 | 12/2009 | Mak et al. |
| 7,637,093 B2 | 12/2009 | Rao |
| 7,644,573 B2 | 1/2010 | Smith et al. |
| 7,650,744 B2 | 1/2010 | Varatharajan et al. |
| 7,654,320 B2 | 2/2010 | Payton |
| 7,654,330 B2 | 2/2010 | Zubrin et al. |
| 7,655,071 B2 | 2/2010 | De Vreede |
| 7,670,135 B1 | 3/2010 | Zink et al. |
| 7,673,454 B2 | 3/2010 | Saito et al. |
| 7,673,685 B2 | 3/2010 | Shaw et al. |
| 7,674,443 B1 | 3/2010 | Davis |
| 7,677,309 B2 | 3/2010 | Shaw et al. |
| 7,681,394 B2 | 3/2010 | Haugen |
| 7,682,597 B2 | 3/2010 | Blumenfeld et al. |
| 7,690,204 B2 | 4/2010 | Drnevich et al. |
| 7,691,788 B2 | 4/2010 | Tan et al. |
| 7,695,703 B2 | 4/2010 | Sobolevskiy et al. |
| 7,717,173 B2 | 5/2010 | Grott |
| 7,721,543 B2 | 5/2010 | Massey et al. |
| 7,726,114 B2 | 6/2010 | Evulet |
| 7,734,408 B2 | 6/2010 | Shiraki |
| 7,739,864 B2 | 6/2010 | Finkenrath et al. |
| 7,749,311 B2 | 7/2010 | Saito et al. |
| 7,752,848 B2 | 7/2010 | Balan et al. |
| 7,752,850 B2 | 7/2010 | Laster et al. |
| 7,753,039 B2 | 7/2010 | Harima et al. |
| 7,753,972 B2 | 7/2010 | Zubrin et al. |
| 7,762,084 B2 | 7/2010 | Martis et al. |
| 7,763,163 B2 | 7/2010 | Koseoglu |
| 7,763,227 B2 | 7/2010 | Wang |
| 7,765,810 B2 | 8/2010 | Pfefferle |
| 7,788,897 B2 | 9/2010 | Campbell et al. |
| 7,789,159 B1 | 9/2010 | Bader |
| 7,789,658 B2 | 9/2010 | Towler et al. |
| 7,789,944 B2 | 9/2010 | Saito et al. |
| 7,793,494 B2 | 9/2010 | Wirth et al. |
| 7,802,434 B2 | 9/2010 | Varatharajan et al. |
| 7,815,873 B2 | 10/2010 | Sankaranarayanan et al. |
| 7,815,892 B2 | 10/2010 | Hershkowitz et al. |
| 7,819,951 B2 | 10/2010 | White et al. |
| 7,824,179 B2 | 11/2010 | Hasegawa et al. |
| 7,827,778 B2 | 11/2010 | Finkenrath et al. |
| 7,827,794 B1 | 11/2010 | Pronske et al. |
| 7,841,186 B2 | 11/2010 | So et al. |
| 7,845,406 B2 | 12/2010 | Nitschke |
| 7,846,401 B2 | 12/2010 | Hershkowitz et al. |
| 7,861,511 B2 | 1/2011 | Chillar et al. |
| 7,874,140 B2 | 1/2011 | Fan et al. |
| 7,874,350 B2 | 1/2011 | Pfefferle |
| 7,875,402 B2 | 1/2011 | Hershkowitz et al. |
| 7,882,692 B2 | 2/2011 | Pronske et al. |
| 7,886,522 B2 | 2/2011 | Kammel |

(56) References Cited

U.S. PATENT DOCUMENTS

| | | |
|---|---|---|
| 7,895,822 B2 | 3/2011 | Hoffmann et al. |
| 7,896,105 B2 | 3/2011 | Dupriest |
| 7,906,304 B2 | 3/2011 | Kohr |
| 7,909,898 B2 | 3/2011 | White et al. |
| 7,914,749 B2 | 3/2011 | Carstens et al. |
| 7,914,764 B2 | 3/2011 | Hershkowitz et al. |
| 7,918,906 B2 | 4/2011 | Zubrin et al. |
| 7,921,633 B2 | 4/2011 | Rising |
| 7,922,871 B2 | 4/2011 | Price et al. |
| 7,926,292 B2 | 4/2011 | Rabovitser et al. |
| 7,931,712 B2 | 4/2011 | Zubrin et al. |
| 7,931,731 B2 | 4/2011 | Van Heeringen et al. |
| 7,931,888 B2 | 4/2011 | Drnevich et al. |
| 7,934,926 B2 | 5/2011 | Kornbluth et al. |
| 7,942,003 B2 | 5/2011 | Baudoin et al. |
| 7,942,008 B2 | 5/2011 | Joshi et al. |
| 7,943,097 B2 | 5/2011 | Golden et al. |
| 7,955,403 B2 | 6/2011 | Ariyapadi et al. |
| 7,959,384 B2 | 6/2011 | Breisch |
| 7,966,822 B2 | 6/2011 | Myers et al. |
| 7,976,803 B2 | 7/2011 | Hooper et al. |
| 7,980,312 B1 | 7/2011 | Hill et al. |
| 7,985,399 B2 | 7/2011 | Drnevich et al. |
| 7,988,750 B2 | 8/2011 | Lee et al. |
| 8,001,789 B2 | 8/2011 | Vega et al. |
| 8,029,273 B2 | 10/2011 | Paschereit et al. |
| 8,036,813 B2 | 10/2011 | Tonetti et al. |
| 8,038,416 B2 | 10/2011 | Ono et al. |
| 8,038,746 B2 | 10/2011 | Clark |
| 8,038,773 B2 | 10/2011 | Ochs et al. |
| 8,046,986 B2 | 11/2011 | Chillar et al. |
| 8,047,007 B2 | 11/2011 | Zubrin et al. |
| 8,051,638 B2 | 11/2011 | Aljabari et al. |
| 8,061,120 B2 | 11/2011 | Hwang |
| 8,062,617 B2 | 11/2011 | Stakhev et al. |
| 8,065,870 B2 | 11/2011 | Jobson et al. |
| 8,065,874 B2 | 11/2011 | Fong et al. |
| 8,074,439 B2 | 12/2011 | Foret |
| 8,080,225 B2 | 12/2011 | Dickinson et al. |
| 8,083,474 B2 | 12/2011 | Hashimoto et al. |
| 8,097,230 B2 | 1/2012 | Mesters et al. |
| 8,101,146 B2 | 1/2012 | Fedeyko et al. |
| 8,105,559 B2 | 1/2012 | Melville et al. |
| 8,110,012 B2 | 2/2012 | Chiu et al. |
| 8,117,825 B2 | 2/2012 | Griffin et al. |
| 8,117,846 B2 | 2/2012 | Wilbraham |
| 8,127,558 B2 | 3/2012 | Bland et al. |
| 8,127,936 B2 | 3/2012 | Liu et al. |
| 8,127,937 B2 | 3/2012 | Liu et al. |
| 8,133,298 B2 | 3/2012 | Lanyi et al. |
| 8,166,766 B2 | 5/2012 | Draper |
| 8,167,960 B2 | 5/2012 | Gil |
| 8,176,982 B2 | 5/2012 | Gil et al. |
| 8,191,360 B2 | 6/2012 | Fong et al. |
| 8,191,361 B2 | 6/2012 | Fong et al. |
| 8,196,387 B2 | 6/2012 | Shah et al. |
| 8,196,413 B2 | 6/2012 | Mak |
| 8,201,402 B2 | 6/2012 | Fong et al. |
| 8,205,455 B2 | 6/2012 | Popovic |
| 8,206,669 B2 | 6/2012 | Schaffer et al. |
| 8,209,192 B2 | 6/2012 | Gil et al. |
| 8,215,105 B2 | 7/2012 | Fong et al. |
| 8,220,247 B2 | 7/2012 | Wijmans et al. |
| 8,220,248 B2 | 7/2012 | Wijmans et al. |
| 8,220,268 B2 | 7/2012 | Callas |
| 8,225,600 B2 | 7/2012 | Theis |
| 8,226,912 B2 | 7/2012 | Kloosterman et al. |
| 8,240,142 B2 | 8/2012 | Fong et al. |
| 8,240,153 B2 | 8/2012 | Childers et al. |
| 8,245,492 B2 | 8/2012 | Draper |
| 8,245,493 B2 | 8/2012 | Minto |
| 8,247,462 B2 | 8/2012 | Boshoff et al. |
| 8,257,476 B2 | 9/2012 | White et al. |
| 8,261,823 B1 | 9/2012 | Hill et al. |
| 8,262,343 B2 | 9/2012 | Hagen |
| 8,266,883 B2 | 9/2012 | Ouellet et al. |
| 8,266,913 B2 | 9/2012 | Snook et al. |
| 8,268,044 B2 | 9/2012 | Wright et al. |
| 8,281,596 B1 | 10/2012 | Rohrssen et al. |
| 8,316,665 B2 | 11/2012 | Mak |
| 8,316,784 B2 | 11/2012 | D'Agostini |
| 8,337,613 B2 | 12/2012 | Zauderer |
| 8,347,600 B2 | 1/2013 | Wichmann et al. |
| 8,348,551 B2 | 1/2013 | Baker et al. |
| 8,371,100 B2 | 2/2013 | Draper |
| 8,372,251 B2 | 2/2013 | Goller et al. |
| 8,377,184 B2 | 2/2013 | Fujikawa et al. |
| 8,377,401 B2 | 2/2013 | Darde et al. |
| 8,388,919 B2 | 3/2013 | Hooper et al. |
| 8,397,482 B2 | 3/2013 | Kraemer et al. |
| 8,398,757 B2 | 3/2013 | Iijima et al. |
| 8,409,307 B2 | 4/2013 | Drnevich et al. |
| 8,414,694 B2 | 4/2013 | Iijima et al. |
| 8,424,282 B2 | 4/2013 | Vollmer et al. |
| 8,424,601 B2 | 4/2013 | Betzer-Zilevitch |
| 8,436,489 B2 | 5/2013 | Stahlkopf et al. |
| 8,453,461 B2 | 6/2013 | Draper |
| 8,453,462 B2 | 6/2013 | Wichmann et al. |
| 8,453,583 B2 | 6/2013 | Malavasi et al. |
| 8,454,350 B2 | 6/2013 | Berry et al. |
| 8,475,160 B2 | 7/2013 | Campbell et al. |
| 8,539,749 B1* | 9/2013 | Wichmann ............... F02C 6/06 60/39.52 |
| 8,567,200 B2 | 10/2013 | Brook et al. |
| 8,616,294 B2 | 12/2013 | Zubrin et al. |
| 8,627,643 B2 | 1/2014 | Chillar et al. |
| 9,732,673 B2* | 8/2017 | Denton ................... F02C 1/007 |
| 9,784,185 B2* | 10/2017 | Kolvick .................. F02C 7/18 |
| 9,856,792 B2* | 1/2018 | Hellat ..................... F01D 5/141 |
| 2001/0000049 A1 | 3/2001 | Kataoka et al. |
| 2001/0029732 A1 | 10/2001 | Bachmann |
| 2001/0045090 A1 | 11/2001 | Gray |
| 2002/0043063 A1 | 4/2002 | Kataoka et al. |
| 2002/0053207 A1 | 5/2002 | Finger et al. |
| 2002/0069648 A1 | 6/2002 | Levy et al. |
| 2002/0187449 A1 | 12/2002 | Doebbeling et al. |
| 2003/0005698 A1 | 1/2003 | Keller |
| 2003/0131582 A1 | 7/2003 | Anderson et al. |
| 2003/0134241 A1 | 7/2003 | Marin et al. |
| 2003/0221409 A1 | 12/2003 | McGowan |
| 2004/0006994 A1 | 1/2004 | Walsh et al. |
| 2004/0017958 A1* | 1/2004 | Bradshaw ............... F01D 9/065 384/581 |
| 2004/0068981 A1 | 4/2004 | Siefker et al. |
| 2004/0166034 A1 | 8/2004 | Kaefer |
| 2004/0170559 A1 | 9/2004 | Hershkowitz et al. |
| 2004/0223408 A1 | 11/2004 | Mathys et al. |
| 2004/0238654 A1 | 12/2004 | Hagen et al. |
| 2005/0028529 A1 | 2/2005 | Bartlett et al. |
| 2005/0144961 A1 | 7/2005 | Colibaba-Evulet et al. |
| 2005/0197267 A1 | 9/2005 | Zaki et al. |
| 2005/0229585 A1 | 10/2005 | Webster |
| 2005/0236602 A1 | 10/2005 | Viteri et al. |
| 2006/0053800 A1 | 3/2006 | Orlando et al. |
| 2006/0112675 A1 | 6/2006 | Anderson et al. |
| 2006/0158961 A1 | 7/2006 | Ruscheweyh et al. |
| 2006/0183009 A1 | 8/2006 | Berlowitz et al. |
| 2006/0196812 A1 | 9/2006 | Beetge et al. |
| 2006/0248888 A1 | 11/2006 | Geskes |
| 2007/0000242 A1 | 1/2007 | Harmon et al. |
| 2007/0044475 A1 | 3/2007 | Leser et al. |
| 2007/0044479 A1 | 3/2007 | Brandt et al. |
| 2007/0089425 A1 | 4/2007 | Motter et al. |
| 2007/0107430 A1 | 5/2007 | Schmid et al. |
| 2007/0144747 A1 | 6/2007 | Steinberg |
| 2007/0231233 A1 | 10/2007 | Bose |
| 2007/0234702 A1 | 10/2007 | Hagen et al. |
| 2007/0245736 A1 | 10/2007 | Barnicki |
| 2007/0249738 A1 | 10/2007 | Haynes et al. |
| 2007/0272201 A1 | 11/2007 | Amano et al. |
| 2008/0000229 A1 | 1/2008 | Kuspert et al. |
| 2008/0006561 A1 | 1/2008 | Moran et al. |
| 2008/0010967 A1 | 1/2008 | Griffin et al. |
| 2008/0034727 A1 | 2/2008 | Sutikno |

(56) References Cited

U.S. PATENT DOCUMENTS

| | | |
|---|---|---|
| 2008/0038598 A1 | 2/2008 | Berlowitz et al. |
| 2008/0047280 A1 | 2/2008 | Dubar |
| 2008/0066443 A1 | 3/2008 | Frutschi et al. |
| 2008/0115478 A1 | 5/2008 | Sullivan |
| 2008/0118310 A1 | 5/2008 | Graham |
| 2008/0124180 A1 | 5/2008 | Breisch |
| 2008/0127632 A1 | 6/2008 | Finkenrath et al. |
| 2008/0155984 A1 | 7/2008 | Liu et al. |
| 2008/0178611 A1 | 7/2008 | Ding |
| 2008/0202123 A1 | 8/2008 | Sullivan et al. |
| 2008/0223038 A1 | 9/2008 | Lutz et al. |
| 2008/0250795 A1 | 10/2008 | Katdare et al. |
| 2008/0251234 A1 | 10/2008 | Wilson et al. |
| 2008/0290719 A1 | 11/2008 | Kaminsky et al. |
| 2008/0309087 A1 | 12/2008 | Evulet et al. |
| 2009/0000762 A1 | 1/2009 | Wilson et al. |
| 2009/0025390 A1 | 1/2009 | Christensen et al. |
| 2009/0038247 A1 | 2/2009 | Taylor et al. |
| 2009/0056342 A1* | 3/2009 | Kirzhner ............ F01D 25/12 60/772 |
| 2009/0064653 A1 | 3/2009 | Hagen et al. |
| 2009/0071166 A1 | 3/2009 | Hagen et al. |
| 2009/0107141 A1* | 4/2009 | Chillar ............... F02C 1/08 60/605.2 |
| 2009/0117024 A1 | 5/2009 | Weedon et al. |
| 2009/0120087 A1 | 5/2009 | Sumser et al. |
| 2009/0157230 A1 | 6/2009 | Hibshman et al. |
| 2009/0193809 A1 | 8/2009 | Schroder et al. |
| 2009/0205334 A1* | 8/2009 | Aljabari ............. F02C 1/08 60/605.2 |
| 2009/0218821 A1* | 9/2009 | ElKady ............. F01K 23/10 290/52 |
| 2009/0223227 A1 | 9/2009 | Lipinski et al. |
| 2009/0229263 A1 | 9/2009 | Ouellet et al. |
| 2009/0235637 A1 | 9/2009 | Foret |
| 2009/0241506 A1 | 10/2009 | Nilsson |
| 2009/0255242 A1 | 10/2009 | Paterson et al. |
| 2009/0262599 A1 | 10/2009 | Kohrs et al. |
| 2009/0284013 A1* | 11/2009 | Anand ............. B01D 53/8625 290/52 |
| 2009/0301054 A1 | 12/2009 | Simpson et al. |
| 2009/0301099 A1 | 12/2009 | Nigro |
| 2010/0003123 A1 | 1/2010 | Smith |
| 2010/0018218 A1 | 1/2010 | Riley et al. |
| 2010/0058732 A1 | 3/2010 | Kaufmann et al. |
| 2010/0071878 A1 | 3/2010 | Gilchrist, II et al. |
| 2010/0115960 A1 | 5/2010 | Brautsch et al. |
| 2010/0126176 A1 | 5/2010 | Kim |
| 2010/0126906 A1 | 5/2010 | Sury |
| 2010/0162703 A1 | 7/2010 | Li et al. |
| 2010/0170253 A1 | 7/2010 | Berry et al. |
| 2010/0180565 A1* | 7/2010 | Draper ............... F02C 1/007 60/39.52 |
| 2010/0247292 A1* | 9/2010 | Davis, Jr. ............ F01D 5/081 415/144 |
| 2010/0300102 A1 | 12/2010 | Bathina et al. |
| 2010/0310439 A1 | 12/2010 | Brok et al. |
| 2010/0322759 A1 | 12/2010 | Tanioka |
| 2010/0326084 A1 | 12/2010 | Anderson et al. |
| 2011/0000221 A1 | 1/2011 | Minta et al. |
| 2011/0000671 A1 | 1/2011 | Hershkowitz et al. |
| 2011/0036082 A1 | 2/2011 | Collinot |
| 2011/0048002 A1 | 3/2011 | Taylor et al. |
| 2011/0048010 A1 | 3/2011 | Balcezak et al. |
| 2011/0072779 A1 | 3/2011 | ELKady et al. |
| 2011/0088379 A1 | 4/2011 | Nanda |
| 2011/0110759 A1 | 5/2011 | Sanchez et al. |
| 2011/0126512 A1 | 6/2011 | Anderson |
| 2011/0138766 A1 | 6/2011 | ELKady et al. |
| 2011/0138819 A1* | 6/2011 | Tanimura ........... F01D 25/30 60/796 |
| 2011/0146282 A1* | 6/2011 | Roberts ............. C10G 21/20 60/690 |
| 2011/0162353 A1 | 7/2011 | Vanvolsem et al. |
| 2011/0205837 A1 | 8/2011 | Gentgen |
| 2011/0226010 A1 | 9/2011 | Baxter |
| 2011/0227346 A1 | 9/2011 | Klenven |
| 2011/0232545 A1 | 9/2011 | Clements |
| 2011/0239653 A1 | 10/2011 | Valeev et al. |
| 2011/0265447 A1 | 11/2011 | Cunningham |
| 2011/0300493 A1 | 12/2011 | Mittricker et al. |
| 2012/0023954 A1 | 2/2012 | Wichmann |
| 2012/0023955 A1 | 2/2012 | Draper |
| 2012/0023956 A1* | 2/2012 | Popovic ............. F02C 3/34 60/772 |
| 2012/0023957 A1 | 2/2012 | Draper et al. |
| 2012/0023958 A1 | 2/2012 | Snook et al. |
| 2012/0023960 A1* | 2/2012 | Minto ............... F02C 3/34 60/772 |
| 2012/0023962 A1 | 2/2012 | Wichmann et al. |
| 2012/0023963 A1 | 2/2012 | Wichmann et al. |
| 2012/0023966 A1 | 2/2012 | Ouellet et al. |
| 2012/0031581 A1 | 2/2012 | Chillar et al. |
| 2012/0032810 A1 | 2/2012 | Chillar et al. |
| 2012/0085100 A1 | 4/2012 | Hughes et al. |
| 2012/0096870 A1 | 4/2012 | Wichmann et al. |
| 2012/0119512 A1 | 5/2012 | Draper |
| 2012/0131925 A1 | 5/2012 | Mittricker et al. |
| 2012/0144837 A1 | 6/2012 | Rasmussen et al. |
| 2012/0180493 A1* | 7/2012 | Snook ............... F01D 5/081 60/772 |
| 2012/0185144 A1 | 7/2012 | Draper |
| 2012/0192565 A1 | 8/2012 | Tretyakov et al. |
| 2012/0210723 A1* | 8/2012 | Wettstein ............ F02C 3/34 60/772 |
| 2012/0240590 A1* | 9/2012 | Hellat ............... F01D 25/08 60/772 |
| 2012/0247105 A1 | 10/2012 | Nelson et al. |
| 2012/0260660 A1 | 10/2012 | Kraemer et al. |
| 2013/0086916 A1 | 4/2013 | Oelfke et al. |
| 2013/0086917 A1 | 4/2013 | Slobodyanskiy et al. |
| 2013/0091853 A1 | 4/2013 | Denton et al. |
| 2013/0091854 A1 | 4/2013 | Gupta et al. |
| 2013/0104562 A1 | 5/2013 | Oelfke et al. |
| 2013/0104563 A1 | 5/2013 | Oelfke et al. |
| 2013/0125554 A1 | 5/2013 | Mittricker et al. |
| 2013/0125555 A1 | 5/2013 | Mittricker et al. |
| 2013/0232980 A1 | 9/2013 | Chen et al. |
| 2013/0269310 A1 | 10/2013 | Wichmann et al. |
| 2013/0269311 A1 | 10/2013 | Wichmann et al. |
| 2013/0269355 A1 | 10/2013 | Wichmann et al. |
| 2013/0269356 A1 | 10/2013 | Butkiewicz et al. |
| 2013/0269357 A1* | 10/2013 | Wichmann ............ F02C 3/34 60/772 |
| 2013/0269358 A1 | 10/2013 | Wichmann et al. |
| 2013/0269360 A1 | 10/2013 | Wichmann et al. |
| 2013/0269361 A1 | 10/2013 | Wichmann et al. |
| 2013/0269362 A1 | 10/2013 | Wichmann et al. |
| 2013/0283808 A1* | 10/2013 | Kolvick ............. F02C 7/18 60/772 |
| 2014/0000271 A1 | 1/2014 | Mittricker et al. |
| 2014/0000273 A1 | 1/2014 | Mittricker et al. |
| 2014/0007590 A1 | 1/2014 | Huntington et al. |
| 2014/0013766 A1 | 1/2014 | Mittricker et al. |
| 2014/0020398 A1 | 1/2014 | Mittricker et al. |
| 2014/0060073 A1 | 3/2014 | Slobodyanskiy et al. |
| 2014/0123620 A1 | 5/2014 | Huntington et al. |
| 2014/0123624 A1 | 5/2014 | Minto |
| 2014/0123659 A1* | 5/2014 | Biyani ............... F01D 25/14 60/772 |
| 2014/0123660 A1 | 5/2014 | Stoia et al. |
| 2014/0123668 A1 | 5/2014 | Huntington et al. |
| 2014/0123669 A1 | 5/2014 | Huntington et al. |
| 2014/0123672 A1 | 5/2014 | Huntington et al. |
| 2014/0150445 A1 | 6/2014 | Huntington et al. |
| 2014/0182298 A1 | 7/2014 | Krull et al. |
| 2014/0182299 A1 | 7/2014 | Woodall et al. |
| 2014/0182301 A1 | 7/2014 | Angelyn et al. |
| 2014/0182302 A1 | 7/2014 | Angelyn et al. |
| 2014/0182303 A1 | 7/2014 | Angelyn et al. |
| 2014/0182304 A1 | 7/2014 | Angelyn et al. |
| 2014/0182305 A1 | 7/2014 | Angelyn et al. |

(56) References Cited

U.S. PATENT DOCUMENTS

| | | | |
|---|---|---|---|
| 2014/0196464 A1 | 7/2014 | Biyani et al. | |
| 2014/0216011 A1 | 8/2014 | Muthaiah et al. | |
| 2014/0250908 A1* | 9/2014 | Huntington | F02C 9/00 |
| | | | 60/776 |
| 2015/0000292 A1 | 1/2015 | Subramaniyan | |
| 2015/0000293 A1 | 1/2015 | Thatcher et al. | |
| 2015/0000294 A1 | 1/2015 | Minto et al. | |
| 2015/0000299 A1 | 1/2015 | Zuo et al. | |
| 2015/0033748 A1 | 2/2015 | Vaezi | |
| 2015/0033749 A1 | 2/2015 | Slobodyanskiy et al. | |
| 2015/0033751 A1 | 2/2015 | Andrew | |
| 2015/0033757 A1 | 2/2015 | White et al. | |
| 2015/0040574 A1 | 2/2015 | Wichmann et al. | |
| 2015/0059350 A1* | 3/2015 | Kolvick | F02C 3/34 |
| | | | 60/772 |
| 2015/0075171 A1 | 3/2015 | Sokolov et al. | |
| 2015/0152791 A1 | 6/2015 | White | |
| 2015/0198089 A1 | 7/2015 | Muthaiah et al. | |
| 2015/0204239 A1 | 7/2015 | Minto et al. | |
| 2015/0214879 A1 | 7/2015 | Huntington et al. | |
| 2015/0226133 A1 | 8/2015 | Minto et al. | |

FOREIGN PATENT DOCUMENTS

| | | | |
|---|---|---|---|
| CN | 101424216 A | 5/2009 | |
| DE | 3413241 A1 * | 6/1985 | F02C 3/22 |
| EP | 0770771 | 5/1997 | |
| EP | 2119892 A2 | 11/2009 | |
| EP | 2636870 A1 * | 9/2013 | F02C 3/30 |
| GB | 0776269 | 6/1957 | |
| GB | 2117053 | 10/1983 | |
| JP | 03-145523 A | 6/1991 | |
| JP | 2009062981 A | 3/2009 | |
| JP | 2009108848 A | 5/2009 | |
| JP | 2009150390 A | 7/2009 | |
| JP | 2009275702 A | 11/2009 | |
| JP | 2010510897 A | 4/2010 | |
| JP | 20100071280 A | 4/2010 | |
| WO | WO1999006674 | 2/1999 | |
| WO | WO1999063210 | 12/1999 | |
| WO | WO2007068682 | 6/2007 | |
| WO | WO2008142009 | 11/2008 | |
| WO | WO2011003606 | 1/2011 | |
| WO | 2011026732 A1 | 3/2011 | |
| WO | WO2012003489 | 1/2012 | |
| WO | WO2012128928 | 9/2012 | |
| WO | WO2012128929 | 9/2012 | |
| WO | WO2012170114 | 12/2012 | |
| WO | WO2013147632 | 10/2013 | |
| WO | WO2013147633 | 10/2013 | |
| WO | WO2013155214 | 10/2013 | |
| WO | WO2013163045 | 10/2013 | |
| WO | WO2014071118 | 5/2014 | |
| WO | WO2014071215 | 5/2014 | |
| WO | WO2014133406 | 9/2014 | |

OTHER PUBLICATIONS

U.S. Appl. No. 14/771,450, filed Feb. 28, 2013, Valeev et al.
U.S. Appl. No. 14/067,552, filed Sep. 9, 2014, Huntington et al.
U.S. Appl. No. 14/553,458, filed Nov. 25, 2014, Huntington et al.
U.S. Appl. No. 14/599,750, filed Jan. 19, 2015, O'Dea et al.
U.S. Appl. No. 14/712,723, filed May 14, 2015, Manchikanti et al.
U.S. Appl. No. 14/726,001, filed May 29, 2015, Della-Fera et al.
U.S. Appl. No. 14/741,189, filed Jun. 16, 2015, Minto et al.
U.S. Appl. No. 14/745,095, filed Jun. 19, 2015, Minto et al.
Ahmed, S. et al. (1998) "Catalytic Partial Oxidation Reforming of Hydrocarbon Fuels," 1998 Fuel Cell Seminar, 7 pgs.
Air Products and Chemicals, Inc. (2008) "Air Separation Technology—Ion Transport Membrane (ITM)," www.airproducts.com/ASUsales, 3 pgs.

Air Products and Chemicals, Inc. (2011) "Air Separation Technology Ion Transport Membrane (ITM)," www.airproducts.com/gasification, 4 pgs.
Anderson, R. E. (2006) "Durability and Reliability Demonstration of a Near-Zero-Emission Gas-Fired Power Plant," California Energy Comm., CEC 500-2006-074, 80 pgs.
Baxter, E. et al. (2003) "Fabricate and Test an Advanced Non-Polluting Turbine Drive Gas Generator," U. S. Dept. of Energy, Nat'l Energy Tech. Lab., DE-FC26-00NT 40804, 51 pgs.
Bolland, O. et al. (1998) "Removal of CO2 From Gas Turbine Power Plants Evaluation of Pre-and Postcombustion Methods," SINTEF Group, www.energy.sintef.no/publ/xergi/98/3/art-8engelsk.htm, 11 pgs.
BP Press Release (2006) "BP and Edison Mission Group Plan Major Hydrogen Power Project for California," www.bp.com/hydrogenpower, 2 pgs.
Bryngelsson, M. et al. (2005) "Feasibility Study of $CO_2$ Removal From Pressurized Flue Gas in a Fully Fired Combined Cycle—The Sargas Project," KTH —Royal Institute of Technology, Dept. of Chemical Engineering and Technology, 9 pgs.
Clark, Hal (2002) "Development of a Unique Gas Generator for a Non-Polluting Power Plant," California Energy Commission Feasibility Analysis, P500-02-011F, 42 pgs.
Foy, Kirsten et al. (2005) "Comparison of Ion Transport Membranes" Fourth Annual Conference on Carbon Capture and Sequestration, DOE/NETL; 11 pgs.
Cho, J. H. et al. (2005) "Marrying LNG and Power Generation," Energy Markets; 10, 8; ABI/INFORM Trade & Industry, 5 pgs.
Ciulia, Vincent. (2001-2003) "Auto Repair. How the Engine Works," http://autorepair.about.com/cs/generalinfo/a/aa060500a.htm, 1 page.
Corti, A. et al. (1988) "Athabasca Mineable Oil Sands: The RTR/Gulf Extraction Process Theoretical Model of Bitumen Detachment," $4^{th}$ UNITAR/UNDP Int'l Conf. on Heavy Crude and Tar Sands Proceedings, v.5, paper No. 81, Edmonton, AB, Canada, 4 pgs.
Science Clarified (2012) "Cryogenics," http://www.scienceclarified.com/Co-Di/Cryogenics.html; 6 pgs.
Defrate, L. A. et al. (1959) "Optimum Design of Ejector Using Digital Computers" Chem. Eng. Prog. Symp. Ser., 55 (21), 12 pgs.
Ditaranto, M. et al. (2006) "Combustion Instabilities in Sudden Expansion Oxy-Fuel Flames," ScienceDirect, Combustion and Flame, v.146, 20 pgs.
Elwell, L. C. et al. (2005) "Technical Overview of Carbon Dioxide Capture Technologies for Coal-Fired Power Plants," MPR Associates, Inc., www.mpr.com/uploads/news/co2-capture-coal-fired.pdf, 15 pgs.
Eriksson, Sara. (2005) "Development of Methane Oxidation Catalysts for Different Gas Turbine Combustor Concepts." KTH—The Royal Institute of Technology, Department of Chemical Engineering and Technology, Chemical Technology, Licentiate Thesis, Stockholm Sweden; 45 pgs.
Ertesvag, I. S. et al. (2005) "Exergy Analysis of a Gas-Turbine Combined-Cycle Power Plant With Precombustion $CO_2$ Capture," Elsevier, 35 pgs.
Elkady, Ahmed. M. et al. (2009) "Application of Exhaust Gas Recirculation in a DLN F-Class Combustion System for Postcombustion Carbon Capture," ASME J. Engineering for Gas Turbines and Power, vol. 131, 6 pgs.
Evulet, Andrei T. et al. (2009) "On the Performance and Operability of GE's Dry Low $NO_x$ Combustors utilizing Exhaust Gas Recirculation for Post-Combustion Carbon Capture" Energy Procedia I, 8 pgs.
Caldwell Energy Company (2011) "Wet Compression"; IGTI 2011—CTIC Wet Compression, http://www.turbineinletcooling.org/resources/papers/CTIC_WetCompression_Shepherd_ASMETurboExpo2011.pdf , 22 pgs.
Luby, P. et al. (2003) "Zero Carbon Power Generation: IGCC as the Premium Option," Powergen International, 19 pgs.
Macadam, S. et al. (2007) "Coal-Based Oxy-Fuel System Evaluation and Combustor Development," Clean Energy Systems, Inc.; presented at the $2^{nd}$ International Freiberg Conference on IGCC & XtL Technologies, 6 pgs.
Morehead, H. (2007) "Siemens Global Gasification and IGCC Update," Siemens, Coal-Gen, 17 pgs.

(56) References Cited

OTHER PUBLICATIONS

Nanda, R. et al. (2007) "Utilizing Air Based Technologies as Heat Source for LNG Vaporization," presented at the 86$^{th}$ Annual convention of the Gas Processors of America (GPA 2007), , San Antonio, TX; 13 pgs.

Reeves, S. R. (2001) "Geological Sequestration of $CO_2$ in Deep, Unmineable Coalbeds: An Integrated Research and Commercial-Scale Field Demonstration Project," SPE 71749; presented at the 2001 SPE Annual Technical Conference and Exhibition, New Orleans, Louisiana, 10 pgs.

Reeves, S. R. (2003) "Enhanced Coalbed Methane Recovery," Society of Petroleum Engineers 101466-DL; SPE Distinguished Lecture Series, 8 pgs.

Richards, Geo A., et al. (2001) "Advanced Steam Generators," National Energy Technology Lab., Pittsburgh, PA, and Morgantown. WV; NASA Glenn Research Center (US), 7 pgs.

Rosetta, M. J. et al. (2006) "Integrating Ambient Air Vaporization Technology with Waste Heat Recovery—A Fresh Approach to LNG Vaporization," presented at the 85$^{th}$ annual convention of the Gas Processors of America (GPA 2006), Grapevine, Texas, 22 pgs.

Snarheim, D. et al. (2006) "Control Design for a Gas Turbine Cycle With $CO_2$ Capture Capabilities," Modeling, Identification and Control, vol. 00; presented at the 16$^{th}$ IFAC World Congress, Prague, Czech Republic, 10 pgs.

Ulfsnes, R. E. et al. (2003) "Investigation of Physical Properties for $CO_2/H_2O$ Mixtures for use in Semi-Closed $O_2/CO_2$ Gas Turbine Cycle With $CO_2$-Capture," Department of Energy and Process Eng., Norwegian Univ. of Science and Technology, 9 pgs.

Van Hemert, P. et al. (2006) "Adsorption of Carbon Dioxide and a Hydrogen-Carbon Dioxide Mixture," Intn'l Coalbed Methane Symposium (Tuscaloosa, AL) Paper 0615, 9 pgs.

Zhu, J. et al. (2002) "Recovery of Coalbed Methane by Gas Injection," Society of Petroleum Engineers 75255; presented at the 2002 SPE Annual Technical Conference and Exhibition, Tulsa, Oklahoma, 15 pgs.

CN First Office Action with English Translation; Application No. CN201380033851.X; dated Dec. 1, 2015; 24 pages.

AU Patent Examination Report No. 1; Application No. AU2013252625; dated Dec. 11, 2015; 3 pages.

Japanese Office Action for JP Application No. 2015-509053 dated Jan. 30, 2017; 4 Pages.

Japanese Office Action for JP Application No. 2015-509053 dated Jun. 19, 2017; 5 Pages.

Japanese Office Action/Decision of Grant; Application No. JP 2015-509053; dated Jan. 9, 2018; 3 pages.

\* cited by examiner

SYSTEM AND METHOD OF RECIRCULATING EXHAUST GAS FOR USE IN A PLURALITY OF FLOW PATHS IN A GAS TURBINE ENGINE

CROSS-REFERENCE TO RELATED APPLICATIONS

This application is a U.S. National Stage Application of International Application No. PCT/US13/37466, entitled "SYSTEM AND METHOD OF RECIRCULATING EXHAUST GAS FOR USE IN A PLURALITY OF FLOW PATHS IN A GAS TURBINE ENGINE," filed Apr. 19, 2013, which claims priority to and benefit of U.S. Non-Provisional patent application Ser. No. 13/456,575, entitled "SYSTEM AND METHOD FOR COOLING A GAS TURBINE WITH AN EXHAUST GAS PROVIDED BY THE GAS TURBINE," filed on Apr. 26, 2012, U.S. Provisional Patent Application No. 61/722,118, entitled "SYSTEM AND METHOD FOR DIFFUSION COMBUSTION IN A STOICHIOMETRIC EXHAUST GAS RECIRCULATION GAS TURBINE SYSTEM," filed on Nov. 2, 2012, U.S. Provisional Patent Application No. 61/722,115, entitled "SYSTEM AND METHOD FOR DIFFUSION COMBUSTION WITH FUEL-DILUENT MIXING IN A STOICHIOMETRIC EXHAUST GAS RECIRCULATION GAS TURBINE SYSTEM," filed on Nov. 2, 2012, U.S. Provisional Patent Application No. 61/722,114, entitled "SYSTEM AND METHOD FOR DIFFUSION COMBUSTION WITH OXIDANT-DILUENT MIXING IN A STOICHIOMETRIC EXHAUST GAS RECIRCULATION GAS TURBINE SYSTEM," filed on Nov. 2, 2012, and U.S. Provisional Patent Application No. 61/722,111, entitled "SYSTEM AND METHOD FOR LOAD CONTROL WITH DIFFUSION COMBUSTION IN A STOICHIOMETRIC EXHAUST GAS RECIRCULATION GAS TURBINE SYSTEM," filed on Nov. 2, 2012, all of which are herein incorporated by reference in their entirety for all purposes.

BACKGROUND

The subject matter disclosed herein relates to gas turbine engines.

Gas turbine engines are used in a wide variety of applications, such as power generation, aircraft, and various machinery. Gas turbine engines generally combust a fuel with an oxidant (e.g., air) in a combustor section to generate hot combustion products, which then drive one or more turbine stages of a turbine section. The turbine stages, when driven by the hot combustion products, transfer rotational power to a shaft. The rotating shaft, in turn, drives one or more compressor stages of a compressor section to compress oxidant for intake into the combustor section, and can also drive an electrical generator to produce electrical energy.

In certain instances, the temperature of combustion within the combustor section may be at levels suitable for oxidizing nitrogenous and sulfur-based species, which can produce nitrous oxides (hereinafter $NO_x$), and sulfur oxides (hereinafter $SO_x$), respectively, in the hot combustion products. These oxidized by-products are generally undesirable, and can render exhaust gases generated from the hot combustion products unusable for further applications.

In addition, because the products of combustion have a relatively high temperature, components that they contact may, in turn, become heated. This heating can, in some instances, result in thermal expansion of the components. When such thermal expansion occurs in moving parts, a clearance between the moving parts and stationary parts can be affected.

BRIEF DESCRIPTION

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

In a first embodiment, a system includes a gas turbine system. The gas turbine system includes a turbine combustor; a turbine driven by combustion products from the turbine combustor; and an exhaust gas compressor driven by the turbine. The exhaust gas compressor is configured to compress and supply an exhaust gas to the turbine combustor. The gas turbine system also includes an exhaust gas recirculation (EGR) system. The EGR system is configured to recirculate the exhaust gas along one or more exhaust recirculation paths from the turbine to first and second exhaust gas inlets of the gas turbine system, and the exhaust recirculation system includes a scrubbing system and a moisture separator upstream of at least the second exhaust gas inlet. The first exhaust gas inlet enables the exhaust gas compressor to intake the exhaust gas for exhaust gas compression, and the second exhaust gas inlet is separate from the first exhaust gas inlet.

In another embodiment, a method includes: generating an exhaust gas from combustion gases with a turbine; recirculating the exhaust gas along an exhaust recirculation flow path; reducing moisture within the exhaust gas along the exhaust recirculation path with an exhaust gas processing system; providing the exhaust gas to a first exhaust gas inlet of an exhaust gas compressor for compression; and providing the exhaust gas from the exhaust recirculation path to a second exhaust gas inlet separate from the first exhaust gas inlet for temperature control, clearance control, pressure control, sealing, or any combination thereof.

In a further embodiment, a system, includes: a control system having: one or more tangible, non-transitory, machine readable media collectively storing one or more sets of instructions; and one or more processing devices configured to execute the one or more sets of instructions to: receive feedback indicative of a parameter of a turbine of an exhaust gas recirculation gas turbine (EGR GT) system, an exhaust gas compressor of the EGR GT system, or another component of the system, or any combination thereof; and as a result of the feedback, adjust an exhaust gas flow provided from an exhaust gas recirculation pathway to a first exhaust gas inlet separate from an exhaust gas intake of the exhaust gas compressor for exhaust gas compression.

DRAWINGS

These and other features, aspects, and advantages of the present invention will become better understood when the following detailed description is read with reference to the accompanying drawings in which like characters represent like parts throughout the drawings, wherein.

Figure 1:
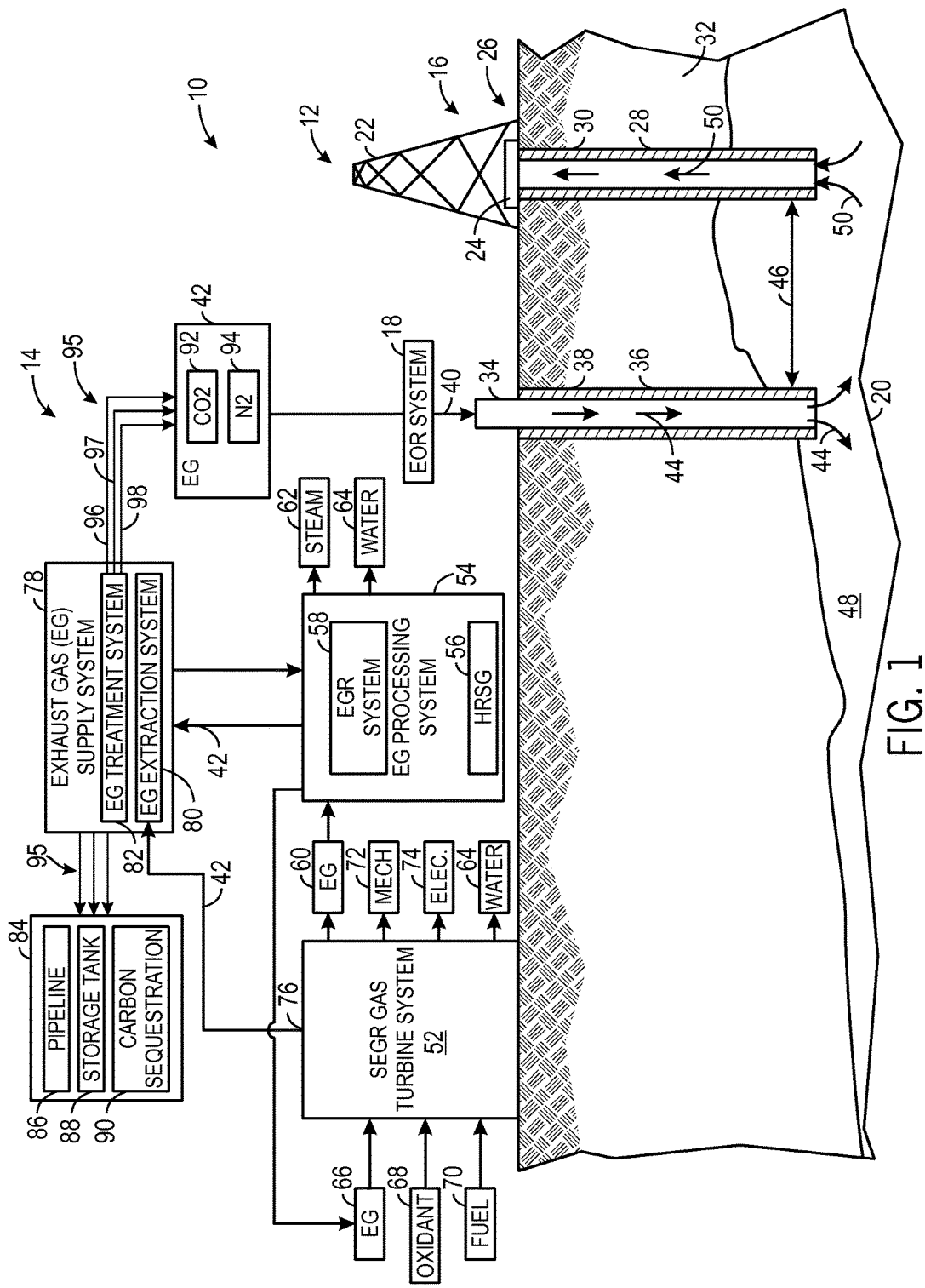
FIG. 1 is a diagram of an embodiment of a system having a turbine-based service system coupled to a hydrocarbon production system.
Figure 2:
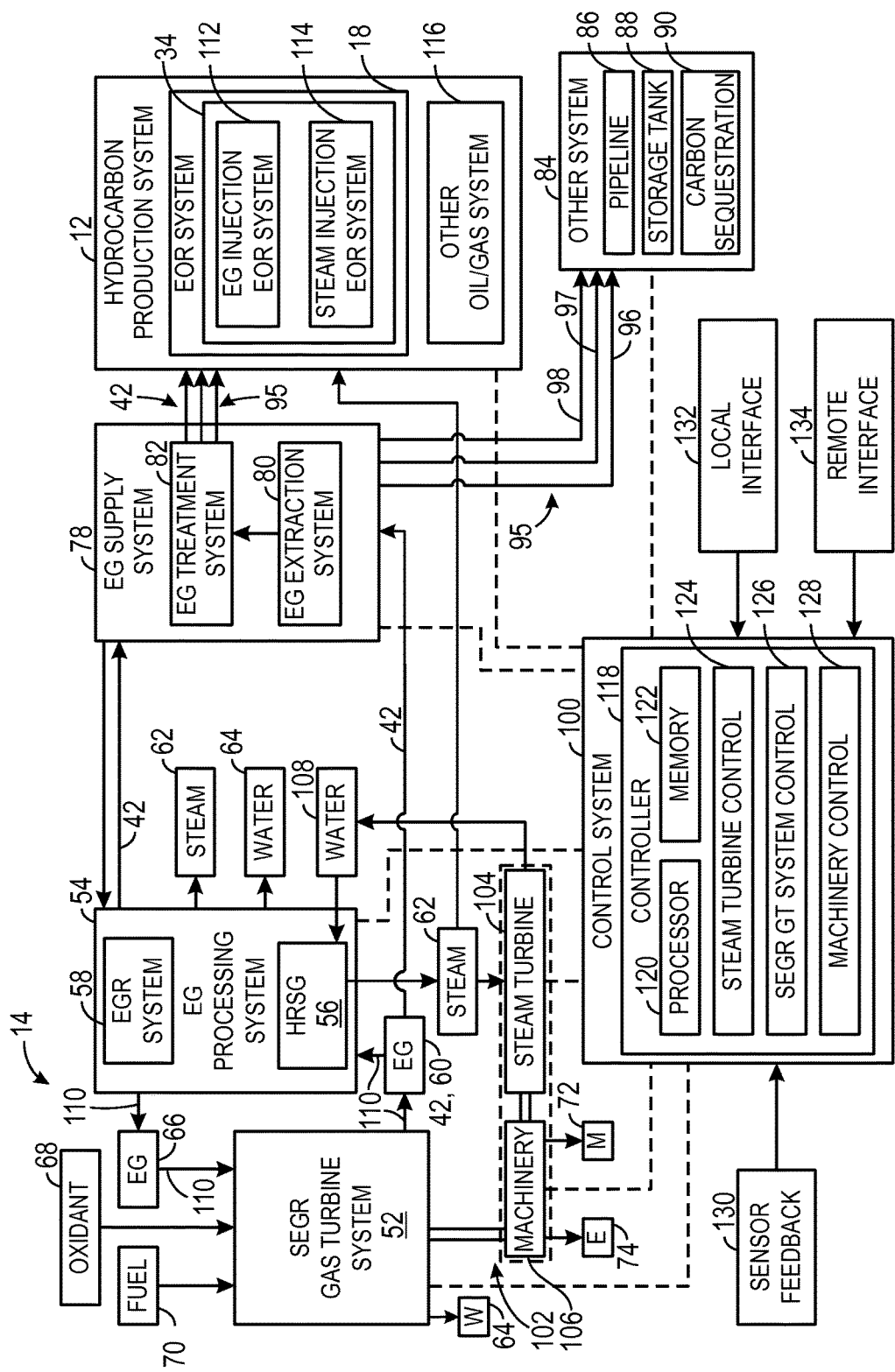
FIG. 2 is a diagram of an embodiment of the system of FIG. 1, further illustrating a control system and a combined cycle system.
Figure 3:
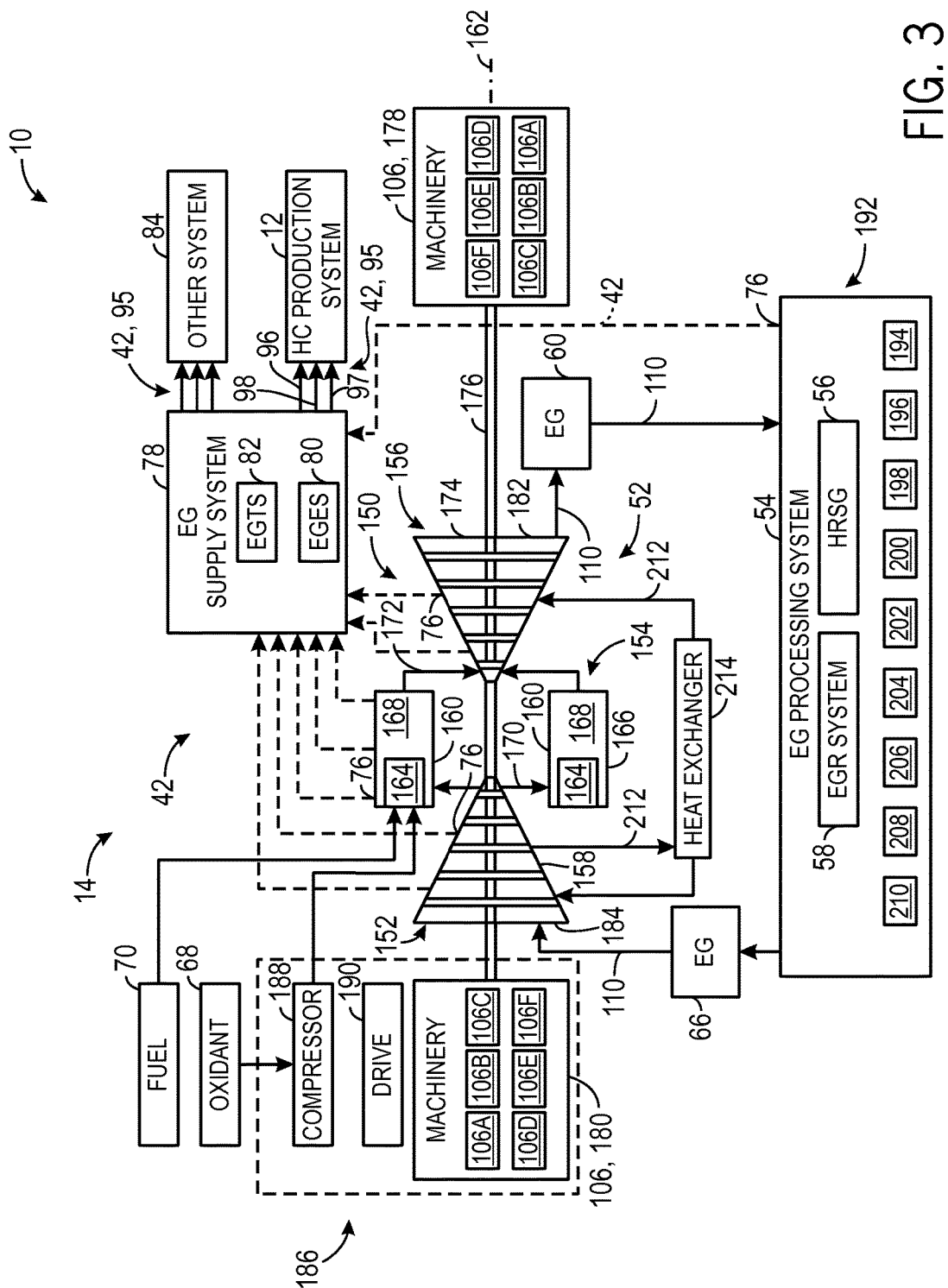
FIG. 3 is a diagram of an embodiment of the system of FIGS. 1 and 2, further illustrating details of a gas turbine engine, exhaust gas supply system, and exhaust gas processing system.
Figure 8:
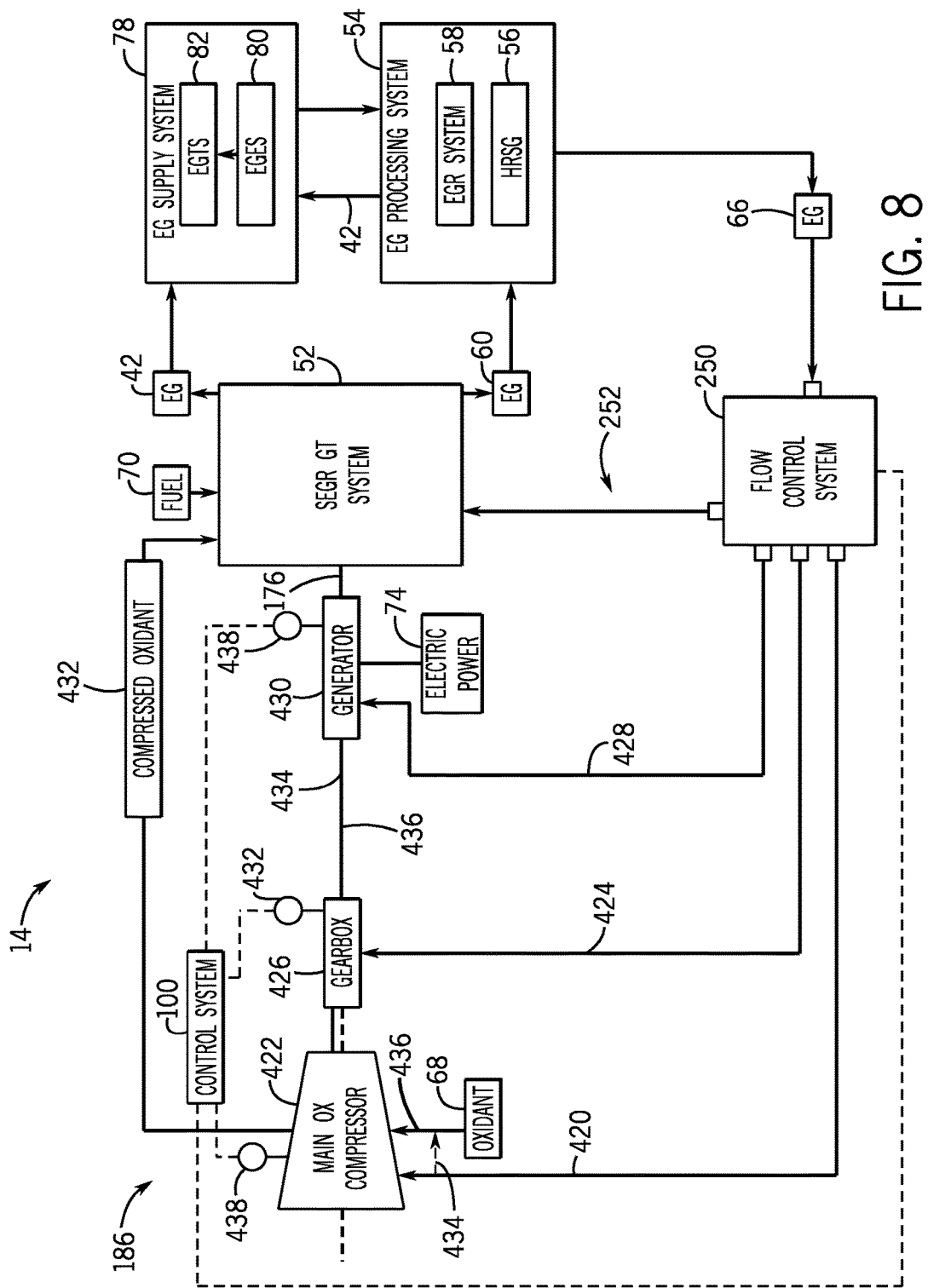
Figure 9:
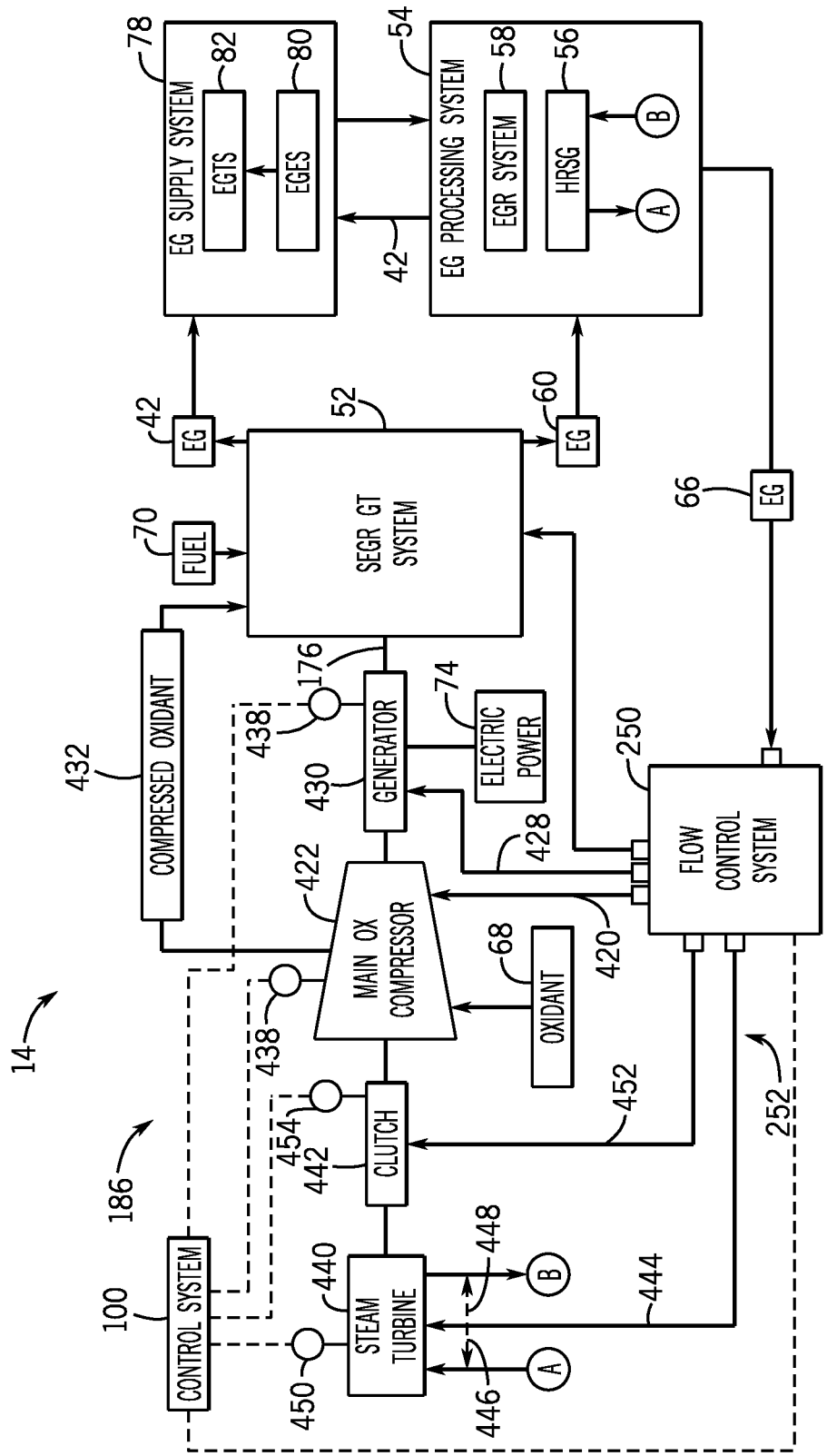

FIG. 8 is a diagram of an embodiment of the system of FIGS. 1-3, illustrating an embodiment of the manner in which recirculated exhaust gas may be utilized in the oxidant compression system of the turbine-based service system of FIGS. 1-3; and FIG. 9 is a diagram of an embodiment of the system of FIGS. 1-3, illustrating an embodiment of the manner in which recirculated exhaust gas may be utilized in the oxidant compression system of the turbine-based service system of FIGS. 1-3.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in an engineering or design project, numerous implementation-specific decisions are made to achieve the specific goals, such as compliance with system-related and/or business-related constraints, which may vary from one implementation to another. Moreover, it should be appreciated that such effort might be complex and time consuming, but would nevertheless be a routine undertaking of design, fabrication, and manufacture for those of ordinary skill having the benefit of this disclosure.

Detailed example embodiments are disclosed herein. However, specific structural and functional details disclosed herein are merely representative for purposes of describing example embodiments. Embodiments of the present invention may, however, be embodied in many alternate forms, and should not be construed as limited to only the embodiments set forth herein.

Accordingly, while example embodiments are capable of various modifications and alternative forms, embodiments thereof are illustrated by way of example in the figures and will herein be described in detail. It should be understood, however, that there is no intent to limit example embodiments to the particular forms disclosed, but to the contrary, example embodiments are to cover all modifications, equivalents, and alternatives falling within the scope of the present invention.

The terminology used herein is for describing particular embodiments only and is not intended to be limiting of example embodiments. As used herein, the singular forms "a", "an" and "the" are intended to include the plural forms as well, unless the context clearly indicates otherwise. The terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Although the terms first, second, primary, secondary, etc. may be used herein to describe various elements, these elements should not be limited by these terms. These terms are only used to distinguish one element from another. For example, but not limiting to, a first element could be termed a second element, and, similarly, a second element could be termed a first element, without departing from the scope of example embodiments. As used herein, the term "and/or" includes any, and all, combinations of one or more of the associated listed items.

Certain terminology may be used herein for the convenience of the reader only and is not to be taken as a limitation on the scope of the invention. For example, words such as "upper," "lower," "left," "right," "front," "rear," "top," "bottom," "horizontal," "vertical," "upstream," "downstream," "fore," "aft," and the like; merely describe the configuration shown in the FIGS. Indeed, the element or elements of an embodiment of the present invention may be oriented in any direction and the terminology, therefore, should be understood as encompassing such variations unless specified otherwise.

As discussed in detail below, the disclosed embodiments relate generally to gas turbine systems with exhaust gas recirculation (EGR), and particularly stoichiometric operation of the gas turbine systems using EGR. For example, the gas turbine systems may be configured to recirculate the exhaust gas along an exhaust recirculation path, stoichiometrically combust fuel and oxidant along with at least some of the recirculated exhaust gas, and capture the exhaust gas for use in various target systems. In addition to controlling the flow of the fuel and/or oxidant, the recirculation of the exhaust gas along with stoichiometric combustion may help to increase the concentration level of $CO_2$ in the exhaust gas, which can then be post treated to separate and purify the $CO_2$ and nitrogen ($N_2$) for use in various target systems. The gas turbine systems also may employ various exhaust gas processing (e.g., heat recovery, catalyst reactions, etc.) along the exhaust recirculation path, thereby increasing the concentration level of $CO_2$, reducing concentration levels of other emissions (e.g., carbon monoxide, nitrogen oxides, and unburnt hydrocarbons), and increasing energy recovery (e.g., with heat recovery units).

In addition to utilizing recirculated exhaust gas in target applications (e.g., enhanced oil recovery), the recirculated exhaust gas may also be utilized to enhance the operational efficiency of the EGR gas turbine system. For instance, in embodiments where the recirculated exhaust gas is cooled and is relatively free of moisture, the recirculated exhaust gas may be used to cool various components of the turbine system, such as the turbine casing, turbine stages, compressor casing, compressor stages, other machine equipment, and the like. Additionally or alternatively, the recirculated exhaust gas may be directed to one or more bearing assemblies in which the shaft of the gas turbine system couples to various components of the system (e.g., the exhaust compressor and/or the turbine). Directing the recirculated exhaust gas in this manner may enable enhanced cooling of the bearing assemblies, enhanced sealing of the bearing assemblies, or a combination thereof. In still further embodiments, the recirculated exhaust gas may be utilized for heat integration, such as to pre-heat an oxidant provided to an oxidant compressor.

Indeed, a number of benefits may be realized by utilizing the recirculated exhaust gas within the EGR gas turbine system in accordance with the present disclosure, including increased time-in-operation for various components, wider operating ranges for various components due to enhanced cooling capabilities, and so on. Such embodiments are described in further detail below, with the general components of the EGR gas turbine system first being introduced, followed by specific examples of the manner in which the recirculated exhaust gas may be utilized within the EGR gas turbine system.

FIG. 1 is a diagram of an embodiment of a system 10 having an hydrocarbon production system 12 associated with a turbine-based service system 14. As discussed in further detail below, various embodiments of the turbine-based service system 14 are configured to provide various services, such as electrical power, mechanical power, and fluids (e.g., exhaust gas), to the hydrocarbon production system 12 to facilitate the production or retrieval of oil and/or gas. In the illustrated embodiment, the hydrocarbon production system 12 includes an oil/gas extraction system 16 and an enhanced oil recovery (EOR) system 18, which are coupled to a subterranean reservoir 20 (e.g., an oil, gas, or hydrocarbon reservoir). The oil/gas extraction system 16 includes a variety of surface equipment 22, such as a Christmas tree or production tree 24, coupled to an oil/gas well 26. Furthermore, the well 26 may include one or more tubulars 28 extending through a drilled bore 30 in the earth 32 to the subterranean reservoir 20. The tree 24 includes one or more valves, chokes, isolation sleeves, blowout preventers, and various flow control devices, which regulate pressures and control flows to and from the subterranean reservoir 20. While the tree 24 is generally used to control the flow of the production fluid (e.g., oil or gas) out of the subterranean reservoir 20, the EOR system 18 may increase the production of oil or gas by injecting one or more fluids into the subterranean reservoir 20.

Accordingly, the EOR system 18 may include a fluid injection system 34, which has one or more tubulars 36 extending through a bore 38 in the earth 32 to the subterranean reservoir 20. For example, the EOR system 18 may route one or more fluids 40, such as gas, steam, water, chemicals, or any combination thereof, into the fluid injection system 34. For example, as discussed in further detail below, the EOR system 18 may be coupled to the turbine-based service system 14, such that the system 14 routes an exhaust gas 42 (e.g., substantially or entirely free of oxygen) to the EOR system 18 for use as the injection fluid 40. The fluid injection system 34 routes the fluid 40 (e.g., the exhaust gas 42) through the one or more tubulars 36 into the subterranean reservoir 20, as indicated by arrows 44. The injection fluid 40 enters the subterranean reservoir 20 through the tubular 36 at an offset distance 46 away from the tubular 28 of the oil/gas well 26. Accordingly, the injection fluid 40 displaces the oil/gas 48 disposed in the subterranean reservoir 20, and drives the oil/gas 48 up through the one or more tubulars 28 of the hydrocarbon production system 12, as indicated by arrows 50. As discussed in further detail below, the injection fluid 40 may include the exhaust gas 42 originating from the turbine-based service system 14, which is able to generate the exhaust gas 42 on-site as needed by the hydrocarbon production system 12. In other words, the turbine-based system 14 may simultaneously generate one or more services (e.g., electrical power, mechanical power, steam, water (e.g., desalinated water), and exhaust gas (e.g., substantially free of oxygen)) for use by the hydrocarbon production system 12, thereby reducing or eliminating the reliance on external sources of such services.

In the illustrated embodiment, the turbine-based service system 14 includes a stoichiometric exhaust gas recirculation (SEGR) gas turbine system 52 and an exhaust gas (EG) processing system 54. The gas turbine system 52 may be configured to operate in a stoichiometric combustion mode of operation (e.g., a stoichiometric control mode) and a non-stoichiometric combustion mode of operation (e.g., a non-stoichiometric control mode), such as a fuel-lean control mode or a fuel-rich control mode. In the stoichiometric control mode, the combustion generally occurs in a substantially stoichiometric ratio of a fuel and oxidant, thereby resulting in substantially stoichiometric combustion. In particular, stoichiometric combustion generally involves consuming substantially all of the fuel and oxidant in the combustion reaction, such that the products of combustion are substantially or entirely free of unburnt fuel and oxidant. One measure of stoichiometric combustion is the equivalence ratio, or phi ($\phi$), which is the ratio of the actual fuel/oxidant ratio relative to the stoichiometric fuel/oxidant ratio. An equivalence ratio of greater than 1.0 results in a fuel-rich combustion of the fuel and oxidant, whereas an equivalence ratio of less than 1.0 results in a fuel-lean combustion of the fuel and oxidant. In contrast, an equivalence ratio of 1.0 results in combustion that is neither fuel-rich nor fuel-lean, thereby substantially consuming all of the fuel and oxidant in the combustion reaction. In context of the disclosed embodiments, the term stoichiometric or substantially stoichiometric may refer to an equivalence ratio of approximately 0.95 to approximately 1.05. However, the disclosed embodiments may also include an equivalence ratio of 1.0 plus or minus 0.01, 0.02, 0.03, 0.04, 0.05, or more. Again, the stoichiometric combustion of fuel and oxidant in the turbine-based service system 14 may result in products of combustion or exhaust gas (e.g., 42) with substantially no unburnt fuel or oxidant remaining. For example, the exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, the exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. However, the disclosed embodiments also may produce other ranges of residual fuel, oxidant, and other emissions levels in the exhaust gas 42. As used herein, the terms emissions, emissions levels, and emissions targets may refer to concentration levels of certain products of combustion (e.g., $NO_X$, CO, $SO_X$, $O_2$, $N_2$, $H_2$, HCs, etc.), which may be present in recirculated gas streams, vented gas streams (e.g., exhausted into the atmosphere), and gas streams used in various target systems (e.g., the hydrocarbon production system 12).

Although the SEGR gas turbine system 52 and the EG processing system 54 may include a variety of components in different embodiments, the illustrated EG processing system 54 includes a heat recovery steam generator (HRSG) 56 and an exhaust gas recirculation (EGR) system 58, which receive and process an exhaust gas 60 originating from the SEGR gas turbine system 52. The HRSG 56 may include one or more heat exchangers, condensers, and various heat recovery equipment, which collectively function to transfer heat from the exhaust gas 60 to a stream of water, thereby generating steam 62. The steam 62 may be used in one or more steam turbines, the EOR system 18, or any other portion of the hydrocarbon production system 12. For example, the HRSG 56 may generate low pressure, medium pressure, and/or high pressure steam 62, which may be selectively applied to low, medium, and high pressure steam turbine stages, or different applications of the EOR system 18. In addition to the steam 62, a treated water 64, such as a desalinated water, may be generated by the HRSG 56, the EGR system 58, and/or another portion of the EG processing system 54 or the SEGR gas turbine system 52. The treated water 64 (e.g., desalinated water) may be particularly useful in areas with water shortages, such as inland or desert regions. The treated water 64 may be generated, at least in part, due to the large volume of air driving combustion of fuel within the SEGR gas turbine system 52. While the on-site generation of steam 62 and water 64 may be beneficial in many applications (including the hydrocarbon production system 12), the on-site generation of exhaust gas 42, 60 may be particularly beneficial for the EOR system 18, due to its low oxygen content, high pressure, and heat derived from the SEGR gas turbine system 52. Accordingly, the HRSG 56, the EGR system 58, and/or another portion of the EG processing system 54 may output or recirculate an exhaust gas 66 into the SEGR gas turbine system 52, while also routing the exhaust gas 42 to the EOR system 18 for use with the hydrocarbon production system 12. Likewise, the exhaust gas 42 may be extracted directly from the SEGR gas turbine system 52 (i.e., without passing through the EG processing system 54) for use in the EOR system 18 of the hydrocarbon production system 12.

The exhaust gas recirculation is handled by the EGR system 58 of the EG processing system 54. For example, the EGR system 58 includes one or more conduits, valves, blowers, exhaust gas treatment systems (e.g., filters, particulate removal units, gas separation units, gas purification units, heat exchangers, heat recovery units, moisture removal units, catalyst units, chemical injection units, or any combination thereof), and controls to recirculate the exhaust gas along an exhaust gas circulation path from an output (e.g., discharged exhaust gas 60) to an input (e.g., intake exhaust gas 66) of the SEGR gas turbine system 52. In the illustrated embodiment, the SEGR gas turbine system 52 intakes the exhaust gas 66 into a compressor section having one or more compressors, thereby compressing the exhaust gas 66 for use in a combustor section along with an intake of an oxidant 68 and one or more fuels 70. The oxidant 68 may include ambient air, pure oxygen, oxygen-enriched air, oxygen-reduced air, oxygen-nitrogen mixtures, or any suitable oxidant that facilitates combustion of the fuel 70. The fuel 70 may include one or more gas fuels, liquid fuels, or any combination thereof. For example, the fuel 70 may include natural gas, liquefied natural gas (LNG), syngas, methane, ethane, propane, butane, naphtha, kerosene, diesel fuel, ethanol, methanol, biofuel, or any combination thereof.

The SEGR gas turbine system 52 mixes and combusts the exhaust gas 66, the oxidant 68, and the fuel 70 in the combustor section, thereby generating hot combustion gases or exhaust gas 60 to drive one or more turbine stages in a turbine section. In certain embodiments, each combustor in the combustor section includes one or more premix fuel nozzles, one or more diffusion fuel nozzles, or any combination thereof. For example, each premix fuel nozzle may be configured to mix the oxidant 68 and the fuel 70 internally within the fuel nozzle and/or partially upstream of the fuel nozzle, thereby injecting an oxidant-fuel mixture from the fuel nozzle into the combustion zone for a premixed combustion (e.g., a premixed flame). By further example, each diffusion fuel nozzle may be configured to isolate the flows of oxidant 68 and fuel 70 within the fuel nozzle, thereby separately injecting the oxidant 68 and the fuel 70 from the fuel nozzle into the combustion zone for diffusion combustion (e.g., a diffusion flame). In particular, the diffusion combustion provided by the diffusion fuel nozzles delays mixing of the oxidant 68 and the fuel 70 until the point of initial combustion, i.e., the flame region. In embodiments employing the diffusion fuel nozzles, the diffusion flame may provide increased flame stability, because the diffusion flame generally forms at the point of stoichiometry between the separate streams of oxidant 68 and fuel 70 (i.e., as the oxidant 68 and fuel 70 are mixing). In certain embodiments, one or more diluents (e.g., the exhaust gas 60, steam, nitrogen, or another inert gas) may be pre-mixed with the oxidant 68, the fuel 70, or both, in either the diffusion fuel nozzle or the premix fuel nozzle. In addition, one or more diluents (e.g., the exhaust gas 60, steam, nitrogen, or another inert gas) may be injected into the combustor at or downstream from the point of combustion within each combustor. The use of these diluents may help temper the flame (e.g., premix flame or diffusion flame), thereby helping to reduce $NO_X$ emissions, such as nitrogen monoxide (NO) and nitrogen dioxide ($NO_2$). Regardless of the type of flame, the combustion produces hot combustion gases or exhaust gas 60 to drive one or more turbine stages. As each turbine stage is driven by the exhaust gas 60, the SEGR gas turbine system 52 generates a mechanical power 72 and/or an electrical power 74 (e.g., via an electrical generator). The system 52 also outputs the exhaust gas 60, and may further output water 64. Again, the water 64 may be a treated water, such as a desalinated water, which may be useful in a variety of applications on-site or off-site.

Exhaust extraction is also provided by the SEGR gas turbine system 52 using one or more extraction points 76. For example, the illustrated embodiment includes an exhaust gas (EG) supply system 78 having an exhaust gas (EG) extraction system 80 and an exhaust gas (EG) treatment system 82, which receive exhaust gas 42 from the extraction points 76, treat the exhaust gas 42, and then supply or distribute the exhaust gas 42 to various target systems. The target systems may include the EOR system 18 and/or other systems, such as a pipeline 86, a storage tank 88, or a carbon sequestration system 90. The EG extraction system 80 may include one or more conduits, valves, controls, and flow separations, which facilitate isolation of the exhaust gas 42 from the oxidant 68, the fuel 70, and other contaminants, while also controlling the temperature, pressure, and flow rate of the extracted exhaust gas 42. The EG treatment system 82 may include one or more heat exchangers (e.g., heat recovery units such as heat recovery steam generators, condensers, coolers, or heaters), catalyst systems (e.g., oxidation catalyst systems), particulate and/or water removal systems (e.g., gas dehydration units, inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, exhaust gas compressors, any combination thereof. These subsystems of the EG treatment system 82 enable control of the temperature, pressure, flow rate, moisture content (e.g., amount of water removal), particulate content (e.g., amount of particulate removal), and gas composition (e.g., percentage of $CO_2$, $N_2$, etc.).

The extracted exhaust gas 42 is treated by one or more subsystems of the EG treatment system 82, depending on the target system. For example, the EG treatment system 82 may direct all or part of the exhaust gas 42 through a carbon capture system, a gas separation system, a gas purification system, and/or a solvent based treatment system, which is controlled to separate and purify a carbonaceous gas (e.g., carbon dioxide) 92 and/or nitrogen ($N_2$) 94 for use in the various target systems. For example, embodiments of the EG treatment system 82 may perform gas separation and purification to produce a plurality of different streams 95 of exhaust gas 42, such as a first stream 96, a second stream 97, and a third stream 98. The first stream 96 may have a first composition that is rich in carbon dioxide and/or lean in nitrogen (e.g., a $CO_2$ rich, $N_2$ lean stream). The second stream 97 may have a second composition that has intermediate concentration levels of carbon dioxide and/or nitrogen (e.g., intermediate concentration $CO_2$, $N_2$ stream). The third stream 98 may have a third composition that is lean in carbon dioxide and/or rich in nitrogen (e.g., a $CO_2$ lean, $N_2$ rich stream). Each stream 95 (e.g., 96, 97, and 98) may include a gas dehydration unit, a filter, a gas compressor, or any combination thereof, to facilitate delivery of the stream 95 to a target system. In certain embodiments, the $CO_2$ rich, $N_2$ lean stream 96 may have a $CO_2$ purity or concentration level of greater than approximately 70, 75, 80, 85, 90, 95, 96, 97, 98, or 99 percent by volume, and a $N_2$ purity or concentration level of less than approximately 1, 2, 3, 4, 5, 10, 15, 20, 25, or 30 percent by volume. In contrast, the $CO_2$ lean, $N_2$ rich stream 98 may have a $CO_2$ purity or concentration level of less than approximately 1, 2, 3, 4, 5, 10, 15, 20, 25, or 30 percent by volume, and a $N_2$ purity or concentration level of greater than approximately 70, 75, 80, 85, 90, 95, 96, 97, 98, or 99 percent by volume. The intermediate concentration $CO_2$, $N_2$ stream 97 may have a $CO_2$ purity or concentration level and/or a $N_2$ purity or concentration level of between approximately 30 to 70, 35 to 65, 40 to 60, or 45 to 55 percent by volume. Although the foregoing ranges are merely non-limiting examples, the $CO_2$ rich, $N_2$ lean stream 96 and the $CO_2$ lean, $N_2$ rich stream 98 may be particularly well suited for use with the EOR system 18 and the other systems 84. However, any of these rich, lean, or intermediate concentration $CO_2$ streams 95 may be used, alone or in various combinations, with the EOR system 18 and the other systems 84. For example, the EOR system 18 and the other systems 84 (e.g., the pipeline 86, storage tank 88, and the carbon sequestration system 90) each may receive one or more $CO_2$ rich, $N_2$ lean streams 96, one or more $CO_2$ lean, $N_2$ rich streams 98, one or more intermediate concentration $CO_2$, $N_2$ streams 97, and one or more untreated exhaust gas 42 streams (i.e., bypassing the EG treatment system 82).

The EG extraction system 80 extracts the exhaust gas 42 at one or more extraction points 76 along the compressor section, the combustor section, and/or the turbine section, such that the exhaust gas 42 may be used in the EOR system 18 and other systems 84 at suitable temperatures and pressures. The EG extraction system 80 and/or the EG treatment system 82 also may circulate fluid flows (e.g., exhaust gas 42) to and from the EG processing system 54. For example, a portion of the exhaust gas 42 passing through the EG processing system 54 may be extracted by the EG extraction system 80 for use in the EOR system 18 and the other systems 84. In certain embodiments, the EG supply system 78 and the EG processing system 54 may be independent or integral with one another, and thus may use independent or common subsystems. For example, the EG treatment system 82 may be used by both the EG supply system 78 and the EG processing system 54. Exhaust gas 42 extracted from the EG processing system 54 may undergo multiple stages of gas treatment, such as one or more stages of gas treatment in the EG processing system 54 followed by one or more additional stages of gas treatment in the EG treatment system 82.

At each extraction point 76, the extracted exhaust gas 42 may be substantially free of oxidant 68 and fuel 70 (e.g., unburnt fuel or hydrocarbons) due to substantially stoichiometric combustion and/or gas treatment in the EG processing system 54. Furthermore, depending on the target system, the extracted exhaust gas 42 may undergo further treatment in the EG treatment system 82 of the EG supply system 78, thereby further reducing any residual oxidant 68, fuel 70, or other undesirable products of combustion. For example, either before or after treatment in the EG treatment system 82, the extracted exhaust gas 42 may have less than 1, 2, 3, 4, or 5 percent by volume of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. By further example, either before or after treatment in the EG treatment system 82, the extracted exhaust gas 42 may have less than approximately 10, 20, 30, 40, 50, 60, 70, 80, 90, 100, 200, 300, 400, 500, 1000, 2000, 3000, 4000, or 5000 parts per million by volume (ppmv) of oxidant (e.g., oxygen), unburnt fuel or hydrocarbons (e.g., HCs), nitrogen oxides (e.g., $NO_X$), carbon monoxide (CO), sulfur oxides (e.g., $SO_X$), hydrogen, and other products of incomplete combustion. Thus, the exhaust gas 42 is particularly well suited for use with the EOR system 18.

The EGR operation of the turbine system 52 specifically enables the exhaust extraction at a multitude of locations 76. For example, the compressor section of the system 52 may be used to compress the exhaust gas 66 without any oxidant 68 (i.e., only compression of the exhaust gas 66), such that a substantially oxygen-free exhaust gas 42 may be extracted from the compressor section and/or the combustor section prior to entry of the oxidant 68 and the fuel 70. The extraction points 76 may be located at interstage ports between adjacent compressor stages, at ports along the compressor discharge casing, at ports along each combustor in the combustor section, or any combination thereof. In certain embodiments, the exhaust gas 66 may not mix with the oxidant 68 and fuel 70 until it reaches the head end portion and/or fuel nozzles of each combustor in the combustor section. Furthermore, one or more flow separators (e.g., walls, dividers, baffles, or the like) may be used to isolate the oxidant 68 and the fuel 70 from the extraction points 76. With these flow separators, the extraction points 76 may be disposed directly along a wall of each combustor in the combustor section.

Once the exhaust gas 66, oxidant 68, and fuel 70 flow through the head end portion (e.g., through fuel nozzles) into the combustion portion (e.g., combustion chamber) of each combustor, the SEGR gas turbine system 52 is controlled to provide a substantially stoichiometric combustion of the exhaust gas 66, oxidant 68, and fuel 70. For example, the system 52 may maintain an equivalence ratio of approximately 0.95 to approximately 1.05. As a result, the products of combustion of the mixture of exhaust gas 66, oxidant 68, and fuel 70 in each combustor is substantially free of oxygen and unburnt fuel. Thus, the products of combustion (or exhaust gas) may be extracted from the turbine section of the SEGR gas turbine system 52 for use as the exhaust gas 42 routed to the EOR system 18. Along the turbine section, the extraction points 76 may be located at any turbine stage, such as interstage ports between adjacent turbine stages. Thus, using any of the foregoing extraction points 76, the turbine-based service system 14 may generate, extract, and deliver the exhaust gas 42 to the hydrocarbon production system 12 (e.g., the EOR system 18) for use in the production of oil/gas 48 from the subterranean reservoir 20.

FIG. 2 is a diagram of an embodiment of the system 10 of FIG. 1, illustrating a control system 100 coupled to the turbine-based service system 14 and the hydrocarbon production system 12. In the illustrated embodiment, the turbine-based service system 14 includes a combined cycle system 102, which includes the SEGR gas turbine system 52 as a topping cycle, a steam turbine 104 as a bottoming cycle, and the HRSG 56 to recover heat from the exhaust gas 60 to generate the steam 62 for driving the steam turbine 104. Again, the SEGR gas turbine system 52 receives, mixes, and stoichiometrically combusts the exhaust gas 66, the oxidant 68, and the fuel 70 (e.g., premix and/or diffusion flames), thereby producing the exhaust gas 60, the mechanical power 72, the electrical power 74, and/or the water 64. For example, the SEGR gas turbine system 52 may drive one or more loads or machinery 106, such as an electrical generator, an oxidant compressor (e.g., a main air compressor), a gear box, a pump, equipment of the hydrocarbon production system 12, or any combination thereof. In some embodiments, the machinery 106 may include other drives, such as electrical motors or steam turbines (e.g., the steam turbine 104), in tandem with the SEGR gas turbine system 52. Accordingly, an output of the machinery 106 driven by the SEGR gas turbines system 52 (and any additional drives) may include the mechanical power 72 and the electrical power 74. The mechanical power 72 and/or the electrical power 74 may be used on-site for powering the hydrocarbon production system 12, the electrical power 74 may be distributed to the power grid, or any combination thereof. The output of the machinery 106 also may include a compressed fluid, such as a compressed oxidant 68 (e.g., air or oxygen), for intake into the combustion section of the SEGR gas turbine system 52. Each of these outputs (e.g., the exhaust gas 60, the mechanical power 72, the electrical power 74, and/or the water 64) may be considered a service of the turbine-based service system 14.

The SEGR gas turbine system 52 produces the exhaust gas 42, 60, which may be substantially free of oxygen, and routes this exhaust gas 42, 60 to the EG processing system 54 and/or the EG supply system 78. The EG supply system 78 may treat and delivery the exhaust gas 42 (e.g., streams 95) to the hydrocarbon production system 12 and/or the other systems 84. As discussed above, the EG processing system 54 may include the HRSG 56 and the EGR system 58. The HRSG 56 may include one or more heat exchangers, condensers, and various heat recovery equipment, which may be used to recover or transfer heat from the exhaust gas 60 to water 108 to generate the steam 62 for driving the steam turbine 104. Similar to the SEGR gas turbine system 52, the steam turbine 104 may drive one or more loads or machinery 106, thereby generating the mechanical power 72 and the electrical power 74. In the illustrated embodiment, the SEGR gas turbine system 52 and the steam turbine 104 are arranged in tandem to drive the same machinery 106. However, in other embodiments, the SEGR gas turbine system 52 and the steam turbine 104 may separately drive different machinery 106 to independently generate mechanical power 72 and/or electrical power 74. As the steam turbine 104 is driven by the steam 62 from the HRSG 56, the steam 62 gradually decreases in temperature and pressure. Accordingly, the steam turbine 104 recirculates the used steam 62 and/or water 108 back into the HRSG 56 for additional steam generation via heat recovery from the exhaust gas 60. In addition to steam generation, the HRSG 56, the EGR system 58, and/or another portion of the EG processing system 54 may produce the water 64, the exhaust gas 42 for use with the hydrocarbon production system 12, and the exhaust gas 66 for use as an input into the SEGR gas turbine system 52. For example, the water 64 may be a treated water 64, such as a desalinated water for use in other applications. The desalinated water may be particularly useful in regions of low water availability. Regarding the exhaust gas 60, embodiments of the EG processing system 54 may be configured to recirculate the exhaust gas 60 through the EGR system 58 with or without passing the exhaust gas 60 through the HRSG 56.

In the illustrated embodiment, the SEGR gas turbine system 52 has an exhaust recirculation path 110, which extends from an exhaust outlet to an exhaust inlet of the system 52. Along the path 110, the exhaust gas 60 passes through the EG processing system 54, which includes the HRSG 56 and the EGR system 58 in the illustrated embodiment. The EGR system 58 may include one or more conduits, valves, blowers, gas treatment systems (e.g., filters, particulate removal units, gas separation units, gas purification units, heat exchangers, heat recovery units such as heat recovery steam generators, moisture removal units, catalyst units, chemical injection units, or any combination thereof) in series and/or parallel arrangements along the path 110. In other words, the EGR system 58 may include any flow control components, pressure control components, temperature control components, moisture control components, and gas composition control components along the exhaust recirculation path 110 between the exhaust outlet and the exhaust inlet of the system 52. Accordingly, in embodiments with the HRSG 56 along the path 110, the HRSG 56 may be considered a component of the EGR system 58. However, in certain embodiments, the HRSG 56 may be disposed along an exhaust path independent from the exhaust recirculation path 110. Regardless of whether the HRSG 56 is along a separate path or a common path with the EGR system 58, the HRSG 56 and the EGR system 58 intake the exhaust gas 60 and output either the recirculated exhaust gas 66, the exhaust gas 42 for use with the EG supply system 78 (e.g., for the hydrocarbon production system 12 and/or other systems 84), or another output of exhaust gas. Again, the SEGR gas turbine system 52 intakes, mixes, and stoichiometrically combusts the exhaust gas 66, the oxidant 68, and the fuel 70 (e.g., premixed and/or diffusion flames) to produce a substantially oxygen-free and fuel-free exhaust gas 60 for distribution to the EG processing system 54, the hydrocarbon production system 12, or other systems 84.

As noted above with reference to FIG. 1, the hydrocarbon production system 12 may include a variety of equipment to facilitate the recovery or production of oil/gas 48 from a subterranean reservoir 20 through an oil/gas well 26. For example, the hydrocarbon production system 12 may include the EOR system 18 having the fluid injection system 34. In the illustrated embodiment, the fluid injection system 34 includes an exhaust gas injection EOR system 112 and a steam injection EOR system 114. Although the fluid injection system 34 may receive fluids from a variety of sources, the illustrated embodiment may receive the exhaust gas 42 and the steam 62 from the turbine-based service system 14.

The exhaust gas 42 and/or the steam 62 produced by the turbine-based service system 14 also may be routed to the hydrocarbon production system 12 for use in other oil/gas systems 116.

The quantity, quality, and flow of the exhaust gas 42, exhaust gas 66 and/or the steam 62 may be controlled by the control system 100. The control system 100 may be dedicated entirely to the turbine-based service system 14, or the control system 100 may optionally also provide control (or at least some data to facilitate control) for the hydrocarbon production system 12 and/or other systems 84. In the illustrated embodiment, the control system 100 includes a controller 118 having a processor 120, a memory 122, a steam turbine control 124, a SEGR gas turbine system control 126, and a machinery control 128. The processor 120 may include a single processor or two or more redundant processors, such as triple redundant processors for control of the turbine-based service system 14. The memory 122 may include volatile and/or non-volatile memory. For example, the memory 122 may include one or more hard drives, flash memory, read-only memory, random access memory, or any combination thereof. The controls 124, 126, and 128 may include software and/or hardware controls. For example, the controls 124, 126, and 128 may include various instructions or code stored on the memory 122 and executable by the processor 120. The control 124 is configured to control operation of the steam turbine 104, the SEGR gas turbine system control 126 is configured to control the system 52, and the machinery control 128 is configured to control the machinery 106. Thus, the controller 118 (e.g., controls 124, 126, and 128) may be configured to coordinate various sub-systems of the turbine-based service system 14 to provide a suitable stream of the exhaust gas 42 to the hydrocarbon production system 12.

In certain embodiments of the control system 100, each element (e.g., system, subsystem, and component) illustrated in the drawings or described herein includes (e.g., directly within, upstream, or downstream of such element) one or more industrial control features, such as sensors and control devices, which are communicatively coupled with one another over an industrial control network along with the controller 118. For example, the control devices associated with each element may include a dedicated device controller (e.g., including a processor, memory, and control instructions), one or more actuators, valves, switches, and industrial control equipment, which enable control based on sensor feedback 130, control signals from the controller 118, control signals from a user, or any combination thereof. Thus, any of the control functionality described herein may be implemented with control instructions stored and/or executable by the controller 118, dedicated device controllers associated with each element, or a combination thereof.

In order to facilitate such control functionality, the control system 100 includes one or more sensors distributed throughout the system 10 to obtain the sensor feedback 130 for use in execution of the various controls, e.g., the controls 124, 126, and 128. For example, the sensor feedback 130 may be obtained from sensors distributed throughout the SEGR gas turbine system 52, the machinery 106, the EG processing system 54, the steam turbine 104, the hydrocarbon production system 12, or any other components throughout the turbine-based service system 14 or the hydrocarbon production system 12. For example, the sensor feedback 130 may include temperature feedback, pressure feedback, flow rate feedback, flame temperature feedback, combustion dynamics feedback, intake oxidant composition feedback, intake fuel composition feedback, exhaust composition feedback, the output level of mechanical power 72, the output level of electrical power 74, the output quantity of the exhaust gas 42, 60, the output quantity or quality of the water 64, or any combination thereof. For example, the sensor feedback 130 may include a composition of the exhaust gas 42, 60 to facilitate stoichiometric combustion in the SEGR gas turbine system 52. For example, the sensor feedback 130 may include feedback from one or more intake oxidant sensors along an oxidant supply path of the oxidant 68, one or more intake fuel sensors along a fuel supply path of the fuel 70, and one or more exhaust emissions sensors disposed along the exhaust recirculation path 110 and/or within the SEGR gas turbine system 52. The intake oxidant sensors, intake fuel sensors, and exhaust emissions sensors may include temperature sensors, pressure sensors, flow rate sensors, and composition sensors. The emissions sensors may includes sensors for nitrogen oxides (e.g., $NO_X$ sensors), carbon oxides (e.g., CO sensors and $CO_2$ sensors), sulfur oxides (e.g., $SO_X$ sensors), hydrogen (e.g., $H_2$ sensors), oxygen (e.g., $O_2$ sensors), unburnt hydrocarbons (e.g., HC sensors), or other products of incomplete combustion, or any combination thereof.

Using this feedback 130, the control system 100 may adjust (e.g., increase, decrease, or maintain) the intake flow of exhaust gas 66, oxidant 68, and/or fuel 70 into the SEGR gas turbine system 52 (among other operational parameters) to maintain the equivalence ratio within a suitable range, e.g., between approximately 0.95 to approximately 1.05, between approximately 0.95 to approximately 1.0, between approximately 1.0 to approximately 1.05, or substantially at 1.0. For example, the control system 100 may analyze the feedback 130 to monitor the exhaust emissions (e.g., concentration levels of nitrogen oxides, carbon oxides such as CO and $CO_2$, sulfur oxides, hydrogen, oxygen, unburnt hydrocarbons, and other products of incomplete combustion) and/or determine the equivalence ratio, and then control one or more components to adjust the exhaust emissions (e.g., concentration levels in the exhaust gas 42) and/or the equivalence ratio. The controlled components may include any of the components illustrated and described with reference to the drawings, including but not limited to, valves along the supply paths for the oxidant 68, the fuel 70, and the exhaust gas 66; an oxidant compressor, a fuel pump, or any components in the EG processing system 54; any components of the SEGR gas turbine system 52, or any combination thereof. The controlled components may adjust (e.g., increase, decrease, or maintain) the flow rates, temperatures, pressures, or percentages (e.g., equivalence ratio) of the oxidant 68, the fuel 70, and the exhaust gas 66 that combust within the SEGR gas turbine system 52. The controlled components also may include one or more gas treatment systems, such as catalyst units (e.g., oxidation catalyst units), supplies for the catalyst units (e.g., oxidation fuel, heat, electricity, etc.), gas purification and/or separation units (e.g., solvent based separators, absorbers, flash tanks, etc.), and filtration units. The gas treatment systems may help reduce various exhaust emissions along the exhaust recirculation path 110, a vent path (e.g., exhausted into the atmosphere), or an extraction path to the EG supply system 78.

In certain embodiments, the control system 100 may analyze the feedback 130 and control one or more components to maintain or reduce emissions levels (e.g., concentration levels in the exhaust gas 42, 60, 95) to a target range, such as less than approximately 10, 20, 30, 40, 50, 100, 200, 300, 400, 500, 1000, 2000, 3000, 4000, 5000, or 10000 parts per million by volume (ppmv). These target ranges may be the same or different for each of the exhaust emissions, e.g., concentration levels of nitrogen oxides, carbon monoxide, sulfur oxides, hydrogen, oxygen, unburnt hydrocarbons, and other products of incomplete combustion. For example, depending on the equivalence ratio, the control system 100 may selectively control exhaust emissions (e.g., concentration levels) of oxidant (e.g., oxygen) within a target range of less than approximately 10, 20, 30, 40, 50, 60, 70, 80, 90, 100, 250, 500, 750, or 1000 ppmv; carbon monoxide (CO) within a target range of less than approximately 20, 50, 100, 200, 500, 1000, 2500, or 5000 ppmv; and nitrogen oxides ($NO_x$) within a target range of less than approximately 50, 100, 200, 300, 400, or 500 ppmv. In certain embodiments operating with a substantially stoichiometric equivalence ratio, the control system 100 may selectively control exhaust emissions (e.g., concentration levels) of oxidant (e.g., oxygen) within a target range of less than approximately 10, 20, 30, 40, 50, 60, 70, 80, 90, or 100 ppmv; and carbon monoxide (CO) within a target range of less than approximately 500, 1000, 2000, 3000, 4000, or 5000 ppmv. In certain embodiments operating with a fuel-lean equivalence ratio (e.g., between approximately 0.95 to 1.0), the control system 100 may selectively control exhaust emissions (e.g., concentration levels) of oxidant (e.g., oxygen) within a target range of less than approximately 500, 600, 700, 800, 900, 1000, 1100, 1200, 1300, 1400, or 1500 ppmv; carbon monoxide (CO) within a target range of less than approximately 10, 20, 30, 40, 50, 60, 70, 80, 90, 100, 150, or 200 ppmv; and nitrogen oxides (e.g., $NO_x$) within a target range of less than approximately 50, 100, 150, 200, 250, 300, 350, or 400 ppmv. The foregoing target ranges are merely examples, and are not intended to limit the scope of the disclosed embodiments.

The control system 100 also may be coupled to a local interface 132 and a remote interface 134. For example, the local interface 132 may include a computer workstation disposed on-site at the turbine-based service system 14 and/or the hydrocarbon production system 12. In contrast, the remote interface 134 may include a computer workstation disposed off-site from the turbine-based service system 14 and the hydrocarbon production system 12, such as through an internet connection. These interfaces 132 and 134 facilitate monitoring and control of the turbine-based service system 14, such as through one or more graphical displays of sensor feedback 130, operational parameters, and so forth.

Again, as noted above, the controller 118 includes a variety of controls 124, 126, and 128 to facilitate control of the turbine-based service system 14. The steam turbine control 124 may receive the sensor feedback 130 and output control commands to facilitate operation of the steam turbine 104. For example, the steam turbine control 124 may receive the sensor feedback 130 from the HRSG 56, the machinery 106, temperature and pressure sensors along a path of the steam 62, temperature and pressure sensors along a path of the water 108, and various sensors indicative of the mechanical power 72 and the electrical power 74. Likewise, the SEGR gas turbine system control 126 may receive sensor feedback 130 from one or more sensors disposed along the SEGR gas turbine system 52, the machinery 106, the EG processing system 54, or any combination thereof. For example, the sensor feedback 130 may be obtained from temperature sensors, pressure sensors, clearance sensors, vibration sensors, flame sensors, fuel composition sensors, exhaust gas composition sensors, or any combination thereof, disposed within or external to the SEGR gas turbine system 52. Finally, the machinery control 128 may receive sensor feedback 130 from various sensors associated with the mechanical power 72 and the electrical power 74, as well as sensors disposed within the machinery 106. Each of these controls 124, 126, and 128 uses the sensor feedback 130 to improve operation of the turbine-based service system 14.

In the illustrated embodiment, the SEGR gas turbine system control 126 may execute instructions to control the quantity and quality of the exhaust gas 42, 60, 95 in the EG processing system 54, the EG supply system 78, the hydrocarbon production system 12, and/or the other systems 84. For example, the SEGR gas turbine system control 126 may maintain a level of oxidant (e.g., oxygen) and/or unburnt fuel in the exhaust gas 60 below a threshold suitable for use with the exhaust gas injection EOR system 112. In certain embodiments, the threshold levels may be less than 1, 2, 3, 4, or 5 percent of oxidant (e.g., oxygen) and/or unburnt fuel by volume of the exhaust gas 42, 60; or the threshold levels of oxidant (e.g., oxygen) and/or unburnt fuel (and other exhaust emissions) may be less than approximately 10, 20, 30, 40, 50, 60, 70, 80, 90, 100, 200, 300, 400, 500, 1000, 2000, 3000, 4000, or 5000 parts per million by volume (ppmv) in the exhaust gas 42, 60. By further example, in order to achieve these low levels of oxidant (e.g., oxygen) and/or unburnt fuel, the SEGR gas turbine system control 126 may maintain an equivalence ratio for combustion in the SEGR gas turbine system 52 between approximately 0.95 and approximately 1.05. The SEGR gas turbine system control 126 also may control the EG extraction system 80 and the EG treatment system 82 to maintain the temperature, pressure, flow rate, and gas composition of the exhaust gas 42, 60, 95 within suitable ranges for the exhaust gas injection EOR system 112, the pipeline 86, the storage tank 88, and the carbon sequestration system 90. As discussed above, the EG treatment system 82 may be controlled to purify and/or separate the exhaust gas 42 into one or more gas streams 95, such as the $CO_2$ rich, $N_2$ lean stream 96, the intermediate concentration $CO_2$, $N_2$ stream 97, and the $CO_2$ lean, $N_2$ rich stream 98. In addition to controls for the exhaust gas 42, 60, and 95, the controls 124, 126, and 128 may execute one or more instructions to maintain the mechanical power 72 within a suitable power range, or maintain the electrical power 74 within a suitable frequency and power range.

FIG. 3 is a diagram of embodiment of the system 10, further illustrating details of the SEGR gas turbine system 52 for use with the hydrocarbon production system 12 and/or other systems 84. In the illustrated embodiment, the SEGR gas turbine system 52 includes a gas turbine engine 150 coupled to the EG processing system 54. The illustrated gas turbine engine 150 includes a compressor section 152, a combustor section 154, and an expander section or turbine section 156. The compressor section 152 includes one or more exhaust gas compressors or compressor stages 158, such as 1 to 20 stages of rotary compressor blades disposed in a series arrangement. Likewise, the combustor section 154 includes one or more combustors 160, such as 1 to 20 combustors 160 distributed circumferentially about a rotational axis 162 of the SEGR gas turbine system 52. Furthermore, each combustor 160 may include one or more fuel nozzles 164 configured to inject the exhaust gas 66, the oxidant 68, and/or the fuel 70. For example, a head end portion 166 of each combustor 160 may house 1, 2, 3, 4, 5, 6, or more fuel nozzles 164, which may inject streams or mixtures of the exhaust gas 66, the oxidant 68, and/or the fuel 70 into a combustion portion 168 (e.g., combustion chamber) of the combustor 160.

The fuel nozzles 164 may include any combination of premix fuel nozzles 164 (e.g., configured to premix the oxidant 68 and fuel 70 for generation of an oxidant/fuel premix flame) and/or diffusion fuel nozzles 164 (e.g., configured to inject separate flows of the oxidant 68 and fuel 70 for generation of an oxidant/fuel diffusion flame). Embodiments of the premix fuel nozzles 164 may include swirl vanes, mixing chambers, or other features to internally mix the oxidant 68 and fuel 70 within the nozzles 164, prior to injection and combustion in the combustion chamber 168. The premix fuel nozzles 164 also may receive at least some partially mixed oxidant 68 and fuel 70. In certain embodiments, each diffusion fuel nozzle 164 may isolate flows of the oxidant 68 and the fuel 70 until the point of injection, while also isolating flows of one or more diluents (e.g., the exhaust gas 66, steam, nitrogen, or another inert gas) until the point of injection. In other embodiments, each diffusion fuel nozzle 164 may isolate flows of the oxidant 68 and the fuel 70 until the point of injection, while partially mixing one or more diluents (e.g., the exhaust gas 66, steam, nitrogen, or another inert gas) with the oxidant 68 and/or the fuel 70 prior to the point of injection. In addition, one or more diluents (e.g., the exhaust gas 66, steam, nitrogen, or another inert gas) may be injected into the combustor (e.g., into the hot products of combustion) either at or downstream from the combustion zone, thereby helping to reduce the temperature of the hot products of combustion and reduce emissions of $NO_X$ (e.g., NO and $NO_2$). Regardless of the type of fuel nozzle 164, the SEGR gas turbine system 52 may be controlled to provide substantially stoichiometric combustion of the oxidant 68 and fuel 70.

In diffusion combustion embodiments using the diffusion fuel nozzles 164, the fuel 70 and oxidant 68 generally do not mix upstream from the diffusion flame, but rather the fuel 70 and oxidant 68 mix and react directly at the flame surface and/or the flame surface exists at the location of mixing between the fuel 70 and oxidant 68. In particular, the fuel 70 and oxidant 68 separately approach the flame surface (or diffusion boundary/interface), and then diffuse (e.g., via molecular and viscous diffusion) along the flame surface (or diffusion boundary/interface) to generate the diffusion flame. It is noteworthy that the fuel 70 and oxidant 68 may be at a substantially stoichiometric ratio along this flame surface (or diffusion boundary/interface), which may result in a greater flame temperature (e.g., a peak flame temperature) along this flame surface. The stoichiometric fuel/oxidant ratio generally results in a greater flame temperature (e.g., a peak flame temperature), as compared with a fuel-lean or fuel-rich fuel/oxidant ratio. As a result, the diffusion flame may be substantially more stable than a premix flame, because the diffusion of fuel 70 and oxidant 68 helps to maintain a stoichiometric ratio (and greater temperature) along the flame surface. Although greater flame temperatures can also lead to greater exhaust emissions, such as $NO_X$ emissions, the disclosed embodiments use one or more diluents to help control the temperature and emissions while still avoiding any premixing of the fuel 70 and oxidant 68. For example, the disclosed embodiments may introduce one or more diluents separate from the fuel 70 and oxidant 68 (e.g., after the point of combustion and/or downstream from the diffusion flame), thereby helping to reduce the temperature and reduce the emissions (e.g., $NO_X$ emissions) produced by the diffusion flame.

In operation, as illustrated, the compressor section 152 receives and compresses the exhaust gas 66 from the EG processing system 54, and outputs a compressed exhaust gas 170 to each of the combustors 160 in the combustor section 154. Upon combustion of the fuel 60, oxidant 68, and exhaust gas 170 within each combustor 160, additional exhaust gas or products of combustion 172 (i.e., combustion gas) is routed into the turbine section 156. Similar to the compressor section 152, the turbine section 156 includes one or more turbines or turbine stages 174, which may include a series of rotary turbine blades. These turbine blades are then driven by the products of combustion 172 generated in the combustor section 154, thereby driving rotation of a shaft 176 coupled to the machinery 106. Again, the machinery 106 may include a variety of equipment coupled to either end of the SEGR gas turbine system 52, such as machinery 106, 178 coupled to the turbine section 156 and/or machinery 106, 180 coupled to the compressor section 152. In certain embodiments, the machinery 106, 178, 180 may include one or more electrical generators, oxidant compressors for the oxidant 68, fuel pumps for the fuel 70, gear boxes, or additional drives (e.g. steam turbine 104, electrical motor, etc.) coupled to the SEGR gas turbine system 52. Non-limiting examples are discussed in further detail below with reference to TABLE 1. As illustrated, the turbine section 156 outputs the exhaust gas 60 to recirculate along the exhaust recirculation path 110 from an exhaust outlet 182 of the turbine section 156 to an exhaust inlet 184 into the compressor section 152. Along the exhaust recirculation path 110, the exhaust gas 60 passes through the EG processing system 54 (e.g., the HRSG 56 and/or the EGR system 58) as discussed in detail above.

Again, each combustor 160 in the combustor section 154 receives, mixes, and stoichiometrically combusts the compressed exhaust gas 170, the oxidant 68, and the fuel 70 to produce the additional exhaust gas or products of combustion 172 to drive the turbine section 156. In certain embodiments, the oxidant 68 is compressed by an oxidant compression system 186, such as a main oxidant compression (MOC) system (e.g., a main air compression (MAC) system) having one or more oxidant compressors (MOCs). The oxidant compression system 186 includes an oxidant compressor 188 coupled to a drive 190. For example, the drive 190 may include an electric motor, a combustion engine, or any combination thereof. In certain embodiments, the drive 190 may be a turbine engine, such as the gas turbine engine 150. Accordingly, the oxidant compression system 186 may be an integral part of the machinery 106. In other words, the compressor 188 may be directly or indirectly driven by the mechanical power 72 supplied by the shaft 176 of the gas turbine engine 150. In such an embodiment, the drive 190 may be excluded, because the compressor 188 relies on the power output from the turbine engine 150. However, in certain embodiments employing more than one oxidant compressor is employed, a first oxidant compressor (e.g., a low pressure (LP) oxidant compressor) may be driven by the drive 190 while the shaft 176 drives a second oxidant compressor (e.g., a high pressure (HP) oxidant compressor), or vice versa. For example, in another embodiment, the HP MOC is driven by the drive 190 and the LP oxidant compressor is driven by the shaft 176. In the illustrated embodiment, the oxidant compression system 186 is separate from the machinery 106. In each of these embodiments, the compression system 186 compresses and supplies the oxidant 68 to the fuel nozzles 164 and the combustors 160. Accordingly, some or all of the machinery 106, 178, 180 may be configured to increase the operational efficiency of the compression system 186 (e.g., the compressor 188 and/or additional compressors).

The variety of components of the machinery 106, indicated by element numbers 106A, 106B, 106C, 106D, 106E, and 106F, may be disposed along the line of the shaft 176 and/or parallel to the line of the shaft 176 in one or more series arrangements, parallel arrangements, or any combination of series and parallel arrangements. For example, the machinery 106, 178, 180 (e.g., 106A through 106F) may include any series and/or parallel arrangement, in any order, of: one or more gearboxes (e.g., parallel shaft, epicyclic gearboxes), one or more compressors (e.g., oxidant compressors, booster compressors such as EG booster compressors), one or more power generation units (e.g., electrical generators), one or more drives (e.g., steam turbine engines, electrical motors), heat exchange units (e.g., direct or indirect heat exchangers), clutches, or any combination thereof. The compressors may include axial compressors, radial or centrifugal compressors, or any combination thereof, each having one or more compression stages. Regarding the heat exchangers, direct heat exchangers may include spray coolers (e.g., spray intercoolers), which inject a liquid spray into a gas flow (e.g., oxidant flow) for direct cooling of the gas flow. Indirect heat exchangers may include at least one wall (e.g., a shell and tube heat exchanger) separating first and second flows, such as a fluid flow (e.g., oxidant flow) separated from a coolant flow (e.g., water, air, refrigerant, or any other liquid or gas coolant), wherein the coolant flow transfers heat from the fluid flow without any direct contact. Examples of indirect heat exchangers include intercooler heat exchangers and heat recovery units, such as heat recovery steam generators. The heat exchangers also may include heaters. As discussed in further detail below, each of these machinery components may be used in various combinations as indicated by the non-limiting examples set forth in TABLE 1.

Generally, the machinery 106, 178, 180 may be configured to increase the efficiency of the compression system 186 by, for example, adjusting operational speeds of one or more oxidant compressors in the system 186, facilitating compression of the oxidant 68 through cooling, and/or extraction of surplus power. The disclosed embodiments are intended to include any and all permutations of the foregoing components in the machinery 106, 178, 180 in series and parallel arrangements, wherein one, more than one, all, or none of the components derive power from the shaft 176. As illustrated below, TABLE 1 depicts some non-limiting examples of arrangements of the machinery 106, 178, 180 disposed proximate and/or coupled to the compressor and turbine sections 152, 156.

TABLE 1

| 106A | 106B | 106C | 106D | 106E | 106F |
|------|------|------|------|------|------|
| MOC | GEN | | | | |
| MOC | GBX | GEN | | | |
| LP MOC | HP MOC | GEN | | | |
| HP MOC | GBX | LP MOC | GEN | | |
| MOC | GBX | GEN | | | |
| MOC | | | | | |
| HP MOC | GBX | GEN | LP MOC | | |
| MOC | GBX | GEN | | | |
| MOC | GBX | DRV | | | |
| DRV | GBX | LP MOC | HP MOC | GBX | GEN |
| DRV | GBX | HP MOC | LP MOC | GEN | |
| HP | GBX | LP | GEN | | |
| MOC | CLR | MOC | | | |
| HP | GBX | LP | GBX | GEN | |
| MOC | CLR | MOC | | | |
| HP | GBX | LP | GEN | | |
| MOC | HTR STGN | MOC | | | |
| MOC | GEN | DRV | | | |
| MOC | DRV | GEN | | | |
| DRV | MOC | GEN | | | |
| DRV | CLU | MOC | GEN | | |
| DRV | CLU | MOC | GBX | GEN | |

As illustrated above in TABLE 1, a cooling unit is represented as CLR, a clutch is represented as CLU, a drive is represented by DRV, a gearbox is represented as GBX, a generator is represented by GEN, a heating unit is represented by HTR, a main oxidant compressor unit is represented by MOC, with low pressure and high pressure variants being represented as LP MOC and HP MOC, respectively, and a steam generator unit is represented as STGN. Although TABLE 1 illustrates the machinery 106, 178, 180 in sequence toward the compressor section 152 or the turbine section 156, TABLE 1 is also intended to cover the reverse sequence of the machinery 106, 178, 180. In TABLE 1, any cell including two or more components is intended to cover a parallel arrangement of the components. TABLE 1 is not intended to exclude any non-illustrated permutations of the machinery 106, 178, 180. These components of the machinery 106, 178, 180 may enable feedback control of temperature, pressure, and flow rate of the oxidant 68 sent to the gas turbine engine 150. As discussed in further detail below, the oxidant 68 and the fuel 70 may be supplied to the gas turbine engine 150 at locations specifically selected to facilitate isolation and extraction of the compressed exhaust gas 170 without any oxidant 68 or fuel 70 degrading the quality of the exhaust gas 170.

The EG supply system 78, as illustrated in FIG. 3, is disposed between the gas turbine engine 150 and the target systems (e.g., the hydrocarbon production system 12 and the other systems 84). In particular, the EG supply system 78, e.g., the EG extraction system (EGES) 80), may be coupled to the gas turbine engine 150 at one or more extraction points 76 along the compressor section 152, the combustor section 154, and/or the turbine section 156. For example, the extraction points 76 may be located between adjacent compressor stages, such as 2, 3, 4, 5, 6, 7, 8, 9, or 10 interstage extraction points 76 between compressor stages. Each of these interstage extraction points 76 provides a different temperature and pressure of the extracted exhaust gas 42. Similarly, the extraction points 76 may be located between adjacent turbine stages, such as 2, 3, 4, 5, 6, 7, 8, 9, or 10 interstage extraction points 76 between turbine stages. Each of these interstage extraction points 76 provides a different temperature and pressure of the extracted exhaust gas 42. By further example, the extraction points 76 may be located at a multitude of locations throughout the combustor section 154, which may provide different temperatures, pressures, flow rates, and gas compositions. Each of these extraction points 76 may include an EG extraction conduit, one or more valves, sensors, and controls, which may be used to selectively control the flow of the extracted exhaust gas 42 to the EG supply system 78.

The extracted exhaust gas 42, which is distributed by the EG supply system 78, has a controlled composition suitable for the target systems (e.g., the hydrocarbon production system 12 and the other systems 84). For example, at each of these extraction points 76, the exhaust gas 170 may be substantially isolated from injection points (or flows) of the oxidant 68 and the fuel 70. In other words, the EG supply system 78 may be specifically designed to extract the exhaust gas 170 from the gas turbine engine 150 without any added oxidant 68 or fuel 70. Furthermore, in view of the stoichiometric combustion in each of the combustors 160, the extracted exhaust gas 42 may be substantially free of oxygen and fuel. The EG supply system 78 may route the extracted exhaust gas 42 directly or indirectly to the hydrocarbon production system 12 and/or other systems 84 for use in various processes, such as enhanced oil recovery, carbon sequestration, storage, or transport to an offsite location. However, in certain embodiments, the EG supply system 78 includes the EG treatment system (EGTS) 82 for further treatment of the exhaust gas 42, prior to use with the target systems. For example, the EG treatment system 82 may purify and/or separate the exhaust gas 42 into one or more streams 95, such as the $CO_2$ rich, $N_2$ lean stream 96, the intermediate concentration $CO_2$, $N_2$ stream 97, and the $CO_2$ lean, $N_2$ rich stream 98. These treated exhaust gas streams 95 may be used individually, or in any combination, with the hydrocarbon production system 12 and the other systems 84 (e.g., the pipeline 86, the storage tank 88, and the carbon sequestration system 90).

Similar to the exhaust gas treatments performed in the EG supply system 78, the EG processing system 54 may include a plurality of exhaust gas (EG) treatment components 192, such as indicated by element numbers 194, 196, 198, 200, 202, 204, 206, 208, and 210. These EG treatment components 192 (e.g., 194 through 210) may be disposed along the exhaust recirculation path 110 in one or more series arrangements, parallel arrangements, or any combination of series and parallel arrangements. Further, the exhaust recirculation path 110 may include one or more streams passing through the same or different combinations of the EG treatment components 192. For example, the EG treatment components 192 (e.g., 194 through 210) may include any series and/or parallel arrangement, in any order, of: one or more heat exchangers (e.g., heat recovery units such as heat recovery steam generators, condensers, coolers, or heaters), catalyst systems (e.g., oxidation catalyst systems), particulate and/or water removal systems (e.g., inertial separators, coalescing filters, water impermeable filters, and other filters), chemical injection systems, solvent based treatment systems (e.g., absorbers, flash tanks, etc.), carbon capture systems, gas separation systems, gas purification systems, and/or a solvent based treatment system, or any combination thereof. In certain embodiments, the catalyst systems may include an oxidation catalyst, a carbon monoxide reduction catalyst, a nitrogen oxides reduction catalyst, an aluminum oxide, a zirconium oxide, a silicone oxide, a titanium oxide, a platinum oxide, a palladium oxide, a cobalt oxide, or a mixed metal oxide, or a combination thereof. The disclosed embodiments are intended to include any and all permutations of the foregoing components 192 in series and parallel arrangements. As illustrated below, TABLE 2 depicts some non-limiting examples of arrangements of the components 192 along the exhaust recirculation path 110.

TABLE 2

| 194 | 196 | 198 | 200 | 202 | 204 | 206 | 208 | 210 |
|---|---|---|---|---|---|---|---|---|
| CU | HRU | BB | MRU | PRU | | | | |
| CU | HRU | HRU | BB | MRU | PRU | DIL | | |
| CU | HRSG | HRSG | BB | MRU | PRU | | | |
| OCU | HRU | OCU | HRU | OCU | BB | MRU | PRU | |
| HRU CU | HRU CU | BB | MRU | PRU | | | | |
| HRSG OCU | HRSG OCU | BB | MRU | PRU | DIL | | | |
| OCU | HRSG OCU | OCU | HRSG OCU | OCU | BB | MRU | PRU | DIL |
| OCU | HRSG ST | HRSG ST | BB | COND | INER | WFIL | CFIL | DIL |
| OCU HRSG ST | OCU HRSG ST | BB | COND | INER | FIL | DIL | | |
| OCU | HRSG ST | HRSG ST | OCU | BB | MRU HE COND | MRU WFIL | PRU INER | PRU FIL CFIL |
| CU | HRU COND | HRU COND | HRU COND | BB | MRU HE COND WFIL | PRU INER | PRU FIL CFIL | DIL |

As illustrated above in TABLE 2, a catalyst unit is represented by CU, an oxidation catalyst unit is represented by OCU, a booster blower is represented by BB, a heat exchanger is represented by HX, a heat recovery unit is represented by HRU, a heat recovery steam generator is represented by HRSG, a condenser is represented by COND, a steam turbine is represented by ST, a particulate removal unit is represented by PRU, a moisture removal unit is represented by MRU, a filter is represented by FIL, a coalescing filter is represented by CFIL, a water impermeable filter is represented by WFIL, an inertial separator is represented by INER, and a diluent supply system (e.g., steam, nitrogen, or other inert gas) is represented by DIL. Although TABLE 2 illustrates the components 192 in sequence from the exhaust outlet 182 of the turbine section 156 toward the exhaust inlet 184 of the compressor section 152, TABLE 2 is also intended to cover the reverse sequence of the illustrated components 192. In TABLE 2, any cell including two or more components is intended to cover an integrated unit with the components, a parallel arrangement of the components, or any combination thereof. Furthermore, in context of TABLE 2, the HRU, the HRSG, and the COND are examples of the HE; the HRSG is an example of the HRU; the COND, WEIL, and CFIL are examples of the WRU; the INER, FIL, WFIL, and CFIL are examples of the PRU; and the WFIL and CFIL are examples of the FIL.

Again, TABLE 2 is not intended to exclude any non-illustrated permutations of the components 192. In certain embodiments, the illustrated components 192 (e.g., 194 through 210) may be partially or completed integrated within the HRSG 56, the EGR system 58, or any combination thereof. These EG treatment components 192 may enable feedback control of temperature, pressure, flow rate, and gas composition, while also removing moisture and particulates from the exhaust gas 60. Furthermore, the treated exhaust gas 60 may be extracted at one or more extraction points 76 for use in the EG supply system 78 and/or recirculated to the exhaust inlet 184 of the compressor section 152.

As the treated, recirculated exhaust gas 66 passes through the compressor section 152, the SEGR gas turbine system 52 may bleed off a portion of the compressed exhaust gas along one or more lines 212 (e.g., bleed conduits or bypass conduits). Each line 212 may route the exhaust gas into one or more heat exchangers 214 (e.g., cooling units), thereby cooling the exhaust gas for recirculation back into the SEGR gas turbine system 52. For example, after passing through the heat exchanger 214, a portion of the cooled exhaust gas may be routed to the turbine section 156 along line 212 for cooling and/or sealing of the turbine casing, turbine shrouds, bearings, and other components. In such an embodiment, the SEGR gas turbine system 52 does not route any oxidant 68 (or other potential contaminants) through the turbine section 156 for cooling and/or sealing purposes, and thus any leakage of the cooled exhaust gas will not contaminate the hot products of combustion (e.g., working exhaust gas) flowing through and driving the turbine stages of the turbine section 156. By further example, after passing through the heat exchanger 214, a portion of the cooled exhaust gas may be routed along line 216 (e.g., return conduit) to an upstream compressor stage of the compressor section 152, thereby improving the efficiency of compression by the compressor section 152. In such an embodiment, the heat exchanger 214 may be configured as an interstage cooling unit for the compressor section 152. In this manner, the cooled exhaust gas helps to increase the operational efficiency of the SEGR gas turbine system 52, while simultaneously helping to maintain the purity of the exhaust gas (e.g., substantially free of oxidant and fuel).

Figure 4:
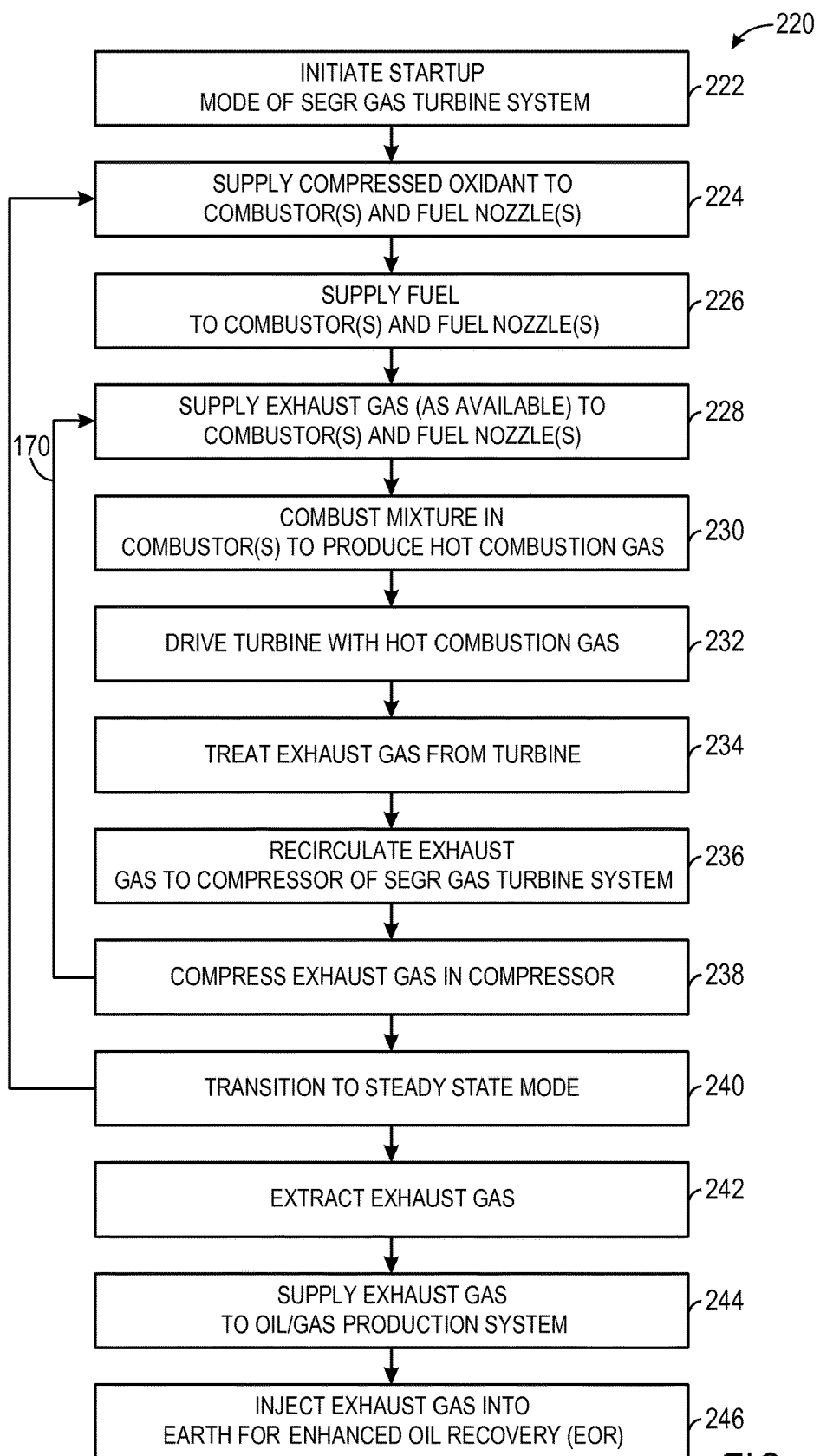
FIG. 4 is a flow chart of an embodiment of a process for operating the system of FIGS. 1-3.

FIG. 4 is a flow chart of an embodiment of an operational process 220 of the system 10 illustrated in FIGS. 1-3. In certain embodiments, the process 220 may be a computer implemented process, which accesses one or more instructions stored on the memory 122 and executes the instructions on the processor 120 of the controller 118 shown in FIG. 2. For example, each step in the process 220 may include instructions executable by the controller 118 of the control system 100 described with reference to FIG. 2.

The process 220 may begin by initiating a startup mode of the SEGR gas turbine system 52 of FIGS. 1-3, as indicated by block 222. For example, the startup mode may involve a gradual ramp up of the SEGR gas turbine system 52 to maintain thermal gradients, vibration, and clearance (e.g., between rotating and stationary parts) within acceptable thresholds. For example, during the startup mode 222, the process 220 may begin to supply a compressed oxidant 68 to the combustors 160 and the fuel nozzles 164 of the combustor section 154, as indicated by block 224. In certain embodiments, the compressed oxidant may include a compressed air, oxygen, oxygen-enriched air, oxygen-reduced air, oxygen-nitrogen mixtures, or any combination thereof. For example, the oxidant 68 may be compressed by the oxidant compression system 186 illustrated in FIG. 3. The process 220 also may begin to supply fuel to the combustors 160 and the fuel nozzles 164 during the startup mode 222, as indicated by block 226. During the startup mode 222, the process 220 also may begin to supply exhaust gas (as available) to the combustors 160 and the fuel nozzles 164, as indicated by block 228. For example, the fuel nozzles 164 may produce one or more diffusion flames, premix flames, or a combination of diffusion and premix flames. During the startup mode 222, the exhaust gas 60 being generated by the gas turbine engine 156 may be insufficient or unstable in quantity and/or quality. Accordingly, during the startup mode, the process 220 may supply the exhaust gas 66 from one or more storage units (e.g., storage tank 88), the pipeline 86, other SEGR gas turbine systems 52, or other exhaust gas sources.

The process 220 may then combust a mixture of the compressed oxidant, fuel, and exhaust gas in the combustors 160 to produce hot combustion gas 172, as indicated by block 230. In particular, the process 220 may be controlled by the control system 100 of FIG. 2 to facilitate stoichiometric combustion (e.g., stoichiometric diffusion combustion, premix combustion, or both) of the mixture in the combustors 160 of the combustor section 154. However, during the startup mode 222, it may be particularly difficult to maintain stoichiometric combustion of the mixture (and thus low levels of oxidant and unburnt fuel may be present in the hot combustion gas 172). As a result, in the startup mode 222, the hot combustion gas 172 may have greater amounts of residual oxidant 68 and/or fuel 70 than during a steady state mode as discussed in further detail below. For this reason, the process 220 may execute one or more control instructions to reduce or eliminate the residual oxidant 68 and/or fuel 70 in the hot combustion gas 172 during the startup mode.

The process 220 then drives the turbine section 156 with the hot combustion gas 172, as indicated by block 232. For example, the hot combustion gas 172 may drive one or more turbine stages 174 disposed within the turbine section 156. Downstream of the turbine section 156, the process 220 may treat the exhaust gas 60 from the final turbine stage 174, as indicated by block 234. For example, the exhaust gas treatment 234 may include filtration, catalytic reaction of any residual oxidant 68 and/or fuel 70, chemical treatment, heat recovery with the HRSG 56, and so forth. The process 220 may also recirculate at least some of the exhaust gas 60 back to the compressor section 152 of the SEGR gas turbine system 52, as indicated by block 236. For example, the exhaust gas recirculation 236 may involve passage through the exhaust recirculation path 110 having the EG processing system 54 as illustrated in FIGS. 1-3.

In turn, the recirculated exhaust gas 66 may be compressed in the compressor section 152, as indicated by block 238. For example, the SEGR gas turbine system 52 may sequentially compress the recirculated exhaust gas 66 in one or more compressor stages 158 of the compressor section 152. Subsequently, the compressed exhaust gas 170 may be supplied to the combustors 160 and fuel nozzles 164, as indicated by block 228. Steps 230, 232, 234, 236, and 238 may then repeat, until the process 220 eventually transitions to a steady state mode, as indicated by block 240. Upon the transition 240, the process 220 may continue to perform the steps 224 through 238, but may also begin to extract the exhaust gas 42 via the EG supply system 78, as indicated by block 242. For example, the exhaust gas 42 may be extracted from one or more extraction points 76 along the compressor section 152, the combustor section 154, and the turbine section 156 as indicated in FIG. 3. In turn, the process 220 may supply the extracted exhaust gas 42 from the EG supply system 78 to the hydrocarbon production system 12, as indicated by block 244. The hydrocarbon production system 12 may then inject the exhaust gas 42 into the earth 32 for enhanced oil recovery, as indicated by block 246. For example, the extracted exhaust gas 42 may be used by the exhaust gas injection EOR system 112 of the EOR system 18 illustrated in FIGS. 1-3.

As noted above, the SEGR gas turbine system 52 may be utilized to produce, among other outputs, exhaust gas 42, which may in turn be used as a product gas for enhanced oil recovery. As discussed above with respect to FIGS. 1-3, the exhaust gas 42 provided to the EG supply system 78 (and in certain embodiments the hydrocarbon production system 12) may be treated so as to have oxygen concentrations at or below a target level. Indeed, the exhaust gas 42, 66 may be treated within the EG processing system 54 to reduce oxygen levels, humidity, particulates, nitrogen oxides, sulfur oxides, or other combustion by-products. Furthermore, the EG processing system 54 may control the temperature and/or pressure of the exhaust gas 42, 66 as it is provided to the SEGR GT system 52, to the EG supply system 78, or the like. Accordingly, a variety of parameters of the exhaust gas 42, 66 may be controlled to enable the exhaust gas 42, 66 to perform a particular function.

For example, in accordance with certain embodiments, the exhaust gas 42, 66, in addition to being utilized as a product gas by the EG supply system 78, may be utilized within the turbine-based service system 14 for sealing, humidity regulation, pressure regulation, and/or temperature regulation, or any combination thereof. In particular, the exhaust gas 66 may be utilized to improve the lifespan of various equipment (e.g., the compressor 152), machine components (e.g., turbine casings, compressor casings, gears, motors), and the like. An example embodiment of the system 10 including such an arrangement is depicted in FIG. 5.

Figure 5:
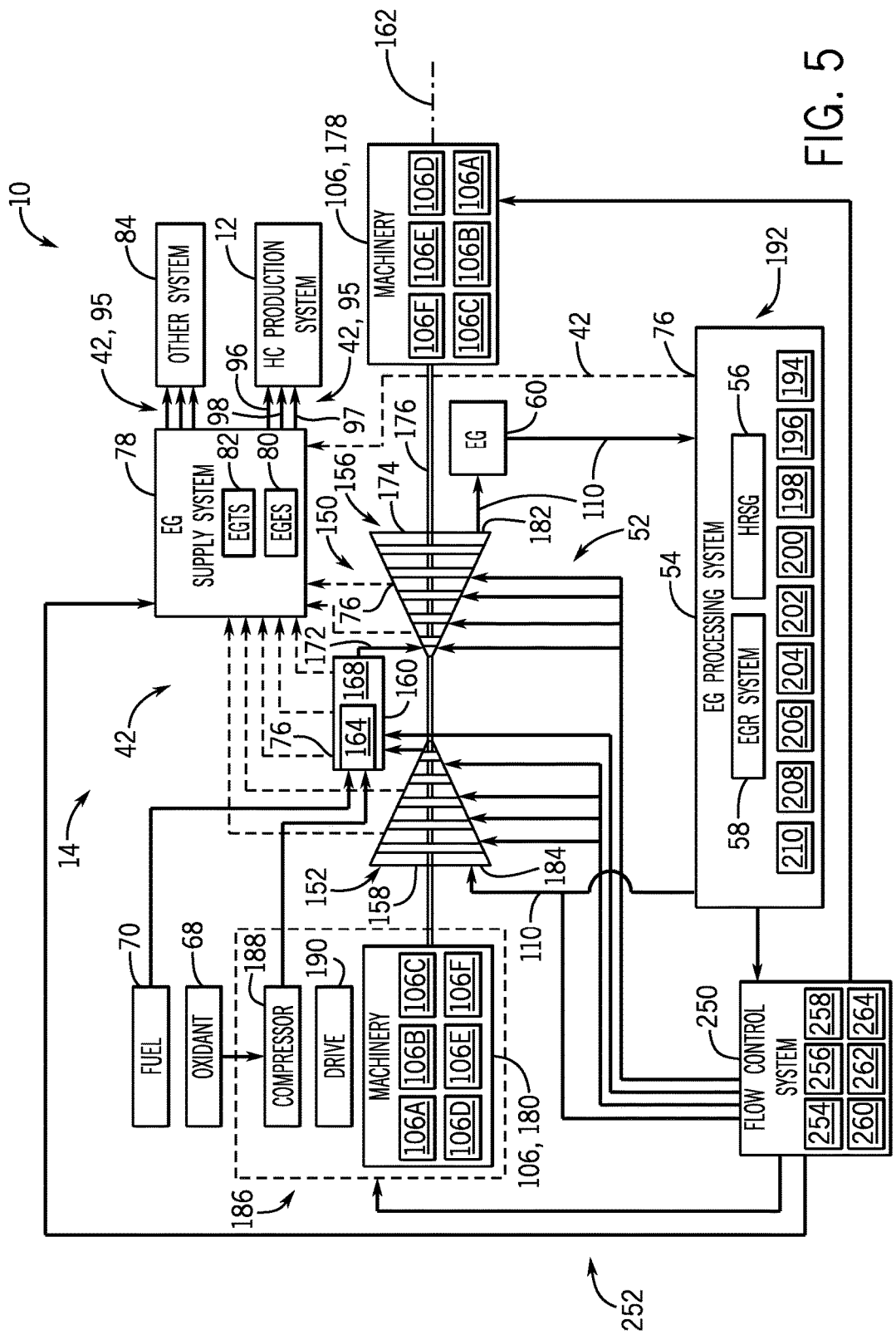
FIG. 5 is a diagram of an embodiment of the system of FIGS. 1-3, illustrating an embodiment of the manner in which recirculated exhaust gas may be utilized in the turbine-based service system of FIGS. 1-3.

In particular, the system 10 of FIG. 5 includes a flow control system 250 positioned along the exhaust recirculation path 110. In particular, as depicted, the flow control system 250 may be positioned so as to receive a first portion of the exhaust gas 66 generated by the EG processing system 54 (shown as a line from the EG processing system 54 to the flow control system 250), while the inlet 184 (leading to compression) of the compressor section 152 receives a second portion of the exhaust gas 66 that does not pass through the flow control system 250 (shown as a line directly from the EG processing system 54 to the inlet 184). Further, as discussed in detail below, the first and second portions of the exhaust gas 66 may have different compositions. For instance, in one embodiment, the first portion of the exhaust gas 66 provided to the flow control system 250 may pass through a first combination of EG processing system 54 elements (e.g., a combination including a moisture separator), while the second portion of the exhaust gas 66 provided to the inlet 184 of the compressor section 152 passes through a second combination of EG processing system 54 elements (e.g., a combination not including the moisture separator and/or including a different moisture separator).

Indeed, the first and second portions of the exhaust gas 66 may flow through one or more common conduits, one or more separate conduits, or a combination thereof, within the EG processing system 54. Thus, generally, in the EG processing system 54, there may be one or more exhaust gas streams, where each stream passes through one or more of the EG processing system components 192, and the components for each respective stream may be the same or different. In the illustrated embodiment, for example, one or more streams may pass through the EG treatment components, including a first combination of the EG treatment components 192, a second combination of the EG treatment components 192, and so on.

As another example, the first portion of the exhaust gas 66 provided to the flow control system 250 and the second portion of the exhaust gas 66 provided to the inlet 184 of the compressor section 152 may first pass through a common set of the EG treatment components, including a first combination of the EG treatment components 192. Thereafter, the first and second portions of the exhaust gas 66 may diverge, where the first portion may pass through a second combination of the EG treatment components 192 and the second portion may bypass the second combination and may flow to the inlet 184. In accordance with present embodiments, the second combination of treatment components 192 may include, by way of example, one or more scrubbers, one or more moisture separation units, one or more heat exchangers, one or more booster compressors, or any combination thereof. Therefore, the first portion of the exhaust gas 66 may have different levels of moisture (e.g., lower levels), a different pressure, a different temperature, a different flow rate, or any combination thereof, compared to the second portion of the exhaust gas 66 provided to the inlet 184. The additional treatment of the first portion of the exhaust gas 66, which is used by the system 10 for cooling/sealing, and other purposes, may be desirable to enhance the operability of various components of the SEGR GT system 52.

As depicted in the illustrated embodiment, the flow control system 250 may, additionally or alternatively, be positioned between the EG processing system 54 and the SEGR GT system 52, which enables the flow control system 250 to receive the exhaust gas 66 as a treated exhaust gas for provision to the inlet 184 of the compressor section 152 in addition to or in lieu of one or a plurality of components of the SEGR GT system 52. In such embodiments, the exhaust gas 66 provided to the inlet 184 of the compressor section 152 may be the same as the exhaust gas 66 provided to the various cooling and sealing channels discussed herein. For example, as depicted, the flow control system 52 may direct treated exhaust gas flows (depicted generically as 252) to the oxidant compression system 186 (e.g., to the machinery 106, 180, the compressor 188, and/or the drive 190), the compressor section 152, the turbine section 156, the combustor 160, or any combination thereof.

The flow control system 250 may include one or a plurality of flow control system components, 254, 256, 258, 260, 262, 264, that enable the flow control system 250 to provide the treated exhaust gas flows 252 to various system components at desired temperatures, flow rates, pressures, humidity levels, or the like. Generally, the flow control system components, 254, 256, 258, 260, 262, 264 may be configured to adjust flow rates of the exhaust gas 66, divert flows of the exhaust gas 66, measure flow rates and/or humidity levels of the exhaust gas 66, release (e.g., vent) the exhaust gas 66, or any combination thereof. The disclosed embodiments are intended to include any and all permutations of the foregoing components in the flow control system components, 254, 256, 258, 260, 262, 264, in series and parallel arrangements, wherein one, more than one, all, or none of the components may derive power from the shaft 176, from a separate drive, from a generator (e.g., of the machinery 106, 180), or any other suitable power source. As illustrated below, TABLE 3 depicts some non-limiting examples of arrangements of the flow control system components, 254, 256, 258, 260, 262, 264 positioned along the exhaust recirculation path 110.

TABLE 3

| 254 | 256 | 258 | 260 | 262 | 264 |
|-----|-----|-----|-----|-----|-----|
| HEAD | BB | FCV | REL | HD | FM |
| HEAD | BB | FCV | REL | FM | THERM |
| HEAD | BB | FCV | FM | HD | |
| HEAD | BB | FCV | FM | | |
| HEAD | BB | FCV | | | |
| HEAD | FCV | FM | HD | | |
| HEAD | FCV | FM | | | |
| BB | FCV | FM | HD | REL | |
| BB | FCV | FM | | | |
| BB | FCV | REL | | | |
| BB | FM | HD | | | |
| BB | FM | | | | |
| FCV | FM | HD | | | |
| FCV | HD | REL | | | |
| HEAD | | | | | |
| HEAD | FM | | | | |

As illustrated above in TABLE 3, a header unit (e.g., a flow manifold) is represented as HEAD, as in FIG. 2, a booster blower is represented as BB, a release valve (e.g., a bleed or vent) is represented as REL, a flow control valve is represented by FCV, a flow meter is represented as FM, a humidity detector is represented by HD, a temperature meter (e.g., a thermocouple) is represented as THERM. Although TABLE 3 illustrates the flow control system components, 254, 256, 258, 260, 262, 264 in a particular sequence, TABLE 3 is also intended to cover any suitable combination and sequence of the flow control system components, 254, 256, 258, 260, 262, 264. Furthermore, TABLE 3 is not intended to exclude any non-illustrated permutations of the flow control system components, 254, 256, 258, 260, 262, 264. These flow control system components, 254, 256, 258, 260, 262, 264 may enable feedback control of temperature, pressure, and flow rate of exhaust gas 66 sent to various components of the turbine-based service system 14. As discussed in further detail below, the treated exhaust gas flows 252 may be supplied to the gas turbine engine 150, the oxidant compression system 186, the EG supply system 78, or any combination thereof, at locations specifically selected to facilitate temperature stabilization, heat integration, drying, sealing, cooling, purging (e.g., of hot gases), pressure stabilization, particulate removal, or any combination thereof.

By way of example, FIG. 5 also depicts the flow control system 250 as providing one or more of the treated exhaust gas flows 252 to various stages of the compressor section 152 and/or turbine section 156. The amount, temperature, pressure, and other parameters of the treated exhaust gas flows 252 may depend, at least partially, on a desired amount of cooling, pre-heating, and/or pressure stabilization suitable for enhancing the operation of the turbine-based service system 14. For example, as discussed in detail below, the flow control system 250 may provide one or more of the treated exhaust gas flows 252 to various stages of the turbine section 156 to promote a more evenly distributed temperature gradient across the turbine section 156 (e.g., to decrease the occurrence of hot spots). Similarly, the flow control system 250 may, additionally or alternatively, provide one or more treated exhaust gas flows 252 to various stages of the compressor section 152, for example to promote a more evenly distributed temperature gradient, and also to facilitate enhanced compression at downstream stages of the compressor section 152. Indeed, in certain embodiments, the flows of treated exhaust gas 252 may be provided to later (e.g., downstream) stages of the compressor section 152 to facilitate cooling of the compressor section 152, which may enable the compressor section 152 to operate at higher capacities.

For such machinery that includes rotating blades contained within a casing, the one or more treated exhaust gas flows 252 may serve to control thermal expansion so as to control the clearance between the rotating portions (e.g., wheels, blades), and the stationary portions (e.g., a turbine shroud). Indeed, in one embodiment, the control system 100 may monitor such clearances and may adjust at least one of the one or more treated exhaust flows 252 accordingly.

In certain embodiments, the treated exhaust flows 252 may be utilized to pressurize chambers surrounding the various stages of the compressor and/or turbine sections 152, 156. Indeed, in one embodiment, the pressure of the chamber (e.g., a plenum) may be at least approximately equal to, or greater than, the pressure of the working fluid within the compressor/turbine. Such pressure may be desirable to block leakage of the working fluid out of the compressor/turbine. In still further embodiments, the treated exhaust flows 252 may be used to purge the hot cavity of the turbine section 156, for example to facilitate servicing and/or to prevent thermally-induced downtime.

The treated exhaust gas flows 252, additionally or alternatively, may be provided to one or more bearing assemblies where the shaft 176 interacts with the compressor section 152 and/or the turbine section 156, for example to facilitate cooling, enhanced sealing, purging, and pressure stabilization. For example, the treated exhaust flows 252 may be utilized to cool the lubricant in the bearings to help the performance of the lubricant. Again, such embodiments are described in further detail below.

Figure 6:
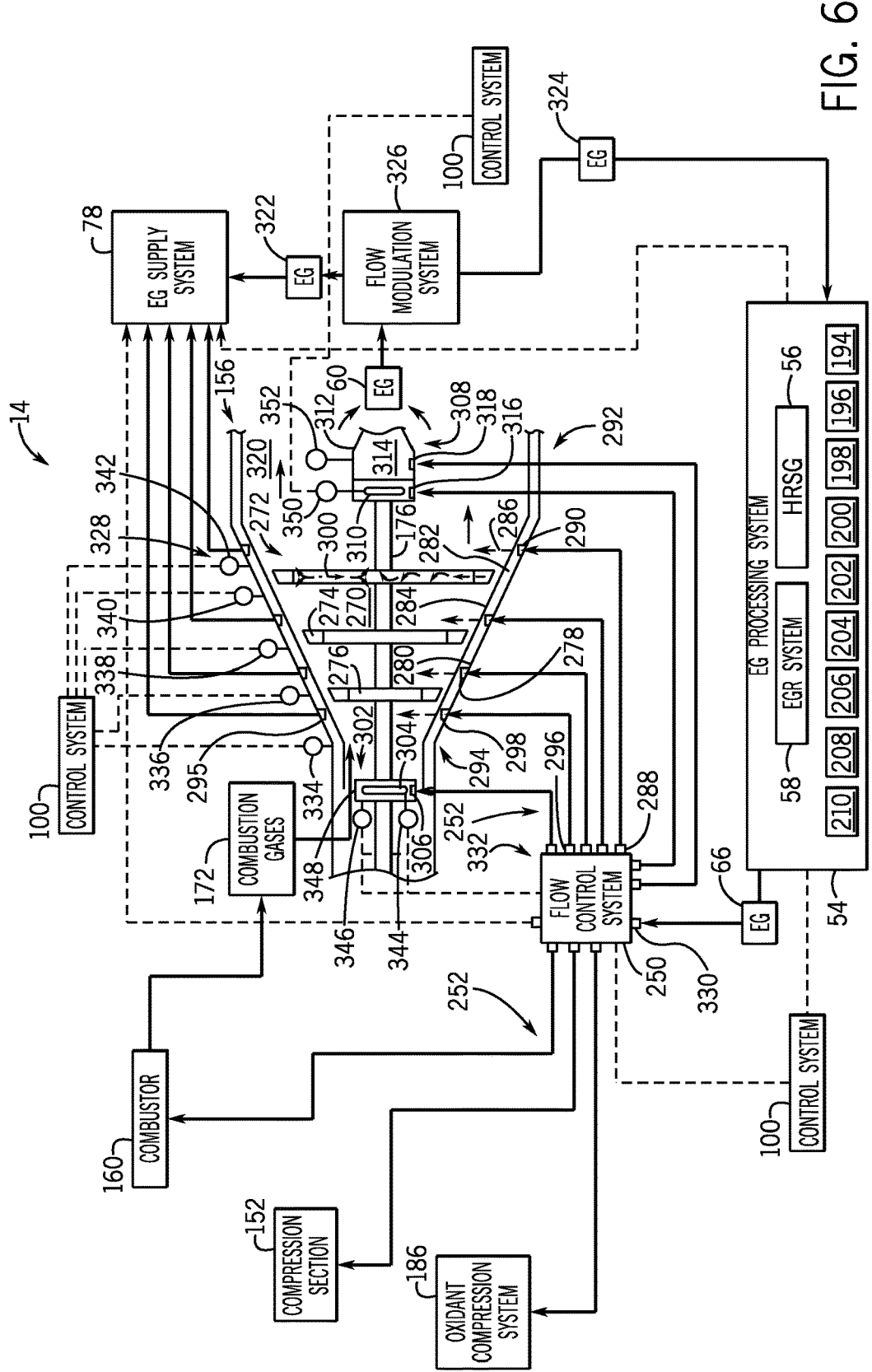
FIG. 6 is a diagram of an embodiment of the system of FIGS. 1-3, illustrating an embodiment of the manner in which recirculated exhaust gas may be utilized in the turbine of the turbine-based service system of FIGS. 1-3.

FIG. 6 depicts an embodiment of the turbine-based service system 14, wherein the flow control system 250 is configured to provide one or a plurality of the exhaust gas flows 252 to various portions of the turbine section 156. The turbine section 156, as illustrated, includes an expansion zone 270, where the hot combustion gases 172 flow through the turbine section 156, and in which work is extracted from the hot combustion gases 172 to generate the exhaust gas 60. The turbine section 156 includes a plurality of stages 272, each having one or more turbine blades 274 supported by a turbine wheel 276 positioned about the shaft 176. The hot combustion gases 172 interact with the turbine blades 274, and work is extracted from the gases 172, causing the turbine blades 274 and wheels 276 to in turn cause the shaft 176 to rotate. As work is extracted from the hot combustion gases 172, the gases 172 expand and lose thermal energy, generating the exhaust gas 60. Accordingly, the turbine blades 274 and wheels 276 may experience relatively high temperatures and pressures.

In certain embodiments, the extraction of work from and expansion of the combustion gases 172 creates a thermal and pressure gradient within the expansion zone 270 (e.g., across the plurality of stages 272). In accordance with present embodiments, the flow control system 250 may provide one or more of the treated exhaust gas flows 252 to within the expansion zone 270, to one or more of the turbine stages 272, or a combination thereof, to enable enhanced uniformity of the temperature and/or pressure gradients within each stage 272 across the zone 270. In other words, the treated exhaust gas flows 252 may be utilized to facilitate a more uniform temperature distribution to help prevent uneven thermal expansion, which can detrimentally affect the balance of the stages 272 and, therefore, the operation of the turbine 156. Indeed, controlling such thermal expansion, as noted above, may help control the clearance between the rotating blades 276 and a surrounding turbine part (e.g., an inner casing and/or turbine shroud).

In the illustrated embodiment, the turbine section 156 includes one or more exhaust gas pathways to facilitate delivery of the treated exhaust gas flows 252 to various portions of the turbine section 156. With respect to the expansion zone 270, the turbine section 156 includes a plurality of exhaust gas inlets 278, which may enable the treated exhaust gas flows 252 to flow through an outer turbine casing 280, and into an exhaust gas plenum 282 formed by the space between the outer turbine casing 280 and an inner turbine casing 284 (e.g., one or more inner shroud segments). The exhaust gas plenum 282 therefore enables a flow of the exhaust gas 66 along the inner and outer turbine casings 280, 284, which facilitates cooling of the inner casing 284. In certain embodiments, the inlets 278 may, additionally or alternatively, enable the exhaust gas 66 to flow into the expansion zone 270, for example to facilitate pressure stabilization between the turbine stages 272. Such exhaust flow is depicted as arrows 286. In one embodiment, the exhaust gas 66 may flow through the plenum 282 to cool the plenum 282, purge heat from the plenum 282, and deliver the exhaust gas 66 into the hot gas path of the exhaust gas in the turbine section 156.

Indeed, as depicted by the arrows 286, the exhaust gas 66 may be supplied at one or a plurality of circumferential and axial positions to control the distribution of exhaust gas 66 within plenum 282, the expansion zone 270, or within one or more cooling channels of the turbine stages 272. This enables the control of the distribution of the exhaust gas 66 for cooling, sealing, purging, and/or pressure stabilization. Furthermore, providing the exhaust gas 66 in this manner may facilitate uniform thermal expansion of various moving parts (e.g., the wheels 276 and/or blades 274), and therefore a more uniform clearance between the moving parts and the inner casing 280. Additionally or alternatively, the exhaust gas 66 may be focused to regions of the turbine section 156 that are relatively hot compared to other, for example to reduce hot spots in the turbine section 156.

For example, the exhaust gas 66 may be adjusted (by controlling its temperature, flow rate, etc.) for clearance control purposes. As the rotating (e.g., turbine blades 276) or stationary parts (e.g., shroud segments of the inner casing 284) heat up, thermal expansion can cause clearances to change, e.g., decrease. A certain amount of thermal expansion may be desired, as this helps with performance, because less exhaust gas 60 is able to bypass the blades 276. However, higher amounts of thermal expansion can cause rubbing between the blades 276 and shroud of the inner casing 284. To control the thermal expansion of these and other parts, the exhaust gas 66 may flow through shrouds of the inner casing 284, turbine blades 276, spaces between wheels 274, etc., to facilitate temperature and clearance control. Furthermore, unlike compressed ambient air, since the exhaust gas 66 is the same gas as the working fluid in the expansion zone 270, the exhaust gas 66 is able to flow into the hot gas path after cooling without changing the composition of the hot gases, e.g., without adding any fuel, oxygen, or other undesirable components, into the exhaust gas 60.

As illustrated, the treated exhaust gas flows 252 may be provided independently to the inlets 278, which enables the flow control system 250 to selectively deliver the exhaust gas 66 to one or more particular inlets 278. For example, the flow control system 250 may flow exhaust gas from a first flow control system outlet 290 to a first turbine section inlet 290. The first turbine section inlet 290, as depicted, may be positioned at an aft portion 292 of the turbine section 156. Accordingly, provided that the pressure of the exhaust gas 66 provided to the first turbine section inlet 290 is greater than the pressure of the exhaust gas 66 within other portions of the exhaust gas plenum 282, the exhaust gas 66 may travel from the aft portion 292 to a forward portion 294 of the turbine section 156. Such a configuration may be desirable to enable heating and pressurization of the exhaust gas 66 for eventual provision of the exhaust gas 42 as a product gas to the EG supply system 78. For example, the exhaust gas 42 may be removed from the exhaust gas plenum 282 via a series of outlets 295 fluidly coupled to the EG supply system 78.

In other embodiments, the exhaust gas 66 may flow through the exhaust gas plenum 282 in the opposite direction. In particular, the flow control system 250 may flow exhaust gas from a second flow control system outlet 296 to a second turbine section inlet 298. Thus, when the pressure of the exhaust gas 66 provided to the second turbine section inlet 298 is greater than the pressure of the exhaust gas 66 within other portions of the exhaust gas plenum 282, the exhaust gas 66 may travel from the aft portion 292 to a forward portion 294 of the turbine section 156. Such an exhaust flow may facilitate cooling of the turbine section 156, particularly in regions proximate the forward portion 294.

Additionally or alternatively, the exhaust gas 66 may flow from the exhaust gas plenum 282 and into one or more cooling channels disposed within the turbine stages 272. For example, as depicted at the aft-most turbine stage, exhaust gas 66 may flow from the plenum 282 and into an internal cooling channel 300 configured to flow the exhaust gas 66 as a cooling fluid through the turbine wheel 276, the turbine blade 274, or any combination thereof. Indeed, there may be one internal cooling channel, or multiple cooling channels (e.g., microchannels) within each turbine stage 272. As also shown, the exhaust gas 66, after circulation within the channel 300, may exit the channel 300 and combine with the exhaust gas 60 within the expansion zone 270.

The embodiments described above are examples only, and are intended to be representative of examples in which the way the exhaust gas 66 may be utilized within the turbine section 156 for cooling and pressure stabilization purposes. Indeed, the treated exhaust flows 252 may be provided to any one or a combination of the turbine section inlets 278, and the exhaust gas 42 may flow from any one or a combination of the turbine section outlets 295 to the EG supply system 78. Additionally or alternatively, the exhaust gas 66 may flow from any one or a combination of the turbine section outlets 295 to the EG processing system 54 (e.g., to remove debris collected from the plenum 282, and/or for further cooling).

In accordance with present embodiments, the shaft 176 about which the turbine wheels 276 are positioned is supported by a series of bearings. One of the bearings, in particular a bearing assembly, may serve to couple the turbine and compressor sections 152, 156 (e.g., via respective rotors/shafts). This bearing assembly, referred to as a mid-span bearing assembly 302, may include one or more bearings designed to support the weight of the shaft 176 (which may include the respective shafts of the compressor section 152 and the turbine section 156, or may be a single shaft extending through both sections), to accommodate for thermal growth and/or contraction of the shaft 176, and to support the rotational speeds of the shaft 176 during operation of the SEGR GT system 52. By way of non-limiting example, the mid-span bearing assembly 302 may include a journal bearing, a loaded thrust bearing, an unloaded thrust bearing, or any combination thereof.

The mid-span bearing assembly 302 may include an inner housing 304 that is at least partially sealed to contain a fluid (e.g., pressurized oil) that reduces friction and heat within the mid-span bearing assembly 302. The mid-span bearing assembly 302 may also include one or more exhaust gas inlets 306, which enables the exhaust gas 66 to flow into one or more cooling channels of the assembly 302. In accordance with an embodiment, the exhaust gas 66 may serve as a cooling medium, as a sealing medium, as a purging medium or a combination thereof. Indeed, in one embodiment, the exhaust gas 66 may enable pressure stabilization within the mid-span bearing assembly 302. For example, during the course of operation, the exhaust gas 66 may flow through the mid-span bearing assembly 302, where the amount flowing into the mid-span bearing assembly 302 is substantially equal to the amount of exhaust gas 66 flowing out of the mid-span bearing assembly 302 (e.g., via leakage) and into the expansion zone 270 (or other area of the gas turbine system 150). In this way, exhaust gas 66 flowing from the flow control system 250 to the mid-span bearing assembly 302 at a relatively constant pressure may serve to stabilize the pressure within the mid-span bearing assembly 302. Such pressure stabilization may enable greater operational flexibility (e.g., the ability to withstand a greater range of temperatures and/or pressures from the working fluid), as well as improve the lifetime of the mid-span bearing assembly 302. Furthermore, the exhaust gas 66 may be used to cool the lubricant in the mid-span bearing assembly 302, which may enhance the performance of the lubricant. In one embodiment, this may stabilize the mid-span bearing assembly 302 at loads that would otherwise be unsuitable.

The gas turbine system 150 also includes a turbine bearing assembly 308, which supports the shaft 176 in the aft portion 292 of the turbine section 156. The illustrated turbine bearing assembly 308 includes an inner housing 310, which is at least partially sealed using a sealing fluid (e.g., pressurized oil), and an outer housing 312 surrounding the inner housing 310. A fluid circuit 314 between the inner and outer housings 308, 310 enables the exhaust gas 66 to flow through the turbine bearing assembly 308, which enables the exhaust gas 66 to simultaneously act as a coolant and sealing medium. In particular, the turbine bearing assembly 308 includes first and second turbine bearing inlets 316, 318, each of which enable the exhaust gas 66 to flow from the flow control system 250 and into the turbine bearing assembly 308.

As noted above, the present embodiments are not limited to providing the exhaust gas 66 only to the turbine section 156. Indeed, as depicted, the flow control system 250 may provide the treated exhaust gas flows 252 to, in addition to or in lieu of the turbine section 156, one or more of the combustors 160, the compressor section 152, the oxidant compression system 186, the EG supply system 78, or any combination thereof. Accordingly, the exhaust gas 66 provided from the EG processing system 54 to the flow control system 250 may be treated in such a way so as to support the particular manner in which the treated exhaust gas flows 252 are utilized within the turbine-based service system 14.

During operation, the exhaust gas 60 generated within the turbine section 156 may flow from the expansion zone 270 and through an exhaust section 320 of the turbine section 156. From the exhaust section 320 (e.g., an exhaust duct), the exhaust gas 60 may be apportioned between a first flow 322 directly to the EG supply system 78, and a second flow 324 to the EG processing system 54 via a flow modulation system 326. The flow modulation system 326 may include one or more flow distribution headers, one or more flow control valves, or other features configured to control and distribute flow. Generally, the flow modulation system 326 may be of any size and fabricated of any one or a combination of materials capable of withstanding an exhaust gas flow rate of about 10,000 Lb/hr (about 4536 kg/hr) to about 50,000,000 Lb/hr (about 22679619 kg/hr) and a temperature of about 100° F. (about 37.8° C.) to about 1500° F. (about 815.6° C.). In certain embodiments, the flow modulation system 326 may not be present, and the exhaust gas 60 may flow directly to the EG processing system 54 (e.g., to the EGR system 58 and the HRSG 56).

The EG treatment components 192, of the EG processing system 54 may be arranged in a manner that facilitates the removal of potentially oxidative compounds, the reduction of humidity, the removal of particulates, cooling, or flow rate enhancement, or any combination thereof. In some embodiments, the EG treatment components 192 may be arranged such that they include a scrubbing system, a moisture separator, one or more booster blowers, one or more heat exchangers, or one or more injectors, or any combination thereof, for the purposes of cooling and/or sealing. As set forth above, the particular combination of EG treatment components 192 utilized for the exhaust gas 66 used for cooling and/or sealing may be the same or different that the components ultimately provided as inlet exhaust gas to the inlet 184 of the compressor section 152. For instance, the combination of EG treatment components 192 utilized for the exhaust gas 66 used for cooling and/or sealing may include additional moisture separators, additional heat exchangers, additional compressors, or any combination thereof, compared to the combination of EG treatment components 192 utilized for inlet exhaust gas to the inlet 184 of the compressor section 152.

By way of non-limiting example, in one embodiment, the exhaust gas 60 may first flow through the HRSG 56 (or, more generically, a heat exchanger). Once heat is extracted from the exhaust gas 60 (which may generate steam at the HRSG 56), the exhaust gas 60 may flow to a first scrubbing system at EG treatment component 194. The first scrubbing system may include one or more scrubbers configured to contact the exhaust gas 60 with a fluid, such as water, or dry treatment medium, or both, to facilitate the precipitation and separation of particulates and/or other undesirable compounds (e.g., trace metals, $NO_x$, $SO_x$) from the exhaust gas 60. In certain embodiments, the scrubbing process performed within the first scrubbing system may reduce the temperature of the exhaust gas 60. By way of non-limiting example, the temperature of the exhaust gas 60 may be reduced within the first scrubbing system by between approximately 1% and 90%, such as between 5% and 80%, 10% and 60%, or 20% and 50%.

The EG processing system 54 may then flow the exhaust gas 60, which may contain a portion of the fluid used for scrubbing at the scrubbing system (EG treatment component 194), to another heat exchanger at EG treatment component 196. The additional heat exchanger may include one or more direct or indirect heat exchangers configured to transfer heat between the exhaust gas 60 containing the scrubbing fluid and a heat exchange medium. By way of example, the heat exchanger at EG treatment component 196 may include a spray injection cooler or similar cooling feature configured to directly contact the exhaust gas 60 containing the scrubbing fluid and the heat exchange medium (e.g., feed water).

In certain embodiments, the heat exchanger may enable psychrometric cooling of the exhaust gas 60.

In further embodiments, the heat exchanger at EG treatment component 196 may be an indirect heat exchanger, where the exhaust gas 60 containing the scrubbing fluid transfers heat to the heat exchange medium without direct contact (e.g., via a shell and tube configuration). By way of example, the heat exchange medium may include water, steam, the fuel 70 (FIGS. 1-5), the oxidant 68 (FIGS. 1-5), or any suitable process stream that may receive heat to beneficially impact the operation of the turbine-based service system 14. By way of non-limiting example, the temperature of the exhaust gas 60 may be reduced within the heat exchanger at EG treatment component 196 by between approximately 1% and 90%, such as between 5% and 80%, 10% and 60%, or 20% and 50%. Upon undergoing heat exchange (e.g., either to heat or to cool the exhaust gas 60 having the scrubbing fluid), the exhaust gas 60 may be provided to at least one injector at EG treatment component 198.

The at least injector at the EG processing component 198 may be a flow injector or an inlet for entry into a precipitator (e.g., a wet electrostatic precipitator) at EG treatment component 200. The precipitator may electrostatically charge particulates within the exhaust gas 60, causing the charged particulates to be attracted to collection devices (e.g., charged plates, rods, and/or meshes). Any suitable precipitation device or system may be utilized for the removal of particulates and/or droplets of reactive liquids (e.g., liquids that can be charged) at EG treatment component 200.

Once the exhaust gas 60 exits the precipitator at EG treatment component 200, the exhaust gas 60 may have a desired or otherwise suitable level of certain combustion by-products, including reduced levels of NOx, SOx, particulates, and other similar materials. In other words, materials that can have a potentially deleterious effect on various equipment (e.g., over extended periods of time), other than the particular fluid utilized for scrubbing, are reduced to levels that are appropriate for recirculation back to the gas turbine 150.

The exhaust gas 60, having the scrubbing fluid (e.g., water), water produced within combustion, or other sources of humidity, is provided to a fluid separator at EG treatment component 202. In a general sense, the fluid separator may be configured to controllably reduce the level of the scrubbing fluid, water, water vapor, and the like, within the exhaust gas 60 flowing through the recirculation pathway 110. In certain embodiments, the fluid separator may be a moisture separator. The moisture separator may include any type of device suitably configured to remove at least a portion of liquid droplets, moisture and/or humidity from a fluid stream. By way of non-limiting example, the moisture separator may be a panel type, a single stage, a multi-stage, a cellular drift type, a coalescer, a de-mister, a desiccant, triethylene glycol, a membrane-based separation unit, a cyclone, a centrifuge, a knockout tank, a precipitator, or any combination thereof. The moisture separator may at least partially dry the exhaust gas 60 by removing droplets of liquid, such as water, oil or other forms of moisture from the exhaust gas 60 that may have carried over from the scrubbing and/or heat exchange process. In certain embodiments, the operation of the moisture separator may be adjusted in response to feedback indicative of moisture levels within the exhaust gas 60, the particular location at which the exhaust gas will be provided within the gas turbine 150, or a combination thereof.

While the moisture separator may be configured to generally reduce the level of moisture within the exhaust gas 60, in some embodiments, the moisture separator may reduce the moisture levels (e.g., water levels, oil levels, scrubbing fluid levels, or a combination thereof) by at least approximately 5%, 10%, 20%, 30%, 40%, 50%, 60%, 70%, 80%, 90%, 95%, or at least 99%. By way of non-limiting example, the moisture separator(s) may remove between approximately 10% and 100% of the moisture in the exhaust gas 60, such as between approximately 20% and 100%, 30% and 100%, 40% and 100%, 50% and 99%, 60% and 95%, or 75% and 90%, of the moisture in the exhaust gas 60. In certain embodiments, the moisture removal by one or more moisture removal units of the EG processing system 54 may be sufficient so as to prevent corrosion or other moisture-related wear of components of the turbine-based service system 14. Furthermore, because the exhaust gas utilized for cooling, pre-heating, sealing, or a combination thereof, may be recombined with other exhaust gas flows and eventually used as a product gas, the exhaust gas may have sufficiently low moisture levels so as to not negatively affect its ability to act as a working fluid in the EG supply system 78 (e.g., for use in enhanced oil recovery).

Further, as noted above, the first portion of the exhaust gas 66 provided to the flow control system 250 (e.g., the exhaust gas used for cooling/sealing) may have a different composition compared to the second portion of the exhaust gas 66 provided to the inlet 184 of the compressor section 152. Indeed, in embodiments where the first portion undergoes additional treatment (e.g., additional moisture separation at a moisture separator), the first portion, by way of non-limiting example, may have a moisture level that is lower than, such as between approximately 10% and 100%, 20% and 90%, or 30% and 80% lower than, the level of moisture in the exhaust gas provided to the inlet 184 of the compressor section 152.

In addition to or in lieu of the EG treatment components noted above, the EG processing system 54 of FIG. 6 may include booster blowers, compressors, and/or a variety of other components, including those noted above with respect to FIG. 3. The EG treatment components 192 may also be arranged serially or in parallel, as appropriate. Indeed, the EG treatment components 192 may be individually or collectively controlled by the control system 100, such that their operation is at least partially governed based upon a similar input, which may include operator inputs, feedback signals, set points, and other similar control inputs. Further, the control system 100 may control the operation of the flow control system 250, the flow modulation system 326, or any combination of these components, in response to such inputs. As discussed herein, such control methodology may be implemented on one or more non-transitory, machine readable media collectively storing instructions that are executable by a processor. One example of these components includes the memory 122 and the processor 120 of the controller 118.

As illustrated, the control system 100 is communicatively coupled to one or more sensors 328 configured to monitor one or more operational parameters relating to the turbine section 156. For example, the one or more sensors 328 may be configured to monitor temperature, pressure, humidity levels, oxygen levels, $CO_2$ levels, flow rates, particulate levels, turbine blade/wheel rotation rates, rotation rates of the shaft 176, or any combination thereof. The one or more sensors 328 may, in turn, provide feedback signals to the control system 100, and the controller 118 (FIG. 2) of the control system 100 may process the feedback to determine whether any operational parameters of the EG processing system 54, the flow control system 250, the flow modulation system 326, or other components of the gas turbine 150, should be adjusted.

For example, during operation, the flow control system 250 may receive the exhaust gas 66 as a treated exhaust gas at a flow control system inlet 330. The control system 100 may receive feedback indicative of one or more parameters of the exhaust gas 66 (e.g., temperature, pressure, humidity, moisture, or any combination thereof). Based on the parameters, and based upon the desired end use of the exhaust gas 66, the control system 100 may divert flows via one or more flow control system outlets 332, which include the first and second outlets 288, 296 discussed above.

The control system 100 may also determine which locations of the turbine section 156 may benefit from receiving one or more of the treated exhaust gas flows 252. For example, the control system 100 may receive feedback indicative of pressures, temperatures, flow rates, clearances between the moving and stationary parts (e.g., the turbine blades 274 and the inner shroud/casing 280), or the like, from a first sensor 334 positioned at the forward portion 294 of the turbine section 156. The control system 100 may, based on the feedback, determine that the feedback indicates an undesirably high temperature, an undesirably low pressure, an undesirably low or uneven clearance, or the like, and may adjust the flow of the exhaust gas 66 to the second turbine section inlet 298. Similar types of monitoring and adjustments may be made throughout the turbine section 156, such as based on feedback from a second sensor 336, a third sensor 338, a fourth sensor 340, or a fifth sensor 342.

Furthermore, such adjustments are not limited to flow along and/or within the turbine casing and the expansion zone 270. Indeed, the control system 100 may also receive feedback relating to the mid-span bearing assembly 302 and/or the turbine bearing assembly 308. For example, the feedback may be generated by a fifth sensor 344 positioned at the inner housing 304 of the mid-span bearing assembly 302 and/or a sixth sensor 346 positioned at the outer housing 348 of the mid-span bearing assembly 302. Additionally or alternatively, the feedback may be generated by a seventh sensor 350 positioned at the inner housing 310 of the turbine bearing assembly 308 and/or an eighth sensor 352 positioned at the outer housing 312 of the turbine bearing assembly 308.

The feedback obtained from any one or a combination of these sensors may be related to the pressure, temperature, and or clearance between moving and stationary parts within the mid-span bearing assembly 302 and/or the turbine bearing assembly 308. Based on the feedback, the control system 100 may adjust a flow rate of the exhaust gas 66 to the particular bearing assembly to which the feedback relates. For example, if the pressure in the mid-span bearing assembly 302 is below a pressure threshold, the control system 100 may increase a flow of the exhaust gas 66 from the flow control system 250 to the one or more exhaust inlet 306. Likewise, if the temperature in the mid-span bearing assembly 302 is above a temperature threshold, the control system 100 may increase a flow of the exhaust gas 66 from the flow control system 250 to the one or more exhaust inlets 306. Furthermore, if the clearance between moving and stationary parts of the bearing assemblies is below a particular threshold, the control system 100 may increase the cooling provided by the exhaust gas 66 (e.g., by increasing the flow rate and/or decreasing the temperature of the exhaust gas 66). The control system 100 may perform similar operations with respect to the turbine bearing assembly 308.

In addition to directing flows in the manner discussed above, the control system 100 may also monitor and control parameters relating to the temperature, flow rates, pressures, and so on, of the treated exhaust gas flows 252. In particular, the control system 100 may, in some embodiments, ensure that the flows 252 are provided to the turbine section 156 at appropriate temperatures, flow rates, and pressures. For example, the control system 100 may monitor the pressure of the treated exhaust gas flows 252, and may adjust the operation of one or more components of the EG processing system 54 (e.g., booster blower, compressor) to ensure that the pressure of the exhaust gas 66 at the site of injection (e.g., at the inlets 278 and/or within the expansion zone 270) is sufficient so as to prevent back flow while also providing the desired effect of the exhaust gas 66. In other words, the control system 100 may adjust the pressure of the treated exhaust flows 252 to between a lower pressure threshold and an upper pressure threshold.

As another example, the control system 100 may ensure that the temperature of the treated exhaust flows 252 is sufficiently low to enable cooling of the various components of the turbine section 156, but not low enough to cause large temperature drops across the turbine section 156, which can cause thermal stresses. Thus, in a similar manner to the pressure of the flows 252, the control system 252 may control the temperature of the treated exhaust flows 252 to between a lower temperature threshold and an upper temperature threshold. Similar operations may be performed throughout the turbine-based service system 14, as discussed in detail below.

Figure 7:
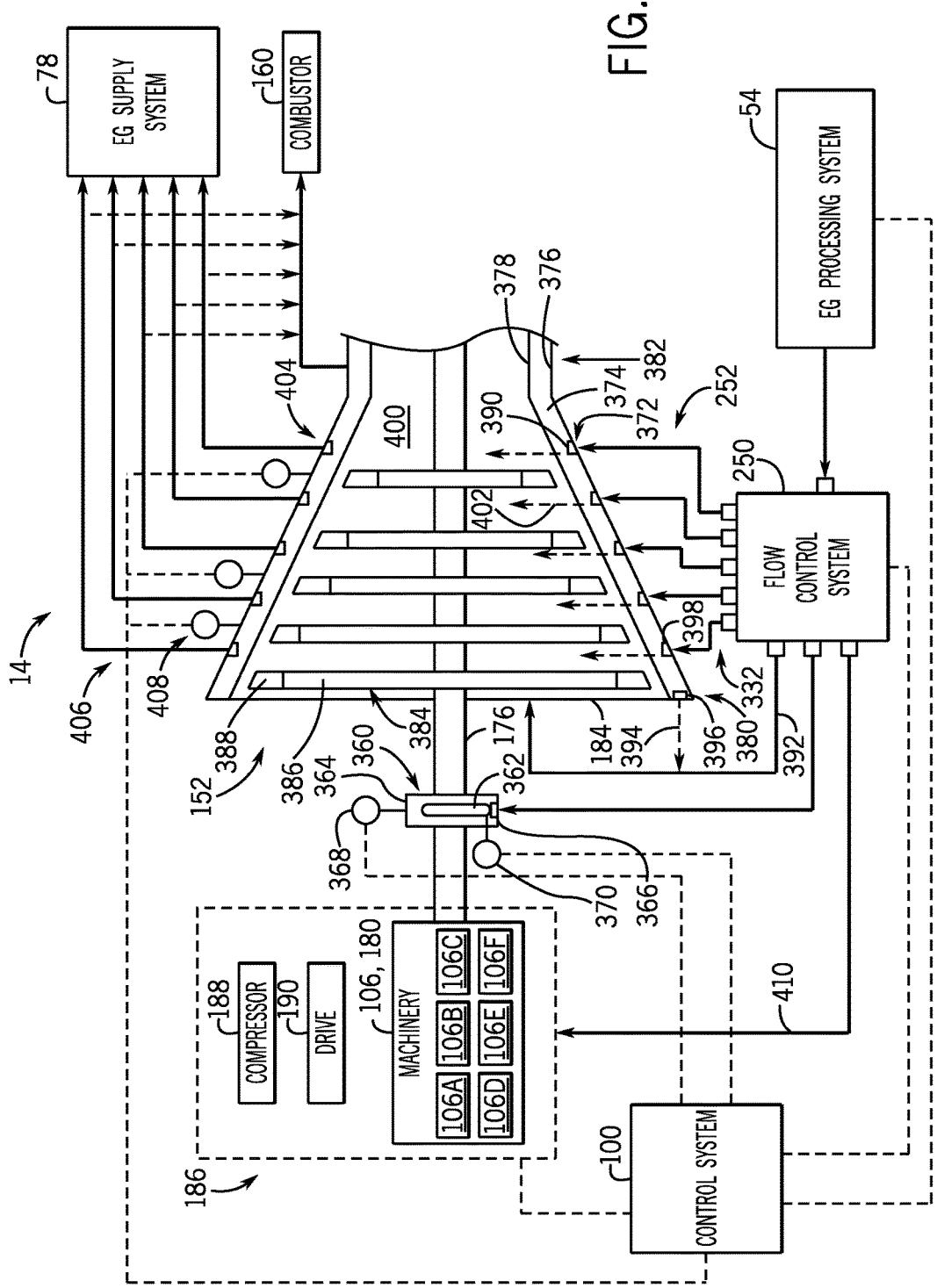
FIG. 7 is a diagram of an embodiment of the system of FIGS. 1-3, illustrating an embodiment of the manner in which recirculated exhaust gas may be utilized in the exhaust gas compressor of the turbine-based service system of FIGS. 1-3.

FIG. 7 illustrates one embodiment of the manner in which the control system 100 may utilize the treated exhaust flows 252 to enhance the operability of the compressor section 152. In a similar manner to the turbine section 156 described above, the compressor section 152 includes a number of exhaust gas inlets to enable the exhaust gas 66 to be delivered as a treated exhaust gas to various areas of the compressor section 152 (e.g., for sealing, cooling, clearance control, pressure stabilization, temperature stabilization, and/or purging). In particular, as depicted, the compressor section 152 includes a compressor bearing assembly 360, which, like the bearing assemblies of the turbine section 156, may include one or more bearings designed to support the weight of the shaft 176 (which may include the respective shafts of the compressor section 152 and the turbine section 156, or may be a single shaft extending through both sections), to accommodate for thermal growth and/or contraction of the shaft 176, and to support the rotational speeds of the shaft 176 during operation of the SEGR GT system 52. By way of non-limiting example, the compressor bearing assembly 360 may include a journal bearing, a loaded thrust bearing, an unloaded thrust bearing, or any combination thereof.

The compressor bearing assembly 360 may include an inner housing 362 that is at least partially sealed to contain a fluid (e.g., pressurized oil) that reduces friction and heat within the compressor bearing assembly 360. The inner housing 362 may be positioned within an outer housing 364. The compressor bearing assembly 360 may also include one or more exhaust gas inlets 366, which enables the exhaust gas 66 to flow into one or more cooling channels of the assembly 360. In accordance with an embodiment, the exhaust gas 66 may serve as a cooling medium, as a sealing medium, as a purging medium (e.g., to purge hot fluid), or a combination thereof. Indeed, in one embodiment, the exhaust gas 66 may enable pressure stabilization within the compressor bearing assembly 360. For example, during the course of operation, the exhaust gas 66 may flow through the compressor bearing assembly 360, where the amount flowing into the compressor bearing assembly 360 is substantially equal to the amount of exhaust gas 66 flowing out of the compressor bearing assembly 360 (e.g., via leakage). In this way, exhaust gas 66 flowing from the flow control system 250 to the compressor bearing assembly 360 at a relatively constant pressure may serve to stabilize the pressure within the compressor bearing assembly 360. Such pressure stabilization may enable greater operational flexibility (e.g., the ability to withstand a greater range of temperatures generated by varying rotational rates of the shaft 176), as well as improve the lifetime of the compressor bearing assembly 360.

As discussed above with respect to FIG. 6, the control system 100 is communicatively coupled to the flow control system 250, the EG processing system 54, and a variety of sensors positioned throughout the turbine-based service system 14. With respect to the compressor bearing assembly 360, the control system 100 may receive feedback from a first sensor 368 positioned at the outer housing 364 of the compressor bearing assembly 360, a second sensor 370 positioned at the inner housing 362 of the compressor bearing assembly 360, or a combination thereof. As a result of the feedback obtained from either or both of these sensors, the control system 100 may adjust at least one parameter of the exhaust gas 66 to the one or more inlets 366, such as a temperature, pressure, flow rate, or any combination thereof, of the exhaust gas 66.

In addition to or in lieu of the one or more inlets 366 of the compressor bearing assembly 360, the compressor section 152 may include one or more compressor inlets 372 that enable the exhaust gas 66 to be delivered into a plenum 374 formed by the space between an outer casing 376 and an inner casing 378 of the compressor section 152. The one or more compressor inlets 372 may be positioned at any point between an inlet end 380 and an outlet end 382 of the compressor section 152. As depicted, the inlets 372 may be positioned so as to enable cooling of the compressor section 152 between and/or at compressor stages 384 formed by compressor wheels 386 coupled to compressor blades 388. The exhaust gas 66 provided to the one or more inlets 372 may be utilized for cooling, temperature stabilization, clearance control (e.g., between compressor blades 388 and one or more shroud segments of the inner casing 378), purging, and/or pressure stabilization of the compressor section 152.

For example, the exhaust gas 66 may be provided from the flow control system 250 to a first compressor inlet 390 positioned at the outlet end 382. In embodiments where the exhaust gas 66 provided to the first compressor inlet 390 has a greater pressure than the exhaust gas 66 within the plenum 374, the exhaust gas 66 may flow from the outlet end 382 toward the inlet end 380. The exhaust gas 66, in certain embodiments, may receive heat from the outlet end 382 of the compressor section 152 (e.g., because the outlet end 382 generally has a higher temperature than the inlet end 380 due to the heat from compression), and may transfer heat to or combine with the exhaust gas 66 flowing along an inlet flow path 392 from the flow control system 250 to the compressor section 152. Such heat transfer may result in pre-heating of the exhaust gas 66 entering the compressor section 152 for compression (e.g., via the inlet 184), which may be desirable for de-icing the compressor section 152 during inclement weather or during startup under cold/icy conditions. Alternatively, in certain embodiments, such as when the exhaust gas 66 flowed through the plenum 374 is sufficiently colder than the exhaust gas 66 provided to the compressor section 152, the exhaust gas 66 flowed through the plenum 374 may cool the exhaust gas 66 entering the compression section 152, which may enhance compression efficiency.

In some embodiments, the exhaust gas 66, having been heated within the plenum 374, may exit the plenum 374 of the compressor section 152 and combine with the inlet flow path 392, as depicted by dashed arrow 394. Further, in one embodiment, the inlet flow path 392 may flow from a first plenum outlet 396 to the inlet 184 of the compressor section 152. In other words, in one embodiment, the inlet 184 of the compressor section 152 may receive the exhaust gas 66 from the plenum 374 after the exhaust gas 66 is pre-heated. Accordingly, the exhaust gas 66 provided directly from the flow control system 250 to the compressor section 152, and which is subsequently combined with the heated exhaust gas 66, may have a sufficiently low temperature to offset the higher temperature of the exhaust gas 66 exiting the plenum 374. This combined stream may be the exhaust gas 66 that is compressed within the compressor section 152 and utilized as a combustion diluent within one or more of the combustors 160, and/or as a product gas for the EG supply system 78.

In addition to or in lieu of providing the exhaust gas 66 to the first compressor inlet 390, the flow control system 250 may provide the exhaust gas 66 (e.g., via the one or more treated exhaust gas flows 252) to a second compressor inlet 398 positioned closer toward the inlet end 380 of the compressor section 152 than the first compressor inlet 390. In embodiments where the pressure of the exhaust gas 66 entering the second compressor inlet 398 is greater than in other portions of the plenum 374, the exhaust gas 66 may flow from the inlet end 380 to the outlet end 382. In such embodiments, the exhaust gas 66 entering the second inlet 398 may be controlled to remove heat from the inlet end 380, which may enhance the efficiency at which the exhaust gas 66 is compressed for use within the combustor 160 and/or the EG supply system 78.

In addition to or in lieu of providing the exhaust gas 66 to the plenum 374, the exhaust gas 66 may be provided to a compression zone 400 of the compressor section 152, in which the exhaust gas 66 is compressed for use within the combustor 160, the EG supply system 78, or a combination thereof. For example, in addition to or in lieu of exhaust gas 66 that has bypassed the flow control system 250 (and/or one or more moisture separators that the cooling/sealing exhaust gas otherwise encounters), the flow control system 250 may provide one or more of the treated exhaust gas flows 252 to the compression zone 400 (illustrated as arrows 402) to enable pressure and/or temperature stabilization within the zone 400. For instance, it may be desirable to provide additional exhaust gas 66 to certain areas of the compression zone 400 to adjust pressure and/or temperature levels at one or more of the compressor stages 384. In other words, by adjusting the pressure and/or temperature levels at one or more of the compressor stages 384, the treated exhaust gas flows 252 may enable enhanced consistency in temperature and/or pressure increases across the compressor section 152.

Additionally or alternatively, in some embodiments, the exhaust gas 66 may be provided to various compression stages to control clearance and homogenize/control thermal expansion. For example, in embodiments where the thermal expansion occurring at one or more of the compressor stages 384 is uneven, or not within a predetermined range, the exhaust gas 66 may be controlled so as to cool (or heat) all or a portion of the compressor stage 384 (e.g., the wheel 386, the blades 388, or both) to obtain the desired level of thermal expansion and, therefore, clearance between the blades 388 and the shroud of the inner casing 378.

As discussed above, the treated exhaust gas flows 252 may be provided to a variety of areas in the compressor section 152. Similarly, the exhaust gas 42 may be withdrawn from the compressor section 152 (e.g., from the plenum 374) via one or more compressor outlets 404. In the illustrated embodiment, the one or more compressor outlets 404 are positioned at the outer casing 376 of the compressor section 152, which enables the exhaust gas 42 to be withdrawn after cooling areas of the compressor section 152 from within the plenum 374. The exhaust gas 42 may exit the one or more compressor outlets 404 as one or more product gas flows 406, which may be provided to the EG supply system 78, to the combustor 160, back to the EG processing system 54, back to the flow control system 250, or any combination thereof.

As with the turbine section 156, the control system 100 may receive feedback from one or more sensors 408 configured to monitor parameters relating to the compressor stages 384 (e.g., temperature, pressure, thermal expansion, clearance), the environment within the plenum 374, or a combination thereof. For example, one or more of the sensors 408 may be positioned within the plenum 374, within the compression zone 400, or both. The control system 100 may monitor feedback generated by the sensors 408, and may adjust one or more parameters (e.g., flow rate, pressure, temperature) of the treated exhaust flows 252 as a result. For example, the one or more sensors 408 may be configured to monitor the temperature of the compression stages 384, and may adjust the treated exhaust flows 252 to have a temperature, flow rate, or both, so as to maintain the temperature of one or more of the compressor stages 384 between a lower and an upper temperature threshold (e.g., to ensure a homogeneous temperature increase across the compressor section 152, and/or to ensure a desired clearance between compressor blades 388 and the inner casing 378).

The control system 100 may also perform similar operations based on pressure. For example, the control system 100 may receive feedback indicative of the pressures at one or more of the compressor stages 384, and the control system 100 may provide one or more of the treated exhaust gas flows 252 to areas proximate the stages 384 (e.g., as indicated by arrow 402) so as to ensure a consistent and homogeneous pressure increase along the compressor section 152.

As discussed above, the exhaust gas 66, having been treated at the EG processing system 54, may have one or more properties that enable the exhaust gas 66 to be utilized as a cooling fluid, as a pressure stabilization fluid, as a heating fluid (e.g., for de-icing), or any combination thereof. Furthermore, the low moisture and humidity levels of the exhaust gas 66 (e.g., due to the presence of one or more moisture separation units of the EG processing system 54) enable the exhaust gas 66 to be utilized in lieu of other gases, such as compressed air (which contains oxygen and moisture), or nitrogen and other inert gases. Indeed, the use of the exhaust gas 66 for cooling, heating, purging, clearance control, and/or sealing in accordance with present embodiments may be particularly well-suited for implementations in which the SEGR GT system 52 is used in combination with enhanced oil recovery, where low oxygen levels are desired in the product gas. Furthermore, the exhaust gas 66 provides the additional benefit of being generated and recycled within the system 52, where inert gases, such as nitrogen, may be continuously generated and/or imported into the system 52 using specialized equipment, storage tanks, and so forth. This enables the exhaust gas 66 to be utilized both as a fluid for the purposes mentioned above, while also being able to act as the main working fluid.

Indeed, because of the ability to tailor a number of parameters of the exhaust gas 66 using the EG processing system 54, the turbine-based service system 14 may also utilize the exhaust gas 66 to cool, heat, dry, clean, or pressurize one or more components of the oxidant compression system 186. For example, as depicted, the turbine-based service system 14 includes a treated exhaust flow path 410, which may include any number of actual conduits, or pathways, extending from the flow control system 250 (or the EG processing system 54) to the oxidant compression system 186. The treated exhaust gas flow 252 provided along the flow path 410 may be used to enhance the operability of the oxidant compressor 188, the drive 190 of the compressor 188, and/or one or more of the components of the machinery 106, 180.

One embodiment of the manner in which the exhaust gas 66 may be utilized in conjunction with the machinery 106, 180 is depicted in FIG. 8. Specifically, FIG. 8 depicts an embodiment of the turbine-based service system 14 in which the treated exhaust gas flows 252 follow a first flow path 420 to a main oxidant compressor (MOC) 422, a second flow path 424 to a gearbox 426, and a third flow path 428 to a generator 430.

As illustrated, the MOC 422 is at least partially driven by the shaft 176 of the SEGR GT system 52, where the rotation of the shaft 176 generates the power utilized in the MOC 422 for compressing the oxidant 68 into a compressed oxidant 432. The compressed oxidant 432 is generally utilized for combustion within the SEGR GT system 52, and may be compressed to any pressure suitable for such processes. In a general sense, the MOC 422 will include one or more compression stages, which may be radial, axial, or circumferential stages, and may be housed within one casing, or a plurality of casings.

In some embodiments, the exhaust gas 66 in the first flow path 420, which flows to the MOC 422, may be utilized in a similar manner as described above with respect to the compressor and turbine sections 152, 156. That is, the exhaust gas 66 may be utilized to cool certain sections of the MOC 422 in a manner that enables enhanced compression, and/or enables stable pressure and/or temperature increases across the MOC 422. For instance, the exhaust gas 66 may flow along a compressor casing so as to cool the casing and enable increased throughput. In other embodiments, the exhaust gas 66 may flow through the compressor casing of the MOC 422 and into one or more oxidant compression stages for pressure stabilization, clearance control, thermal expansion control, and so on. The exhaust gas 66 may also act as an interstage cooling medium to facilitate compression efficiency. Further, in one embodiment, as depicted by dashed arrow 434, the first flow path 420 may be flow-integrated with an oxidant flow path 436 to enable cooling of the oxidant 68 before the oxidant 68 is introduced to the MOC 422. Additionally or alternatively, the exhaust gas 66 may combine with the oxidant 68 to dilute the oxidant 68 to enable pre-mixing of the oxidant 68 and exhaust gas 66 prior to introduction to the combustors 160.

Further, the control system 100 may monitor feedback indicative of one or more parameters of the MOC 422 (e.g., stage temperatures, stage pressures, casing temperature and/or pressure, compressor stage clearances) using one or more MOC sensors 438. By way of example, the control system 100 may monitor the temperatures across the MOC 422 (e.g., of compression stages) and may adjust a flow of the exhaust gas 66 along the first flow path 420 (e.g., adjust its temperature, pressure, or flow rate) to maintain a generally constant temperature change across the MOC 422 (e.g., homogeneous temperatures at each compression stage). Similar operations may be performed with respect to the pressures within the MOC 422.

In the illustrated embodiment, the turbine-based service system 14 also includes the gearbox 426, which may be of any suitable type such as a parallel shaft gearbox, an epicyclic gearbox, or the like. The gearbox 426 may enable the MOC 422 to operate at a different speed than the SEGR GT system 52, such as at a higher or lower speed. Indeed, in one embodiment, the gearbox 426 enables the MOC 422 to operate at its design speed while also enabling the SEGR GT system 52 to operate at a desired load. The gearbox 426 may include one or more bearing assemblies, gear assemblies, or any combination thereof, that may benefit from receiving the exhaust gas 66 as a cooling flow, heating flow, a purging flow, or a drying flow, along the second flow path 424.

For example, the relatively low moisture levels (e.g., low humidity) and low levels of corrosive materials in the exhaust gas 66 may enable the exhaust gas 66 to be utilized in a similar manner to the bearing assemblies of the compressor section 152 and the turbine section 156. Thus, the control system 100, in certain embodiments, may monitor the temperatures and/or pressures within the gearbox 426 (e.g., within various seals including bearing assemblies) via one or more gearbox sensors 432, and may provide the exhaust gas 66 along the second flow path 424 as appropriate. Indeed, the exhaust gas 66 may be utilized to maintain the temperature of the gearbox 426 between a lower and an upper temperature threshold, and/or maintain the pressures within various sealed mechanisms of the gearbox 426 between a lower and an upper pressure threshold. Furthermore, the exhaust gas 66 flowing along the second flow path 424 may, in certain embodiments, be utilized as a drying flow used to mitigate moisture within the gearbox 426, such as in humid environments. Additionally or alternatively, in one embodiment, the exhaust gas 66 may be utilized as a pressurized flow that is able to carry contaminants (e.g., sand, dirt, moisture) out of the housing of the gearbox 426, blow hot gases out of the gearbox 426, or to dislodge such contaminants out of the gear mechanisms of the gearbox 426 so as to promote longer times in operation.

In some embodiments, the exhaust gas 66 may be used for temperature control of one or more lubricants used by the gearbox 426. For example, the exhaust gas 66 may be used for heat exchange with the one or more lubricants to enable the lubricants to be maintained between an upper and a lower temperature threshold. In this way, the exhaust gas 66 may enable the maintenance of the lubricants at their designed operating temperatures.

As illustrated, the turbine-based service system 14 also includes the generator 430, which is configured to output the electric power 74 by using power generated via the SEGR GT system 52. For example, the electric power 74 may be provided to an electric grid of a municipality. The illustrated generator 430 is double-ended, where an input of the generator 430 corresponds to the shaft 176, and an output shaft 434 of the generator 430 corresponds to an input shaft 436 of the gearbox 426.

In accordance with present embodiments, in a similar manner to the gearbox 426, the flow control system 250 may direct exhaust gas 66 along the third flow path 428 to the generator 430 for cooling, drying, purging, or contaminant removal. For example, the control system 100 may receive feedback from one or more generator sensors 438, which may generate feedback indicative of internal temperatures in the generator 430, the pressure of one or more seals in the generator 430, the humidity in the generator 430, or any combination of these or similar parameters. Based on the monitored parameters, the control system 100 may operate the flow control system 250 in a manner that enables an appropriate flow of the exhaust gas 66 along the third flow path 428 so as to reduce the humidity in the generator 430, to dislodge contaminants (e.g., particulates) from the generator 430, to cool or heat the generator 430, or any combination thereof.

For example, in embodiments where the generator 430 is exposed to cold/icy weather, the control system 100 may receive feedback indicative of cold temperatures, high moisture levels, or a combination thereof, and may direct a warm or hot flow of the exhaust gas 66 to the generator 430 to de-ice or otherwise warm the generator 430. Similar operations may be performed for cooling the generator 430, for de-humidifying the generator 430, for imparting small amounts of humidity to the generator 430, or other such implementations. Further, similar operations may also be performed for other components of the oxidant compression system 186, such as the components illustrated in FIG. 9.

In particular, FIG. 9 depicts an embodiment of the turbine-based service system 14 in which the flow control system 250 is configured to provide one or more of the treated exhaust flows 252 to a drive 440 of the oxidant compression system 186 (illustrated as a steam turbine 440), and/or to a clutch 442 of the oxidant compression system 186. In particular, the flow control system 250 may deliver the exhaust gas 66 to the steam turbine 440 via a fourth flow path 444, which may include one or more conduits, lines, and associated flow adjustment features. The exhaust gas 66 provided to the steam turbine 440 may be utilized in a similar manner as discussed above with respect to the compressor section 152, the turbine section 156, the MOC 422, the gearbox 426, and/or the generator 430. Thus, the exhaust gas 66 may be used to adjust temperatures and/or humidity levels, to remove contaminants, to purge the steam turbine 440, to control the clearance of stages of the steam turbine 440 (e.g., by controlling thermal expansion), and the like.

Further, as depicted by dashed arrow 446, the exhaust gas 66 may also be used to adjust the temperature and/or pressure of steam, labeled as "A," provided to the steam turbine 440 from the HRSG 56 (or other steam source). Additionally or alternatively, as depicted by dashed arrow 448, the exhaust gas 66 may be used to adjust the temperature and/or pressure of condensate, labeled as "B," provided to the HRSG 56 from the steam turbine 440. Indeed, the control system 100 may monitor steam and condensate temperatures and/or pressures, interstage pressures and temperatures, casing temperatures, or other such parameters of the steam turbine 440 using one or more steam turbine sensors 450. In embodiments where the drive 440 is of a different type (e.g., an electric motor), the control system 100 may monitor its parameters and may utilize the exhaust gas 66 in a similar manner as described above with respect to the generator 430.

In certain embodiments, it may be desirable to de-couple the steam turbine 440 from the SEGR GT train. Accordingly, the illustrated turbine-based service system 14 also includes the clutch 442, which enables the steam turbine 440 to operate independent of the SEGR GT system 52. As illustrated, the flow control system 250 may also provide one or more of the treated exhaust gas flows 252 to the clutch 442 via a fifth flow path 452. The exhaust gas 66 may be utilized for sealing, temperature control, pressure control, contaminant control, purging, temperature control of one or more clutch lubricants, or any combination thereof, in the clutch 442. Indeed, the control system 100 may monitor one or more parameters related to temperatures, pressures, humidity levels, or any combination thereof, in the clutch 442. As a result of such monitoring, the control system 100 may adjust one or more parameters of the exhaust gas 66, such as the temperature, pressure, humidity level, moisture level, or any combination thereof, flowing to the clutch 442 to maintain the clutch 442 within a desired range for each parameter.

Additional Description

As set forth above, the present embodiments provide systems and methods for using treated exhaust gas for temperature control, pressure control, humidity control, purging, clearance control, and/or sealing of various components of turbine-based service systems. It should be noted that any one or a combination of the features described above may be utilized in any suitable combination. Indeed, all permutations of such combinations are presently contemplated. By way of example, the following clauses are offered as further description of the present disclosure:

Embodiment 1. A system, comprising: a gas turbine system, comprising: a turbine combustor; a turbine driven by combustion products from the turbine combustor; and an exhaust gas compressor driven by the turbine, wherein the exhaust gas compressor is configured to compress and supply an exhaust gas to the turbine combustor; an exhaust gas recirculation (EGR) system, wherein the EGR system is configured to recirculate the exhaust gas along one or more exhaust recirculation paths from the turbine to first and second exhaust gas inlets of the gas turbine system, and the exhaust recirculation system comprises a scrubbing system and a moisture separator upstream of at least the second exhaust gas inlet; and wherein the first exhaust gas inlet enables the exhaust gas compressor to intake the exhaust gas for exhaust gas compression, and the second exhaust gas inlet is separate from the first exhaust gas inlet.

Embodiment 2. The system of claim 1, wherein the second exhaust gas inlet is positioned so as to enable the exhaust gas from at least one of the one or more exhaust recirculation paths to enter into a cooling channel, a sealing channel, a heating channel, a purging channel, or any combination thereof.

Embodiment 3. The system of any preceding embodiment, wherein the second exhaust gas inlet is positioned so as to enable the exhaust gas from the at least one of the one or more exhaust recirculation paths to enter into a turbine plenum formed between inner and outer turbine casings of the turbine to enable cooling of the inner turbine casing, the outer turbine casing, one or more turbine stages of the turbine, or any combination thereof.

Embodiment 4. The system of any preceding embodiment, wherein the second exhaust gas inlet is positioned so as to enable the exhaust gas from the at least one of the one or more exhaust recirculation paths to enter into a channel disposed within an interior of a turbine wheel, a turbine blade, or a combination thereof, to enable cooling of the turbine wheel, the turbine blade, or the combination thereof.

Embodiment 5. The system of any preceding embodiment, wherein the second exhaust gas inlet is positioned so as to enable the exhaust gas from the at least one of the one or more exhaust recirculation paths to enter into a mid-span bearing assembly of the gas turbine system, a turbine bearing assembly of the gas turbine system, a compressor bearing assembly of the gas turbine system, or any combination thereof, to enable cooling, purging, sealing, or any combination thereof of the mid-span bearing assembly, the turbine bearing assembly, the compressor bearing assembly, or the combination thereof.

Embodiment 6. The system of any preceding embodiment, wherein the second exhaust gas inlet is positioned so as to enable the exhaust gas from the at least one of the one or more exhaust recirculation paths to enter into a compressor plenum formed between inner and outer compressor casings of the exhaust gas compressor to temperature control of one or more compressor stages of the exhaust gas compressor.

Embodiment 7. The system of any preceding embodiment, wherein the second exhaust gas inlet is positioned between turbine stages of the turbine.

Embodiment 8. The system of any preceding embodiment, wherein the second exhaust gas inlet is positioned between compressor stages of the exhaust compressor.

Embodiment 9. The system of any preceding embodiment, comprising an oxidant compression system configured to supply a compressed oxidant to the turbine combustor, wherein the oxidant compression system comprises one or more machine components, and the second exhaust gas inlet is coupled to at least one of the one or more machine components.

Embodiment 10. The system of any preceding embodiment, wherein the oxidant compression system comprises a main oxidant compressor, and the second inlet is positioned so as to enable the exhaust gas from the at least one of the one or more exhaust recirculation paths to enter into an oxidant compressor plenum formed between inner and outer oxidant compressor casings of the main oxidant compressor to enable temperature control of one or more compressor stages of the main oxidant compressor.

Embodiment 11. The system of any preceding embodiment, wherein the oxidant compression system comprises a main oxidant compressor driven by the gas turbine system and a gearbox configured to enable the main oxidant compressor to operate at a different operational speed than the gas turbine system, wherein the second inlet is positioned at the gearbox.

Embodiment 12. The system of any preceding embodiment, comprising an electrical generator driven by the gas turbine system and configured to generate electrical power, wherein the electrical generator comprises the second exhaust gas inlet.

Embodiment 13. The system of any preceding embodiment, wherein the EGR system comprises: an exhaust gas processing system having the scrubbing system and the moisture separator; and a flow control system positioned along at least one of the one or more exhaust recirculation paths between the second exhaust gas inlet and the exhaust gas processing system, wherein the flow control system comprises an exhaust flow header configured to enable the exhaust gas to flow to the second exhaust gas inlets along a separate pathway from the first exhaust gas inlet.

Embodiment 14. The system of any preceding embodiment, wherein the flow control system comprises one or more booster compressors configured to boost a pressure of the exhaust gas provided to the first exhaust gas inlet, the second exhaust gas inlet, or a combination thereof.

Embodiment 15. The system of any preceding embodiment, comprising a control system comprising: one or more tangible, non-transitory, machine readable media collectively storing one or more sets of instructions; and one or more processing devices configured to execute the one or more sets of instructions to: receive data indicative of an operational parameter of the turbine, the exhaust gas compressor, or another component of the system, or any combination thereof; and adjust a parameter of the exhaust gas provided to the first exhaust gas inlet, the second exhaust gas inlet, or both, as a result of the received data.

Embodiment 16. The system of any preceding embodiment, comprising one or more sensors configured to generate feedback indicative of temperature, pressure, moisture, flow rate, or any combination thereof, wherein the one or more sensors are communicatively coupled to the control system, and the one or more sensors are configured to provide the feedback to the control system as the data indicative of the operational parameter.

Embodiment 17. The system of any preceding embodiment, wherein the second inlet is positioned at the turbine, the one or more sensors are positioned at the turbine, and the one or more processing devices are configured to execute the one or more sets of instructions to monitor the feedback generated by the one or more sensors and adjust a parameter of the exhaust gas provided to the second inlet as a result of the feedback.

Embodiment 18. The system of any preceding embodiment, wherein the feedback generated by the one or more sensors is indicative of a temperature at or between turbine stages of the turbine, and the one or more processing devices are configured to execute the one or more sets of instructions to adjust a flow rate, a temperature, or a combination thereof, of the exhaust gas provided to the second inlet as a result of the feedback.

Embodiment 19. The system of any preceding embodiment, wherein the feedback generated by the one or more sensors is indicative of a pressure at or between turbine stages of the turbine, and the one or more processing devices are configured to execute the one or more sets of instructions to adjust a flow rate, a temperature, or a combination thereof, of the exhaust gas provided to the second inlet as a result of the feedback.

Embodiment 20. The system of any preceding embodiment, wherein the second inlet is positioned at the exhaust gas compressor, the one or more sensors are positioned at the exhaust gas compressor, and the one or more processing devices are configured to execute the one or more sets of instructions to monitor the feedback generated by the one or more sensors and adjust a parameter of the exhaust gas provided to the second inlet as a result of the feedback.

Embodiment 21. The system of any preceding embodiment, wherein the feedback generated by the one or more sensors is indicative of a pressure at or between compressor stages of the exhaust gas compressor, and the one or more processing devices are configured to execute the one or more sets of instructions to adjust a flow rate, a temperature, or a combination thereof, of the exhaust gas provided to the second exhaust gas inlet as a result of the feedback.

Embodiment 22. The system of any preceding embodiment, comprising a stoichiometric combustion system having the turbine combustor configured to combust a fuel/oxidant mixture in a combustion equivalence ratio of 1.0 plus or minus 0.01, 0.02, 0.03, 0.04, or 0.05 fuel to oxygen in the oxidant.

Embodiment 23. A method, comprising: generating an exhaust gas from combustion gases with a turbine; recirculating the exhaust gas along an exhaust recirculation flow path; reducing moisture within the exhaust gas along the exhaust recirculation path with an exhaust gas processing system; providing the exhaust gas to a first exhaust gas inlet of an exhaust gas compressor for compression; and providing the exhaust gas from the exhaust recirculation path to a second exhaust gas inlet separate from the first exhaust gas inlet for temperature control, clearance control, pressure control, sealing, or any combination thereof.

Embodiment 24. The method of any preceding embodiment, comprising combusting a fuel/oxidant mixture in a combustion equivalence ratio of 1.0 plus or minus 0.01, 0.02, 0.03, 0.04, or 0.05 fuel to oxygen in the oxidant within a turbine combustor to generate the combustion gases.

Embodiment 25. The method of any preceding embodiment, comprising monitoring an operational parameter of the turbine, the exhaust gas compressor, or a combination thereof, with a control system, and adjusting a parameter of the exhaust gas provided to the second exhaust gas inlet as a result of the monitoring.

Embodiment 26. The method of any preceding embodiment, comprising monitoring feedback indicative of a temperature and/or pressure of the turbine with a control system, wherein providing the exhaust gas from the exhaust recirculation path to the second exhaust gas inlet comprises providing the exhaust gas to a turbine inlet that leads to a turbine plenum positioned between inner and outer turbine casings of the turbine, and wherein adjusting the parameter of the exhaust gas provided to the second exhaust gas inlet comprises adjusting a flow rate of the exhaust gas provided to the turbine plenum, adjusting a temperature of the exhaust gas provided to the turbine plenum, adjusting a pressure of the exhaust gas provided to the turbine plenum, or any combination thereof.

Embodiment 27. The method of any preceding embodiment, comprising monitoring feedback indicative of a temperature and/or pressure of the exhaust gas compressor with a control system, wherein providing the exhaust gas from the exhaust recirculation path to the second exhaust gas inlet comprises providing the exhaust gas to an exhaust gas compressor inlet that leads to an exhaust gas compressor plenum positioned between inner and outer compressor casings of the exhaust gas compressor, and wherein adjusting the parameter of the exhaust gas provided to the second exhaust gas inlet comprises adjusting a flow rate of the exhaust gas provided to the exhaust gas compressor plenum, adjusting a temperature of the exhaust gas provided to the exhaust gas compressor plenum, adjusting a pressure of the exhaust gas provided to the exhaust gas compressor plenum, or any combination thereof.

Embodiment 28. The method of any preceding embodiment, comprising controlling at least one parameter of first and/or second flows of the exhaust gas from the exhaust gas recirculation path to the first and second exhaust gas inlets, respectively, with a flow control system, wherein the flow control system is disposed along the exhaust recirculation path downstream of the exhaust gas processing system.

Embodiment 29. The method of any preceding embodiment, wherein controlling the at least one parameter of the first and/or second flows of the exhaust gas comprises controlling a flow rate, a pressure, a temperature, or any combination thereof, of the second flow of the exhaust gas provided to the second exhaust gas inlet.

Embodiment 30. The method of any preceding embodiment, wherein providing the exhaust gas from the exhaust recirculation path to the second exhaust gas inlet comprises providing the exhaust gas to a compressor bearing assembly, a mid-span bearing assembly, or a turbine bearing assembly, or any combination thereof.

Embodiment 31. The method of any preceding embodiment, comprising monitoring feedback indicative a pressure, a temperature, or a combination thereof, in the compressor bearing assembly, the mid-span bearing assembly, or the turbine bearing assembly, or any combination thereof, with a control system, and adjusting a parameter of the exhaust gas provided to the second exhaust gas inlet as a result of the monitoring.

Embodiment 32. The method of any preceding embodiment, wherein adjusting the parameter of the exhaust gas provided to the second exhaust gas inlet comprises adjusting a flow rate of the exhaust gas, a pressure of the exhaust gas, a temperature of the exhaust gas, or any combination thereof.

Embodiment 33. The method of any preceding embodiment, wherein providing the exhaust gas from the exhaust recirculation path to the second exhaust gas inlet comprises providing the exhaust gas to one or more machine components of an oxidant compression system configured to provide compressed oxidant to a turbine combustor configured to produce the combustion gases.

Embodiment 34. A system, comprising: a control system comprising: one or more tangible, non-transitory, machine readable media collectively storing one or more sets of instructions; and one or more processing devices configured to execute the one or more sets of instructions to: receive feedback indicative of a parameter of a turbine of an exhaust gas recirculation gas turbine (EGR GT) system, an exhaust gas compressor of the EGR GT system, or another component of the system, or any combination thereof; and as a result of the feedback, adjust an exhaust gas flow provided from an exhaust gas recirculation pathway to a first exhaust gas inlet separate from an exhaust gas intake of the exhaust gas compressor for exhaust gas compression.

Embodiment 35. The system of any preceding embodiment, comprising one or more sensors configured to generate the feedback, wherein the one or more sensors are communicatively coupled to the control system.

Embodiment 36. The system of any preceding embodiment, wherein the feedback generated by the one or more sensors is indicative of temperature, pressure, moisture, flow rate, or any combination thereof, of one or more components of the EGR GT system.

Embodiment 37. The system of any preceding embodiment, wherein the feedback is related to the turbine.

Embodiment 38. The system of any preceding embodiment, wherein the control system is configured to adjust a temperature, a pressure, a flow rate, or a combination thereof, of the exhaust gas flow provided to the first exhaust gas inlet, and wherein the first exhaust gas inlet is positioned at the turbine.

Embodiment 39. The system of any preceding embodiment, wherein the feedback is related to the exhaust gas compressor.

Embodiment 40. The system of any preceding embodiment, wherein the control system is configured to adjust a temperature, a pressure, a flow rate, or a combination thereof, of the exhaust gas flow provided to the first exhaust gas inlet, and wherein the first exhaust gas inlet is positioned at the exhaust gas compressor.

Embodiment 41. The system of any preceding embodiment, wherein the feedback is related to one or more machine components of an oxidant compression system configured to supply a compressed oxidant to a turbine combustor of the EGR GT system.

Embodiment 42. The system of any preceding embodiment, wherein the control system is configured to adjust a temperature, a pressure, a flow rate, or a combination thereof, of the exhaust gas flow provided to the first exhaust gas inlet, and wherein the first exhaust gas inlet is positioned at the one or more machine components.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system, comprising:
a gas turbine system, comprising:
a turbine combustor;
a turbine driven by combustion products from the turbine combustor;
an exhaust gas compressor driven by the turbine, wherein the exhaust gas compressor is configured to compress and supply an exhaust gas comprising 5% or less oxidant by volume to the turbine combustor; and
an oxidant compression system configured to supply a compressed oxidant to the turbine combustor, wherein the oxidant compression system comprises an oxidant compressor configured to compress an oxidant to generate the compressed oxidant, and to supply the compressed oxidant to the turbine combustor, and wherein the oxidant compression system comprises one or more machine components including the oxidant compressor; and
an exhaust gas recirculation (EGR) system, wherein the EGR system is configured to recirculate the exhaust gas from the turbine along one or more exhaust recirculation paths to first and second exhaust gas inlets of the gas turbine system, and the exhaust recirculation system comprises a scrubbing system and a moisture separator upstream of at least the second exhaust gas inlet;
wherein the first exhaust gas inlet is positioned at the exhaust gas compressor to intake the exhaust gas for exhaust gas compression, wherein the second exhaust gas inlet is separate from the first exhaust gas inlet, and wherein the second exhaust gas inlet is coupled to at least one of the one or more machine components of the oxidant compression system;
wherein a flow control system having a flow control manifold is positioned downstream of the scrubbing system and the moisture separator, and wherein the second exhaust gas inlet receives exhaust gas from a point upstream of the flow control manifold and the first gas exhaust inlet receives exhaust gas downstream of the flow control manifold.

2. The system of claim 1, wherein the second exhaust gas inlet is positioned so as to enable the exhaust gas from at least one of the one or more exhaust recirculation paths to enter into a cooling channel, a sealing channel, a heating channel, a purging channel, or any combination thereof.

3. The system of claim 2, wherein the at least one of the one or more machine components of the oxidant compression system comprises a compressor bearing assembly, and wherein the second exhaust gas inlet is positioned so as to enable the exhaust gas from the at least one of the one or more exhaust recirculation paths to enter into the compressor bearing assembly to enable cooling, purging, sealing, or any combination thereof of the the compressor bearing assembly.

4. The system of claim 2, wherein the second exhaust gas inlet is positioned so as to enable the exhaust gas from the at least one of the one or more exhaust recirculation paths to enter into a compressor plenum formed between inner and outer compressor casings of the oxidant compressor to temperature control of one or more compressor stages of the oxidant gas compressor.

5. The system of claim 1, wherein the second exhaust gas inlet is positioned at the at least one of the one or more machine components of the oxidant compression system, between compressor stages of the oxidant compressor.

6. The system of claim 1, wherein the oxidant compressor is driven by the gas turbine system and a gearbox configured to enable the oxidant compressor to operate at a different operational speed than the gas turbine system, wherein the second exhaust gas inlet is positioned at the gearbox and the at least one of the one or more machine components of the oxidant compression system comprises the gearbox.

7. The system of claim 1, comprising an electrical generator driven by the gas turbine system and configured to generate electrical power.

8. The system of claim 1, wherein the flow control system comprises one or more booster compressors configured to boost a pressure of the exhaust gas provided to the first exhaust gas inlet.

9. The system of claim 1, comprising a control system comprising:
one or more tangible, non-transitory, machine readable media collectively storing one or more sets of instructions; and
one or more processing devices configured to execute the one or more sets of instructions to:
receive data indicative of an operational parameter of the turbine, the exhaust gas compressor, or another component of the system, or any combination thereof, and
adjust a parameter of the exhaust gas provided to the first exhaust gas inlet, the second exhaust gas inlet, or both, as a result of the received data.

10. The system of claim 9, comprising one or more sensors configured to generate feedback indicative of temperature, pressure, moisture, flow rate, or any combination thereof, wherein the one or more sensors are communicatively coupled to the control system, and the one or more sensors are configured to provide the feedback to the control system as the data indicative of the operational parameter.

11. The system of claim 10, wherein the one or more processing devices are configured to execute the one or more sets of instructions to monitor the feedback generated by the one or more sensors and adjust a parameter of the exhaust gas provided to the second exhaust gas inlet as a result of the feedback.

12. The system of claim 11, wherein the feedback generated by the one or more sensors is indicative of a temperature, and the one or more processing devices are configured to execute the one or more sets of instructions to adjust a flow rate, a temperature, or a combination thereof, of the exhaust gas provided to the second exhaust gas inlet as a result of the feedback.

13. The system of claim 11, wherein the feedback generated by the one or more sensors is indicative of a pressure at or between turbine stages of the turbine, and the one or more processing devices are configured to execute the one or more sets of instructions to adjust a flow rate, a temperature, or a combination thereof, of the exhaust gas provided to the second exhaust gas inlet as a result of the feedback.

14. The system of claim 10, wherein the one or more sensors are positioned at the exhaust gas compressor, and the one or more processing devices are configured to execute the one or more sets of instructions to monitor the feedback generated by the one or more sensors and adjust a parameter of the exhaust gas provided to the second exhaust gas inlet as a result of the feedback.

15. The system of claim 14, wherein the feedback generated by the one or more sensors is indicative of a pressure at or between compressor stages of the exhaust gas compressor, and the one or more processing devices are configured to execute the one or more sets of instructions to adjust a flow rate, a temperature, or a combination thereof, of the exhaust gas provided to the second exhaust gas inlet as a result of the feedback.

16. The system of claim 1, comprising a stoichiometric combustion system having the turbine combustor configured to combust a fuel/oxidant mixture in a combustion equivalence ratio of between 0.95 and 1.05 fuel to oxygen in the oxidant.

17. A method, comprising:
generating an exhaust gas from combustion gases with a turbine;
recirculating the exhaust gas along an exhaust recirculation flow path;
reducing moisture within the exhaust gas along the exhaust recirculation path with an exhaust gas processing system;
providing the exhaust gas to a first exhaust gas inlet of an exhaust gas compressor for compression;
providing the exhaust gas from the exhaust recirculation path to a second exhaust gas inlet separate from the first exhaust gas inlet for temperature control, clearance control, pressure control, sealing, or any combination thereof;
monitoring feedback indicative of a temperature and/or pressure of the turbine with a control system, wherein providing the exhaust gas from the exhaust recirculation path to the second exhaust gas inlet comprises providing the exhaust gas to a turbine inlet that leads to a turbine plenum positioned between inner and outer turbine casings of the turbine; and
adjusting, as a result of the monitoring, a flow rate of the exhaust gas provided to the turbine plenum via the turbine inlet, adjusting a temperature of the exhaust gas provided to the turbine plenum via the turbine inlet, adjusting a pressure of the exhaust gas provided to the turbine plenum via the turbine inlet, or any combination thereof.

18. The method of claim 17, comprising combusting a fuel/oxidant mixture in a combustion equivalence ratio of between 0.95 and 1.05 fuel to oxygen in the oxidant within a turbine combustor to generate the combustion gases.

19. A method, comprising:
generating an exhaust gas from combustion gases with a turbine;
recirculating the exhaust gas along an exhaust recirculation flow path;
reducing moisture within the exhaust gas along the exhaust recirculation path with an exhaust gas processing system;
providing the exhaust gas to a first exhaust gas inlet of an exhaust gas compressor for compression;

providing the exhaust gas from the exhaust recirculation path to a second exhaust gas inlet separate from the first exhaust gas inlet for temperature control, clearance control, pressure control, sealing, or any combination thereof;

monitoring feedback indicative of a temperature and/or pressure of the exhaust gas compressor with a control system, wherein providing the exhaust gas from the exhaust recirculation path to the second exhaust gas inlet comprises providing the exhaust gas to an exhaust gas compressor inlet that leads to an exhaust gas compressor plenum positioned between inner and outer compressor casings of the exhaust gas compressor; and adjusting, as a result of the monitoring, a flow rate of the exhaust gas provided to the exhaust gas compressor plenum via the exhaust gas compressor inlet, adjusting a temperature of the exhaust gas provided to the exhaust gas compressor plenum via the exhaust gas compressor inlet, adjusting a pressure of the exhaust gas provided to the exhaust gas compressor plenum via the exhaust gas compressor inlet, or any combination thereof.

20. The method of claim 19 comprising combusting a fuel/oxidant mixture in a combustion equivalence ratio of between 0.95 and 1.05 fuel to oxygen in the oxidant within a turbine combustor to generate the combustion gases.

\* \* \* \* \*